United States Patent
Weinhofer

(10) Patent No.: US 6,300,738 B1
(45) Date of Patent: Oct. 9, 2001

(54) METHOD AND APPARATUS FOR GENERATING REFERENCE VALUES FOR A MOTION CONTROL LOOP IN AN INDUSTRIAL CONTROL SYSTEM

(75) Inventor: Juergen K. Weinhofer, Chagrin Falls, OH (US)

(73) Assignee: Rockwell Automation Technologies, Inc., Mayfield Heights, OH (US)

( * ) Notice: Subject to any disclaimer, the term of this patent is extended or adjusted under 35 U.S.C. 154(b) by 0 days.

(21) Appl. No.: 09/408,864

(22) Filed: Sep. 30, 1999

(51) Int. Cl.[7] .................................................. G05B 11/36
(52) U.S. Cl. .................... 318/609; 318/569; 318/610; 318/568.23; 318/568.1; 318/568.22
(58) Field of Search ........................... 318/568.22, 568.1, 318/568.11, 568.23, 568.13, 569, 570, 609, 610; 388/904; 901/3, 9, 20; 187/295

(56) References Cited

U.S. PATENT DOCUMENTS

| | | | | |
|---|---|---|---|---|
| 3,749,204 | * | 7/1973 | Caputo | 187/29 |
| 4,774,445 | * | 9/1988 | Penkar | 318/568 |
| 5,057,756 | * | 10/1991 | Hara | 318/569 |
| 5,303,333 | * | 4/1994 | Hoos | 395/80 |
| 5,331,264 | * | 7/1994 | Cheng et al. | 318/568.11 |
| 5,373,221 | * | 12/1994 | McGee et al. | 318/568.11 |
| 5,508,596 | * | 4/1996 | Olsen | 318/567 |
| 5,552,691 | * | 9/1996 | Pierce et al. | 318/652 |
| 5,904,745 | * | 5/1999 | Nafziger et al. | 65/29.1 |
| 5,917,301 | * | 6/1999 | Park | 318/609 |
| 6,002,231 | * | 12/1999 | Dirkx et al. | 318/609 |

* cited by examiner

Primary Examiner—Robert E. Nappi
Assistant Examiner—Edgardo San Martin
(74) Attorney, Agent, or Firm—David G. Luettgen; Alexander M. Gerasimow; William R. Walbrun

(57) ABSTRACT

A method of controlling a motor comprises providing a motion control system and causing the shaft of the motor to move from an initial state to a new state, such as from an initial position or velocity to a new position or velocity. Coefficients for each of a plurality of polynomial segments of a motion profile are determined. The plurality of polynomial segments and the corresponding coefficients for each respective segment characterize planned movement of the shaft through each respective segment. In a particularly preferred aspect, each segment is defined by a plurality of polynomials, which include a first polynomial that describes shaft position with respect to time, a second polynomial that describes shaft velocity with respect to time, and a third polynomial that describes shaft acceleration with respect to time. The shaft of the motor is then controlled, using a motion control loop, based on reference values generated using the plurality of polynomial segments and the corresponding coefficients for each respective segment.

36 Claims, 30 Drawing Sheets

TYPE Gd2

TYPE Hd

TYPE JA

TYPE JB

TYPE JC

TYPE JAd

TYPE JBd

TYPE JCd

METHOD AND APPARATUS FOR GENERATING REFERENCE VALUES FOR A MOTION CONTROL LOOP IN AN INDUSTRIAL CONTROL SYSTEM

BACKGROUND OF THE INVENTION

1. Field of the Invention

This invention relates to a method and apparatus for generating reference values for a motion control loop in an industrial control system. In a particularly preferred embodiment, the invention relates to a method and apparatus for generating reference information in which a motion profile is defined that comprises multiple polynomial segments.

2. Description of Related Art

Industrial control systems are used in a wide variety of industrial operations such as manufacturing, processing, packaging, and so on. Typically, industrial control systems comprise one or more industrial controllers, such as programmable logic controllers, which control a plurality of output devices based on input status information from a plurality of input devices. Often, one or more of the output devices is an electric motor, which is commanded to perform various operations during the operation of the industrial control system.

To control electric motors in an industrial control system, motion control systems are utilized. Typically, a motion control system comprises a motion controller and a servo drive. In combination, the motion controller and the servo drive implement a position control loop, a velocity control loop, and a torque or current control loop. The position control loop operates to minimize the difference between a commanded position of the rotor shaft and the actual position of the rotor shaft. The velocity control loop, which is nested within the position control loop, receives a velocity command from the position control loop and operates to minimize the difference between a commanded velocity of the rotor shaft and the actual velocity of the rotor shaft. The torque/current control loop is nested within the velocity control loop. (Because torque/current magnitudes are proportional, the same control loop can be viewed as either a torque control loop or a current control loop.) The torque/current control loop, which receives a torque/current command from the velocity control loop, operates to minimize the difference between a commanded torque/current and the actual torque/current. In combination, therefore, the motion controller and the servo drive are capable of accepting a position command and in response generating current to drive the motor and thereby to control the motor to obtain the commanded position. Specific examples of commercially available motion controllers are Allen-Bradley's Logix™ motion controllers, Allen-Bradley's IMC™ motion controllers, which are available as stand-alone units or as PLC-based units, as well as Electro-Craft's PRO motion controllers. Specific examples of commercially available servo drives are Allen-Bradley's 1391 and 1394 servo drives, as well as Electro-Craft's BRU and BRU Advantage Line servo drives. Sometimes, a motion controller and a servo drive are packaged as a single product, as in the case of Electro-Craft's IQ-Series® servo drives.

Industrial control systems typically operate based on execution of a user program that is tailored to the industrial control system and its intended use. In an industrial control system that comprises one or more industrial controllers, the user program may comprise one or more subprograms that are executed by the industrial controllers. In a simpler industrial control system that comprises a stand-alone motion control system, the user program may be contained in the motion controller.

According to existing approaches, industrial control systems are typically programmed using sequential programming languages. In a sequential programming language, the user program is displayed in the form of a series of commands that are executed sequentially. The commands at the user's disposal include move and jog commands, for example, that allow the user to control movement of the motor.

The move and jog commands operate within various limit conditions that constrain operation of the motor to within certain parameters. For example, a maximum velocity, a maximum acceleration, a maximum deceleration, a maximum jerk during acceleration and a maximum jerk during deceleration may be specified. These parameters may be specified based on the performance characteristics of the motor, or based on the application for which the motor is used. For example, it may be undesirable for the motor to operate at higher than a given velocity or at higher than a given rate of acceleration, even though the motor is capable of doing so, in order to prevent malfunctioning or damage in the controlled system.

Based on these parameters, when a move command is encountered in a user program, the motion controller attempts to cause the motor to accelerate at maximum acceleration towards maximum velocity. Typically, this occurs through the generation of a series of position references that are provided as position commands to the position control loop, with new position references being provided every few milliseconds or so.

Ideally, position references are generated that allow the motor to move as quickly as possible from the initial position to the new position while staying within the bounds defined by the above-mentioned parameters. To this end, the motion control system monitors the current position, velocity and acceleration of the motor, and recalculates new position references on the fly based on the current position, velocity, and acceleration of the motor, so as to move the motor shaft as quickly as possible to its new position, while staying within the bounds defined by the above-mentioned parameters.

There are therefore several disadvantages to existing approaches. First, existing approaches are computationally intensive. The calculations that are required to ensure that each position reference is optimized to cause the motor to move as quickly as possible, while staying within the bounds defined by the above-mentioned parameters, are performed on the fly for each position reference. Essentially, therefore, the calculations are performed "starting from scratch" for each new position reference. This slows execution and diverts computational resources away from other tasks.

Additionally, due to the sequential manner in which move commands are executed, most existing approaches require that the motor have zero velocity (i.e., stopped) at the beginning of the execution of the move command. This is disadvantageous because it limits the flexibility given to the user in writing the user program. In some circumstances, it is desirable to be able to begin executing a move command when the motor has a non-zero initial velocity.

Additionally, existing algorithms generally assume that position references will be generated at regular intervals. In other words, in interrupt-based systems, for example, existing algorithms generally require that the interrupts that cause the generation of a new position reference value be equidistantly spaced in time. In non-deterministic program execution environments, however, interrupts may not be generated at regular intervals and some interrupts may even be missed. Programming environments that are not completely deterministic are common and include, for example, Windows NT. In these environments, due to the fact that interrupts are not always generated at equal time intervals, the algorithms begin to operate in a non-optimal fashion.

Therefore, a method and apparatus for generating reference values for a motion control loop in an industrial control system that overcomes one or preferably all of these drawbacks would be highly advantageous.

BRIEF SUMMARY OF THE INVENTION

According to a first aspect, comprises a method of controlling a motor is provided that providing a motion control system and causing the shaft of the motor to move from an initial state to a new state. The motion control system includes the motor and a motion control loop, and the motion control loop is operative to control a shaft of the motor based on a reference value.

The step of causing the shaft of the motor to move from an initial state to a new state further includes the following additional steps. First, coefficients for each of a plurality of polynomial segments of a motion profile are determined. The plurality of polynomial segments and the corresponding coefficients for each respective segment characterize planned movement of the shaft through each respective segment. In a particularly preferred aspect, each segment is defined by a plurality of polynomials, which include a first polynomial that describes shaft position with respect to time, a second polynomial that describes shaft velocity with respect to time, and a third polynomial that describes shaft acceleration with respect to time.

Second, the shaft of the motor is controlled using the motion control loop. The shaft is controlled by the motion control loop based on reference values generated using the plurality of polynomial segments and the corresponding coefficients for each respective segment. The shaft is controlled such that the shaft moves from the initial state to the new state.

In one embodiment, the initial state may be an initial position and the new state may be a new position. In another embodiment, the initial state may be an initial velocity and the new state may be a new velocity.

The reference values may be a series of reference values that are spaced in time from each other by an amount that is on the order of milliseconds. Preferably, the motion control loop is a position control loop, and the series of reference inputs are position reference values. The controlling step then includes obtaining feedback position information from a position sensor that provides information pertaining to the position of the motor shaft, and controlling the shaft by comparing the feedback position information with sequential ones of the series of position reference values.

The method is preferably utilized in a motion control system that includes a motion controller and a servo drive. The motion control system is preferably part of an industrial control system, which may include a rack mounted industrial controller having a backplane and a plurality of slots that are adapted to receive a plurality of modules. The motion controller may then be provided in the form of a module that is received by the rack mounted industrial controller.

The motion profile is preferably selected from a plurality of possible profiles that are specific types of a generic profile. The generic profile preferably includes a first segment in which the acceleration is forced to zero, a second segment in which the acceleration is forced to a maximum magnitude, a third segment in which the acceleration is maintained at the maximum magnitude, a fourth segment in which the acceleration is forced to zero, a fifth segment in which the acceleration is maintained at zero and the velocity is maintained at a maximum magnitude, a sixth segment in which the acceleration is forced to a maximum deceleration, a seventh segment in which the acceleration is maintained at a maximum magnitude, an eighth segment in which the acceleration is forced to zero, and a ninth segment in which the acceleration is maintained at zero.

According to another preferred aspect, provides an industrial control system comprises a motor, a servo drive, a motion controller, and a control program. The servo drive is coupled to the motor and is capable of providing the motor with current to drive the motor. The motion controller is coupled to the servo drive and includes a position control loop. The position control loop is capable of controlling an output position of a shaft of the motor so as to move from an initial position to a new position based on a series of position reference inputs.

The control program is capable of being executed to provide the position control loop with the series of position reference inputs. The control program determines coefficients for each of a plurality of polynomial segments of a motion profile. The plurality of polynomial segments and the corresponding coefficients for each respective segment characterize planned movement of the shaft through each respective segment. The control program then controls the shaft of the motor using the position control loop. The shaft is controlled by the position control loop based on reference values generated using the plurality of polynomial segments and the corresponding coefficients for each respective segment, and is controlled such that the shaft moves from the initial state to the new state.

Advantageously, a system and method of generating reference information for a motion control loop according to the preferred embodiment of the invention allow for fast execution through pre-calculation of segment parameters, for example, polynomial coefficients. All of these segment parameters can be calculated prior to physical execution of the move/jog command. By specifying motion profiles in terms of polynomials and pre-calculating the coefficients of polynomials, it is possible to determine new position references without "starting from scratch" each time.

Additionally, the system and method are more robust against variations in update time. If the update time varies slightly, or one of the update times is missed, the use of polynomial segments and pre-calculated coefficients makes the system robust and capable of responding efficiently in such situations. New reference values can be used with the polynomials, without there being the requirement for updates to occur at regular intervals.

Finally, the system and method permit execution of move commands to be initiated when the motor is already moving. Thus, the system and method can be used to permit dynamic changes of move parameters while the motor is moving.

Other objects, features, and advantages of the present invention will become apparent to those skilled in the art from the following detailed description and accompanying drawings. It should be understood, however, that the detailed description and specific examples, while indicating preferred embodiments of the present invention, are given by way of illustration and not limitation. Many modifications and changes within the scope of the present invention may be made without departing from the spirit thereof, and the invention includes all such modifications.

BRIEF DESCRIPTION OF THE DRAWINGS

A preferred exemplary embodiment of the invention is illustrated in the accompanying drawings in which like reference numerals represent like parts throughout, and in which.

DETAILED DESCRIPTION OF THE PREFERRED EMBODIMENT

A. Industrial Control System Overview

Figure 1A:
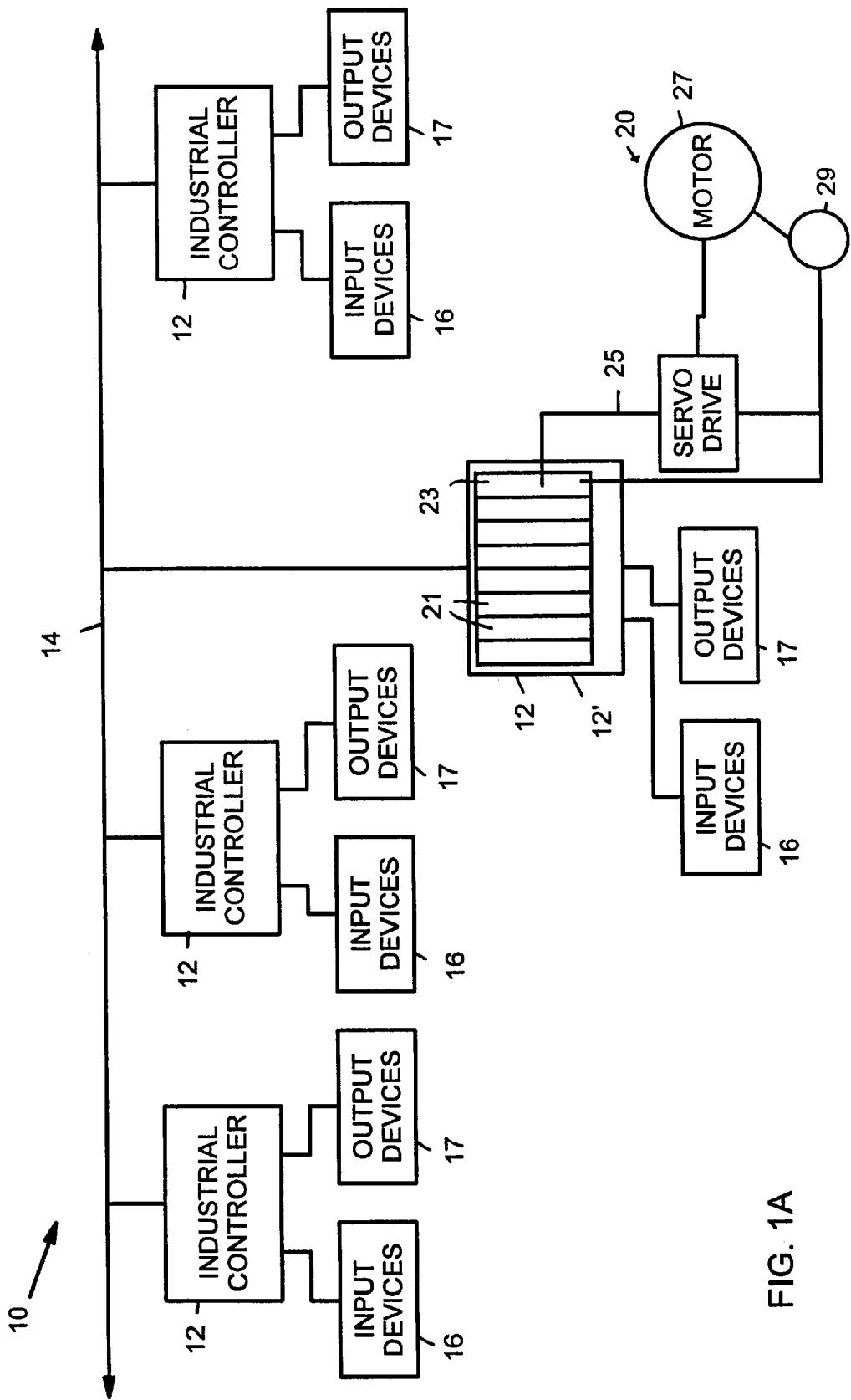
FIG. 1A is an overview of an industrial control system that incorporates a reference value generation system and method in accordance with a preferred embodiment of the invention.
Figure 1B:
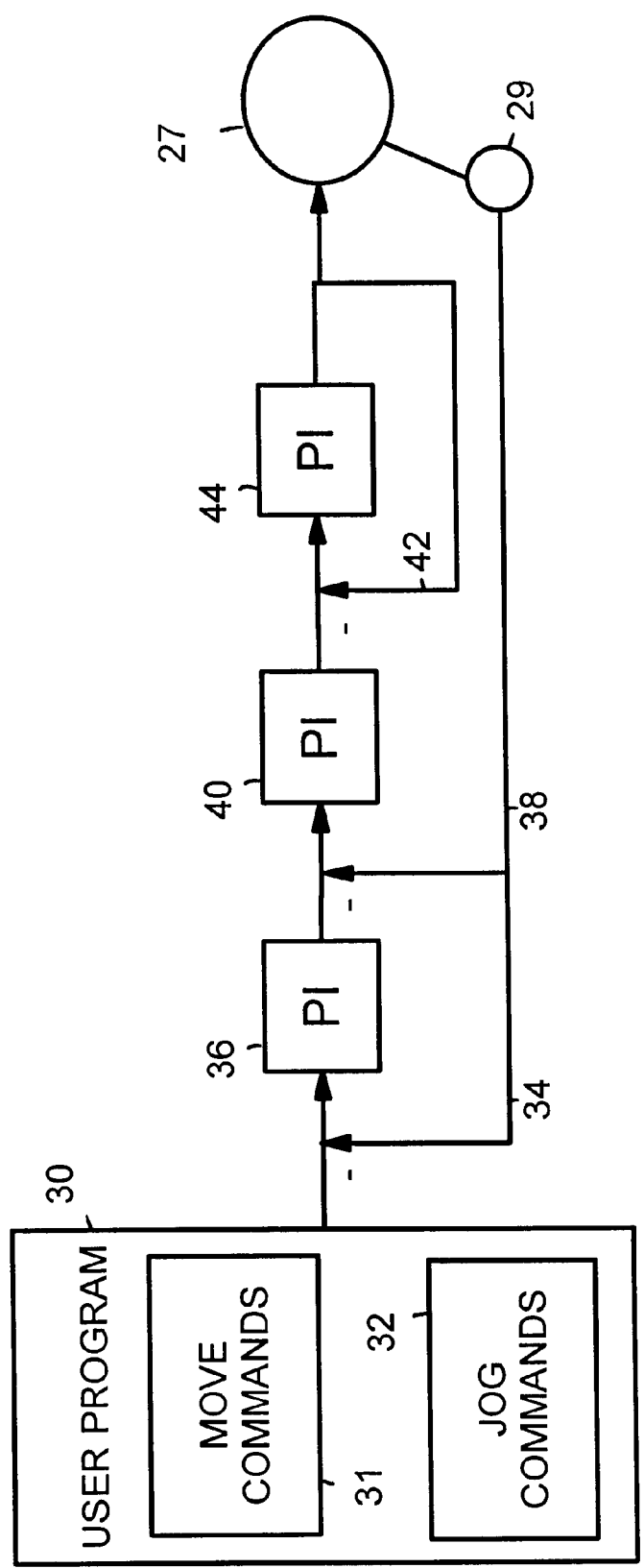
FIG. 1B is a schematic view of a motion controller, servo drive and motor of FIG. 1A shown in greater detail.

Referring now to FIGS. 1A–1B, FIG. 1A shows an overview of an industrial control system 10 in which reference values are generated in accordance with a preferred embodiment of the invention. The industrial control system 10 comprises a plurality of programmable logic controller (PLC) systems 12 or other industrial controllers 12 that are interconnected by way of a communication link 14. The industrial control system 10 also includes a plurality of input devices 16 and a plurality of output devices 17. The output devices 17 are controlled by the PLC systems 12 in response to input status information from the input devices 16.

At least one of the PLC systems 12' includes an output device 17, which is a motion control system 20. The PLC system 12' is shown in greater detail than the remaining PLC systems 12. As is conventional, the PLC system 12' comprises a plurality of modules 21, which are connected to each other by way of a common back plane. One of the modules 21 is a motion control module (i.e., a PLC-based motion controller) 23 which is connected by way of a servo drive 25 to a motor 27. A feedback sensor 29 is also provided for position/velocity feedback.

The interconnection of the motion controller 23, the servo drive 25, the motor 27 and sensor 29 is shown in greater detail in FIG. 1B. As shown therein, the system 10 also includes a user program 30, which may be executed by a processor module of the PLC system 12' or by the motion controller 23. The user program 30 includes one or more move commands 31 and one or more jog commands 32. The primary difference between a move command and a jog command is that for a move command the user specifies a new position for the motor shaft, whereas for a jog command the user specifies a new velocity.

Preferably, the move and jog commands invoke the services of a move object and a jog object, respectively. The use of object orientated programming techniques in this manner is described in greater detail in my co-pending application, Ser. No. 09/408,636, entitled "System Level Data Flow Programming Interface for a Multi-Axis Industrial Control System,", filed concurrently herewith. The contents of this application are hereby expressly incorporated by reference.

Figure 1C:
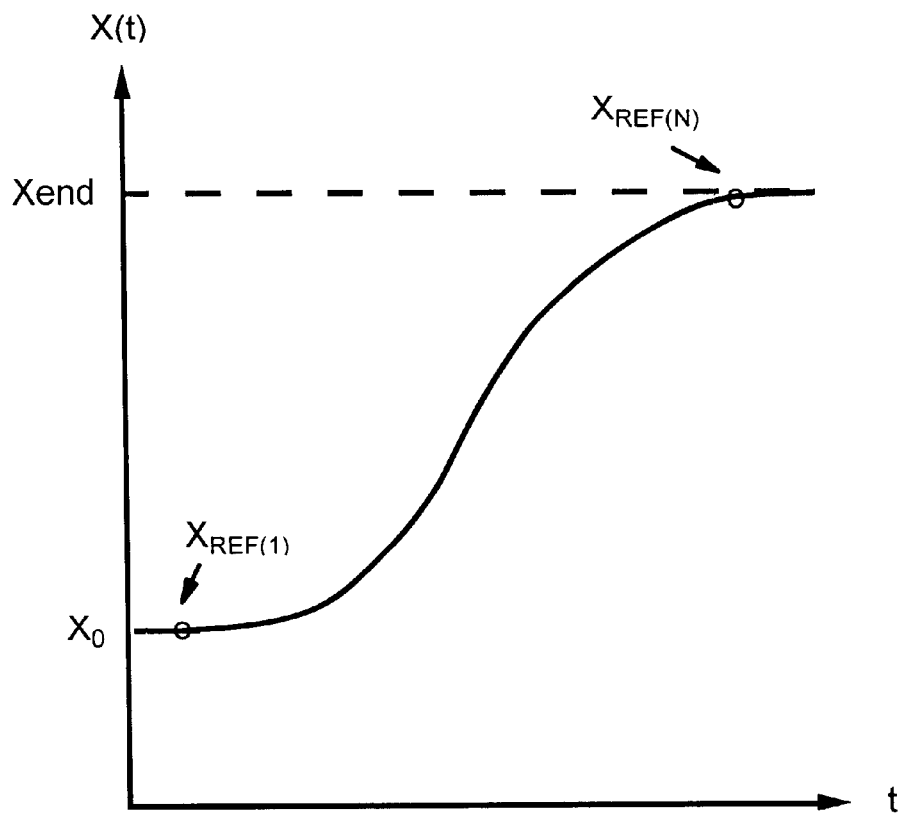
FIG. 1C is a graph showing position reference values utilized by the motion controller of FIG. 1A.

When a move command is encountered, for example, a series of intermediate position reference values are generated for the motion controller. Thus, as shown in FIG. 1C, if the move command specifies a new position $x_{end}$, then a series of position reference values $x_{ref(1)} \ldots x_{ref(n)}$ are generated that extend from an initial position x0 to the new position $x_{end}$. In practice, the position reference values may be provided in the form of delta position information (change in position since the last update) rather than absolute position information. The position reference values are updated each millisecond, for example.

The reference positions are provided as position commands to a position feedback control loop 34 with a new position reference value being provided every few milliseconds or so. In conventional fashion, the position control loop 34 includes a proportional-integral (PI) gain element 36 that provides a velocity command to a velocity feedback control loop 38. In turn, the velocity control loop 38 comprises a PI gain element 40 that provides a current or torque command to a current/torque feedback control loop 42. The current control loop 42 includes a PI gain element 44 that controls the amplitude of the current provided to the motor. In this way, as new position references are generated, the motor "chases after" or follows the position references until the new position $x_{end}$ is reached.

FIGS. 2–19 show a preferred method and system for generating position reference values for the position control loop 34. A method and system for generating position reference values in connection with a move command are shown in FIGS. 2–14, which are discussed in Section B below. A method and system for generating position reference values in connection with a jog command are shown in FIGS. 15–19, which are discussed in Section C below.

B. Move Profiles

Figure 2:
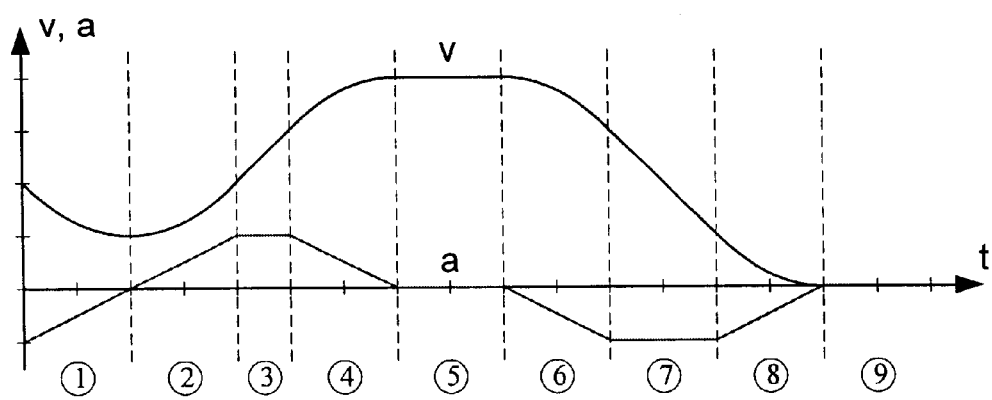
FIG. 2 is a graph of a generic move profile in accordance with a preferred embodiment of the invention.

Referring now to FIG. 2, a graph of a generic move profile is illustrated. According to the preferred method, any move profile that is required to move a motor from an initial position to a new position can be described using the generic move profile of FIG. 2. The generic move profile comprises nine polynomial segments 1–9, which are each defined by respective polynomial coefficients. As described in greater detail below, there are various types of move profiles that are all specific examples of the generic move profile of FIG. 2 (see e.g., FIGS. 5A–5C and 9A–9R). When a move command is received, various parameters are examined (such as initial velocity and acceleration) and compared with various limit conditions to determine which specific type of move profile will permit movement of the motor shaft from the initial position to the new position. The coefficients for the various polynomial segments are then calculated on this basis. In practice, some of the polynomial coefficients are calculated as the parameters are examined and compared, since the polynomial coefficients are sometimes required knowledge for a given comparison to occur.

Once the polynomial coefficients have all been calculated, the system has available to it a complete set of polynomials including coefficients that characterize the planned movement of the motor shaft during each segment. The system also has available to it the starting points (in terms of position and time) of each segment. Based on this information, the position reference values can be calculated much more quickly during shaft movement because most of the calculations required to generate the position reference values have already been performed.

The generic move profile shown in FIG. 2 will now be described in greater detail. In general, the move profile is formed of nine segments each of which has different requirements for position x(t), velocity v(t), acceleration a(t), and jerk j(t). The nine segments are characterized by the following features. During segment 1, the acceleration a(t) is forced to zero. During segment 2, the acceleration a(t) is forced to maximum acceleration or deceleration. During segment 3, the acceleration a(t) is maintained at the maximum acceleration or deceleration, such that the velocity increases/decreases as fast as possible. During segment 4, the acceleration a(t) is forced to zero while the velocity tapers off towards its maximum value. During segment 5, the acceleration a(t) is maintained at zero and the velocity v(t) is maintained at maximum velocity. During segment 6, the a(t) is forced to maximum deceleration. During segment 7, the acceleration a(t) is maintained at the maximum deceleration, such that the velocity decreases at the maximum rate. During segment 8, the deceleration a(t) is forced to zero, such that the rate of decrease of velocity begins to taper off as the velocity approaches zero. During segment 9, the acceleration a(t) and the velocity v(t) are maintained at zero.

Depending on the type of move and the actual parameters for new position $X_{end}$, maximum velocity $v_{max}$, maximum acceleration $a_{max}$, and maximum deceleration $d_{max}$, all or only some of these segments may be utilized. If a segment is not utilized, the duration of the segment is set equal to zero.

Each segment has different specific polynomials or functions (including coefficients) for position x(t), velocity v(t), acceleration a(t) and jerk j(t), however, the mathematical functions for these parameters may be generically stated for all of the segments as follows:

$$j(t) = j_b$$

$$a_d(t) = \int_{t_b}^{t} j(\tau) d\tau$$

$$= \int_{t_b}^{t} j_b d\tau$$

$$= j_b * (t - t_b)$$

$$a(t) = a_b + a_d(t)$$

$$v_d(t) = \int_{t_b}^{t} a(\tau) d\tau$$

$$= \int_{0}^{t-t_b} a(\tau + t_b) d\tau$$

$$= \int_{0}^{t-t_b} (a_b + j_b * \tau) d\tau$$

$$= a_b * (t - t_b) + j_b * \frac{(t - t_b)^2}{2}$$

$$= \left(a_b + \frac{j_b}{2} * (t - t_b)\right) * (t - t_b)$$

$$v(t) = v_b + v_d(t)$$

$$x_d(t) = \int_{t_b}^{t} v(\tau) d\tau$$

$$= \int_{0}^{t-t_b} v(\tau + t_b) d\tau$$

$$= \int_{0}^{t-t_b} \left(v_b + a_b * \tau + j_b * \frac{\tau^2}{2}\right) d\tau$$

$$= v_b * (t - t_b) + a_b * \frac{(t - t_b)^2}{2} + j_b * \frac{(t - t_b)^3}{6}$$

$$= \left(v_b + \left(\frac{a_b}{2} + \frac{j_b}{6} * (t - t_b)\right) * (t - t_b)\right) * (t - t_b)$$

$$x(t) = x_b + x_d(t)$$

Within these functions, x is position, v is velocity, a is acceleration, j is jerk and t is time. Additionally, in the discussion below, the number following these letters indicates segment number. Finally, in the index b indicates the beginning of a segment and the index d indicates the difference between the end and the beginning of the segment. Therefore, for example, the parameter $a3_b$ is the acceleration at the beginning of segment 3. Section B(1) below describes the manner in which the coefficients $t_b$, $x_b$, $v_b$, $a_b$, and $j_b$ are calculated for each segment of a trapezoidal move profile (in which a continuous acceleration profile is not required). Section B(2) below describes the manner in which these coefficients are generated for each segment of an S-curve move profile (in which a continuous acceleration profile is required). By calculating these coefficients, the calculations required to calculate position reference values during execution of a move command is greatly reduced. In particular, as a move command is executed, the position reference values may be generated based on the following two equations, which are given immediately above and are repeated now for convenience:

$$x(t) = x_b + x_d(t)$$

$$x_d(t) = \left(v_b + \left(\frac{a_b}{2} + \frac{j_b}{6} * (t - t_b)\right) * (t - t_b)\right) * (t - t_b)$$

The result x(t) of the first equation is the parameter that is used as a position reference value by the position control loop. On the right hand side of the first equation, the parameter $x_b$ is one of the coefficients that is precalculated for each segment, as described below. The parameter $x_d(t)$ can be calculated using the second of the above two equations, which is a function of time and of the coefficients that are precalculated for each of the segments, as described below. It is thus seen that it is possible to generate position reference values as a function of time based only on the knowledge of time (which can be obtained from a system clock) and on the precalculated coefficients. Thus, the amount of computation to generate position reference values during execution of a move command can be dramatically reduced.

1. Trapezoidal Move profiles

Figure 3:
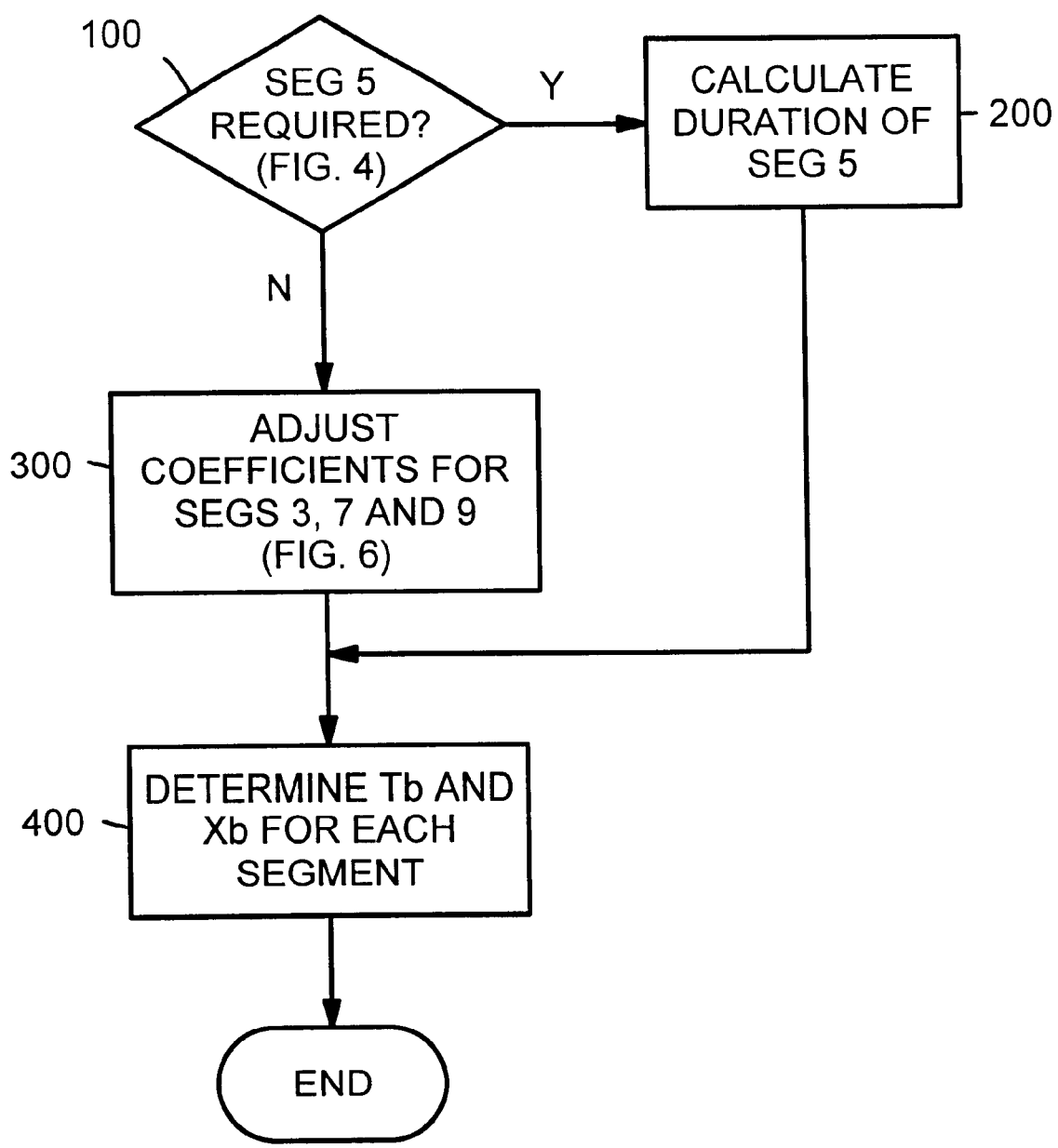
FIG. 3 is a flowchart of a process used to specify values for parameters for a trapezoidal move profile.
Figure 4:
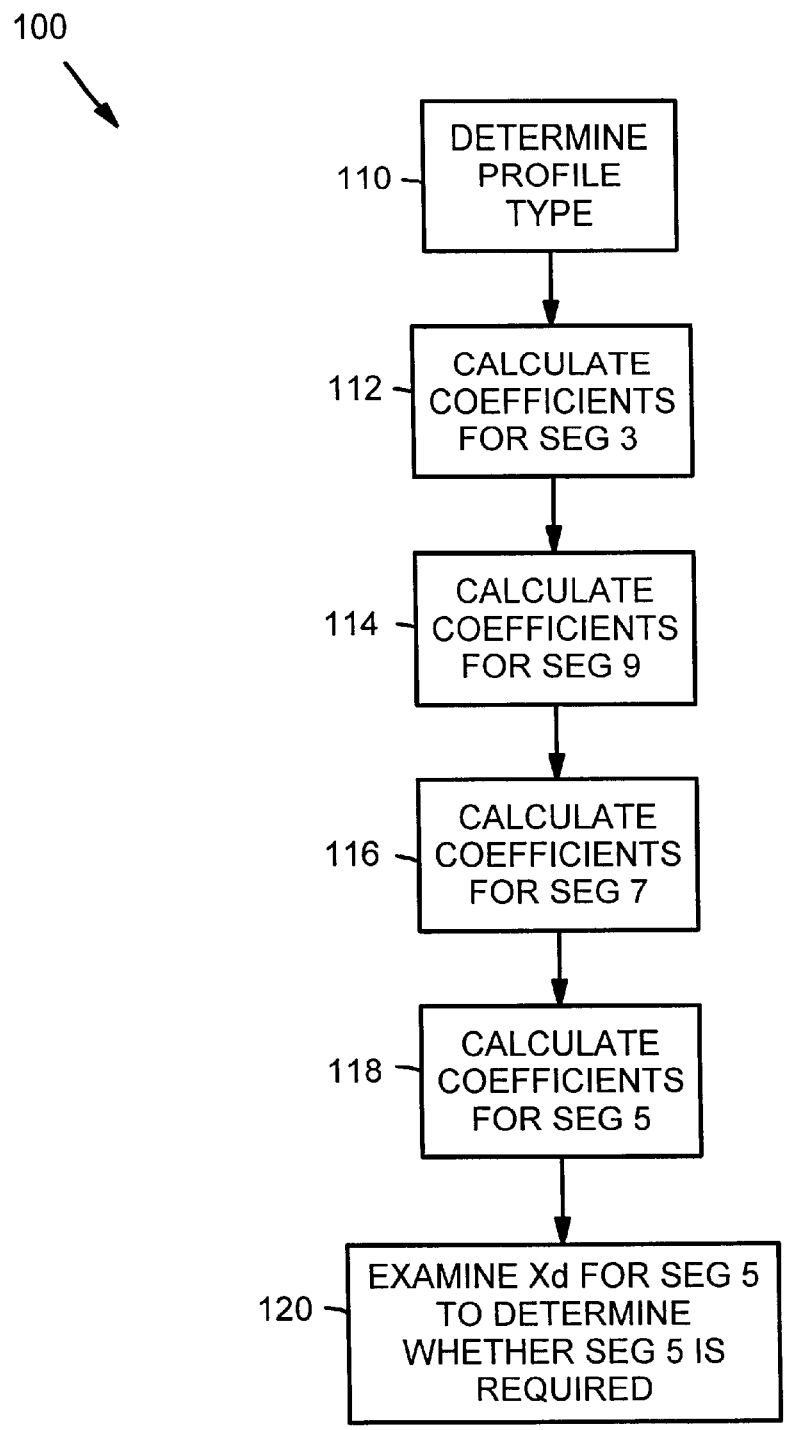
FIG. 4 is a flowchart showing one of the steps of FIG. 3 in greater detail.

Referring now to FIG. 3, a flow chart of a preferred process for characterizing a trapezoidal move profile is illustrated. By way of overview, the process is separated into three steps. The first step determines whether the profile requires segment 5 (Step 100). If segment 5 is required, the second step calculates the duration of this segment (Step 200), or if segment 5 is not required, the second step adjusts the remaining segments according to $x_{end}$ (Step 300). Finally, the third step calculates the coefficients $t_b$ and $x_b$ for each segment (Step 400). Because a continuous acceleration profile is not required for a trapezoidal move, segments 1, 2, 4, 6 and 8 are not utilized.

Figure 5A:
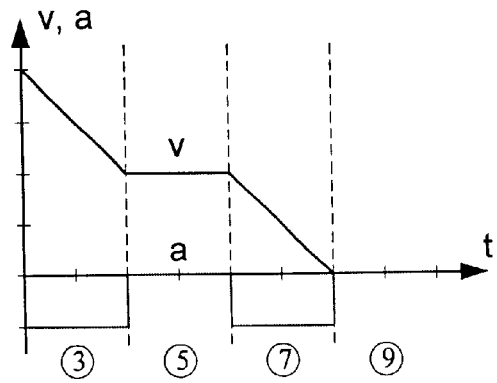
FIGS. 5A–5C are several different types of trapezoidal move profiles.
Figure 5B:
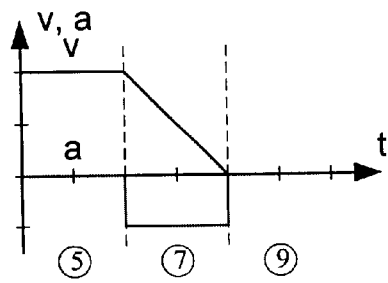
Figure 5C:
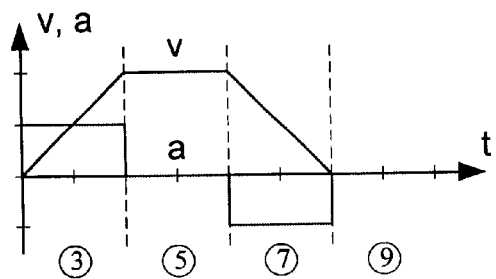

In particular, at Step 100, it is determined whether segment 5 is required. Step 100 is shown in greater detail in FIG. 4. At Step 110, the type of move profile that is required is determined. For a trapezoidal move, there are three basic types of move profiles, which are shown in FIGS. 5A–5C.

For a Type A move profile, the initial velocity v0 is greater than the maximum velocity $v_{max}$ (i.e., v0>$v_{max}$). The Type A move profile is shown in FIG. 5A. If the move profile is a Type A move profile, then the acceleration $a3_b$ for segment 3 is set equal in to the maximum deceleration $d_{max}$ (which is defined to be positive) multiplied by minus 1 as follows:

$$a3_b = -d_{max}$$

For a Type B move profile, the initial velocity is equal to the maximum velocity (i.e., v0=$v_{max}$). The Type B move profile is shown in FIG. 5B. If the move profile is a Type B move profile, then the acceleration $a3_b$ for segment 3 is set equal to zero as follows:

$$a3_b = 0$$

For a Type C move profile, the initial velocity is less than the maximum velocity $v_{max}$ (i.e., v0<$v_{max}$). The Type C move profile is shown in FIG. 5C. If the move profile is a Type C move profile, then the acceleration $a3_b$ for segment 3 is set equal to the maximum acceleration $a_{max}$ as follows:

$$a3_b = a_{max}$$

It is therefore seen that by determining the initial velocity and comparing the initial velocity to the maximum velocity, the acceleration that is required during segment 3 and therefore the type of trapezoidal move profile that can be utilized is determined.

In Steps 112 to 118, based on the profile type, additional segment coefficients are calculated. In particular, at Step 112, the values for segment 3 are calculated. Initially, the beginning velocity $v3_b$ for segment 3 is set equal to the initial velocity v0:

$$v3_b = v0$$

If the beginning acceleration $a3_b$ for segment 3 is not equal to zero (i.e., the trapezoidal move has either a Type A move profile or a Type C move profile) then the duration $t3_d$ of segment 3 is calculated as follows:

$$t3_d = \frac{v_{max} - v3_b}{a3_b}$$

Otherwise, if the trapezoidal move has a Type B move profile (i.e., the acceleration for segment 3 is equal to zero) then the duration $t3_d$ of segment 3 is set equal to zero:

$$t3_d = 0$$

In either case, the change in position $x3_d$ during segment 3 is calculated as follows:

$$x3_d = \left(v3_b + \frac{a3_b}{2} * t3_d\right) * t3_d$$

$$= \frac{v3_b + v_{max}}{2} * t3_d$$

It may be noted that only the second of the above two equations is actually calculated. The first of the above two equations is given merely for derivational purposes to facilitate understanding. Where useful for understanding, additional equations will be given in this manner throughout the specification.

At Step 114, the values for segment 9 are calculated as follows:

$$a9_b = 0$$

$$v9_b = 0$$

At Step 116, the values for segment 7 are calculated as follows:

$$a7_b = -d_{max}$$

$$v7_b = v_{max}$$

$$x7_d = -\frac{v7_b}{a7_b}$$

$$= \frac{v_{max}}{d_{max}}$$

$$x7_d = \left(v7_b + \frac{a7_b}{2} * t7_d\right) * t7_d$$

$$= \frac{v7_b}{2} * t7_d$$

At Step 118, the values for segment 5 are calculated as follows:

$$a5_b = 0$$

$$v5_b = v_{max}$$

$$x5_d = x_{end} - x7_d - x3_d$$

At Step 120, the values that have been calculated above are examined to determine whether segment 5 is required. In particular, if the change in position $x5_d$ during segment 5 is greater than or equal to zero, then segment 5 is required. In this event, referring back to FIG. 3, then the duration $t5_d$ of segment 5 is calculated by dividing the change in position $x5_d$ of segment 5 by the velocity $v5_b$ of segment 5 at Step 200. The remaining values determined during Step 100 are then utilized. Step 200 is therefore summarized with the following set of equations:

$v9_b$=$v9_b$(Step 100)

$v7_b$=$v7_b$(Step 100)

$v5_b$=$v5_b$(Step 100)

$v3_b$=$v3_b$(Step 100)

$t7_d$=$t7_d$(Step 100)

$$t5_d = \frac{x5_d(\text{Step } 100)}{v5_b(\text{Step } 100)}$$

$t3_d$=$t3_d$(Step 100)

$x7_d$=$x7_d$(Step 100)

$x5_d$=$x5_d$(Step 100)

$x3_d$=$x3_d$(Step 100)

In the set of equations given above, "$v9_b$=$v9_b$ (Step 100)" means that the coefficient $v9_b$ is set equal to the value of $v9_b$ that was determined in Step 100. This nomenclature is used throughout the specification.

If the change in position $x5_d$ during segment 5 is less than zero, then segment 5 is not required. In this instance, because the change in position $x5_d$ during segment 5 is negative, the values for the remaining segments are adjusted in Step 300. Step 300 is shown in greater detail in FIG. 6.

Figure 6:
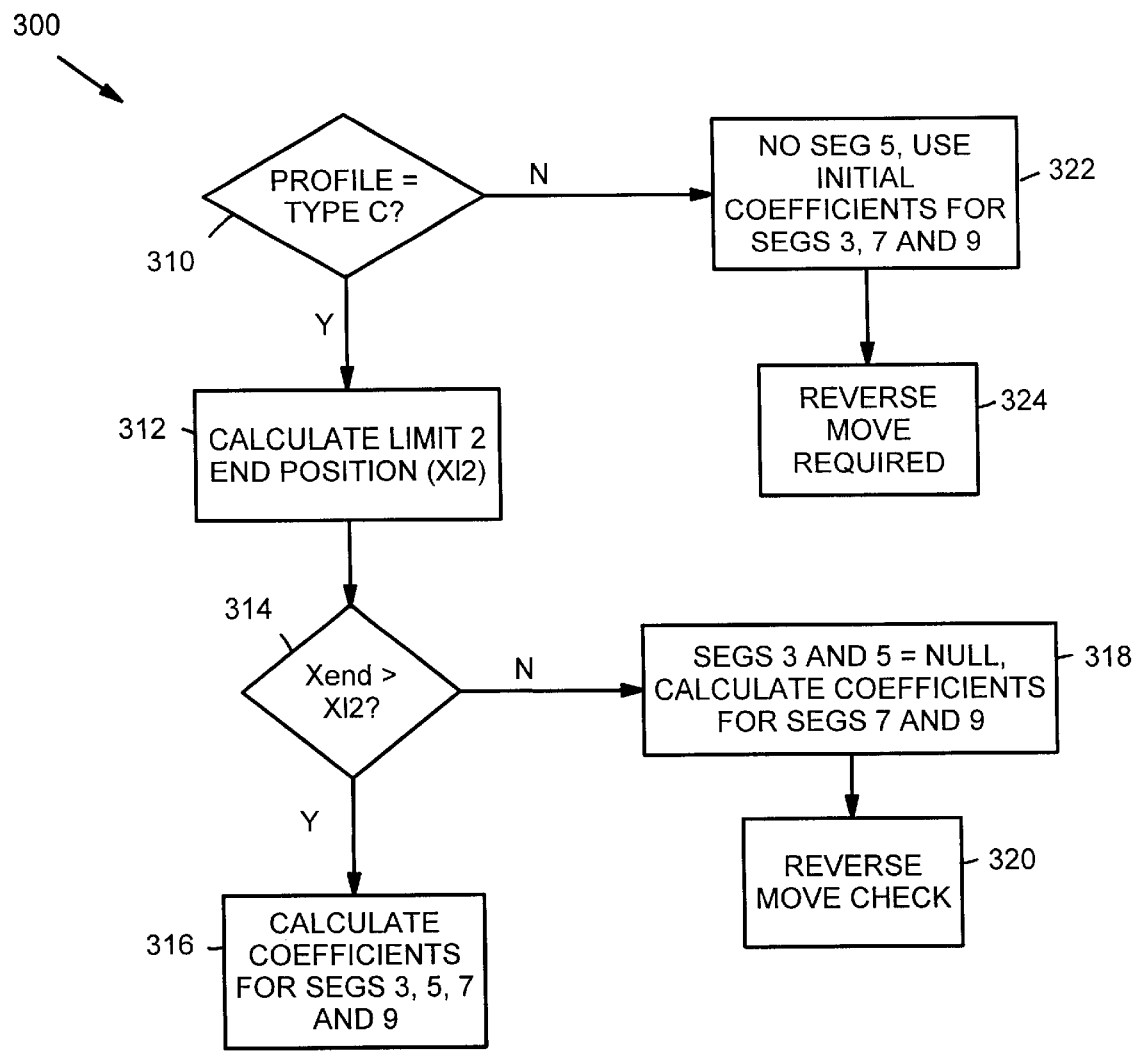
FIG. 6 is a flowchart showing another one of the steps of FIG. 3 in greater detail.

Referring now to FIG. 6, at Step 310, it is first determined whether the profile is a Type C move profile. In practice, Step 310 may be performed in the same manner as Step 100, namely, by examining the acceleration $a3_b$ at the beginning of segment 3 and determining whether the acceleration $a3_b$ is greater than zero.

At Step 312, if the profile is a Type C move profile, then the end position $X_{l2}$ of limit 2 is calculated as follows:

$v7_b$=$v3_b$(Step 100)

$$t7_d = -\frac{v7_b}{a7_b}$$

$$x7_d = \left(v7_b + \frac{a7_b}{2}*t7_d\right)*t7_d$$

$$= \frac{v7_b}{2}*t7_d$$

$x_{l2}$=$x7_d$

The end position $x_{l2}$ of limit 2 is used to test a limit condition. The testing of limit conditions in this manner is similar in principle to the limit condition that was tested in Step 110, namely, the comparison of the acceleration $a3_b$ with the maximum acceleration $a_{max}$, except that the tested parameter is position. In the present scenario, the parameters of the limit condition that is tested are not known but rather must be calculated. The notation $x_l$ is used herein for these types of parameters, which are always position parameters.

At Step 314, the new position $x_{end}$ is compared with the end position $x_{l2}$ of limit 2. At Step 316, if the new position $x_{end}$ is greater than the end position $x_{l2}$ of limit 2, then the values for segments 3, 5, 7 and 9 are calculated as follows:

$v9_b$=$v9_b$(Step 100)

$$t7_d = -\frac{v7_b}{a7_b}$$

$$t3_d = \frac{v7_b - v3_b}{a3_b}$$

$$x7_d = \left(v7_b + \frac{a7_b}{2}*t7_d\right)*t7_d$$

$$= \frac{v7_b}{2}*t7_d$$

$$= -\frac{v7_b^2}{2*a7_b}$$

$$x3_d = \left(v3_b + \frac{a3_b}{2}*t3_d\right)*t3_d$$

$$= \frac{v3_b + v7_b}{2}*t3_d$$

$$= \frac{v7_b^2 - v3_b^2}{2*a3_b}$$

$$x_{end} = x3_d + x7_d$$

$$= \frac{v7_b^2 - v3_b^2}{2*a3_b} - \frac{v7_b^2}{2*a7_b}$$

$$= \frac{v7_b^2(a7_b - a3_b)}{2*a3_b*a7_b} - \frac{v3_b^2}{2*a3_b}$$

$$v7_b = \sqrt{\frac{(2*x_{end}*a3_b + v3_b^2)*a7_b}{a7_b - a3_b}}$$

$v5_b$=$v7_b$ $v3_b$=$v3_b$(Step 100)

$$t7_d = -\frac{v7_b}{a7_b}$$

$t5_d$=0

$$t3_d = \frac{v7_b - v3_b}{a3_b}$$

$$x7_d = \left(v7_b + \frac{a7_b}{2}*t7_d\right)*t7_d$$

$$= \frac{v7_b}{2}*t7_d$$

$x5_d$=0

$x3_d$=$x_{end}$-$x7_d$

If the new position $x_{end}$ is not greater than the end position $x_{l2}$ of limit 2 then the values for segments 3, 5, 7 and 9 are determined at Step 318 as follows:

$v9_b$=$v9_b$(Step 100)

$v7_b$=$v3_b$(Step 100)

$v5_b$=$v7_b$ $v3_b$=$v3_b$(Step 100)

$t7_d$=$t7_d$(Limit 2)

$t5_d$=0

$t3_d$=0

$x7_d$=$x7_d$(Limit 2)

$x5_d=0$ $x3^d=0$

A reverse move is required in Step 320, if the parameter $x_{end}$ is less than the parameter $x_{l2}$. This indicates that the initial velocity of the motor and/or the relatively close distance between the initial position and the new position causes the motor to travel beyond the new position before the motor shaft can be stopped. A reverse move is simply a separate, new move in the opposite direction.

Referring back to FIG. 3, at Step 322, if the profile is not a Type C move profile, but rather is a Type A or Type B move profile, indicating that no segment 5 is required, then the values that were determined for segments 3, 7 and 9 during Step 100 are utilized, and the time and position difference values for segment 5 are set equal to zero. Step 322 is summarized by the following set of equations:

$v9_b=v9_b$(Step 100)

$v7_b=v7_b$(Step 100)

$v5_b=v5_b$(Step 100)

$v3_b=v3_b$(Step 100)

$t7_d=t7_d$(Step 100)

$t5_d=0$ $t3_d=t3_d$(Step 100)

$x7_d=x7_d$(Step 100)

$x5_d=0$ $x3_d=x3_d$(Step 100)

Again, a reverse move is required in Step 324.

After the performance of either Step 200 or Step 300 (i.e., depending on the outcome of Step 100), the next step performed is Step 400. In Step 400, the beginning time $t_b$ and the beginning position $x_b$ are calculated for each segment. This step is performed in straightforward fashion using parameters that have previously been calculated, as follows:

$t3_b=0$ $t5_b=t3_d$ $t7_b=t5_b+t5_d$ $t9_b=t7_b+t7_d$ $x3_b=0$ $x5_b=x3_d$ $x7_b=x5_b+x5_d$ $x9_b=x7_b+x7_d$

As previously noted, all three of the trapezoidal move profiles types comprise at most segments 3, 5, 7 and 9 and not segments 1, 2, 4, 6, and 8. These remaining segments are used to meet the requirement in the context of an S-curve move profile the requirement for a continuous acceleration. In the context of a trapezoidal move profile, a jump from zero acceleration to non-zero acceleration is considered acceptable.

2. S-Curve Move Profiles

Figure 7:
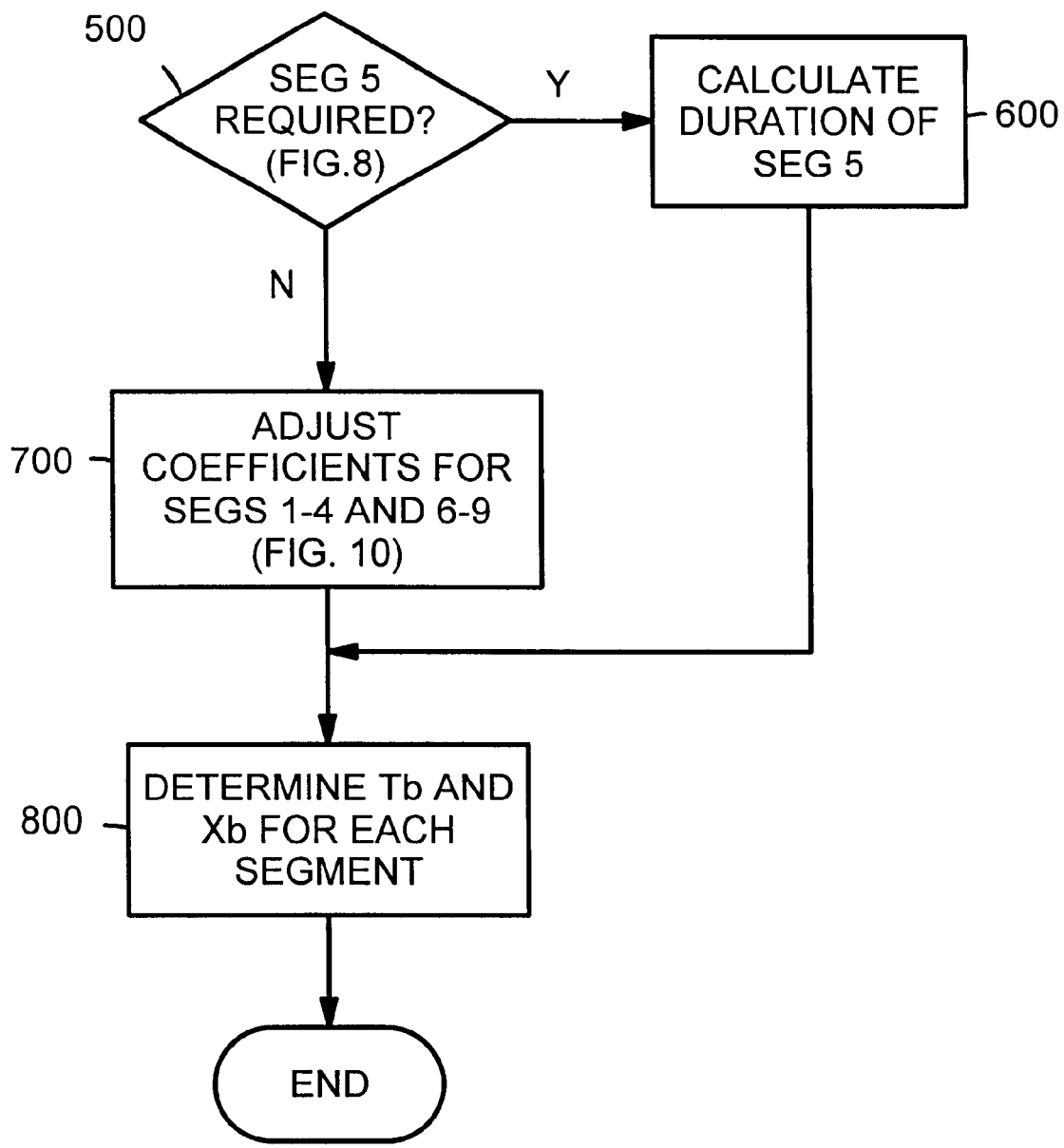
FIG. 7 is a flowchart of a process used to specify values for parameters for an S-curve move profile.
Figure 8:
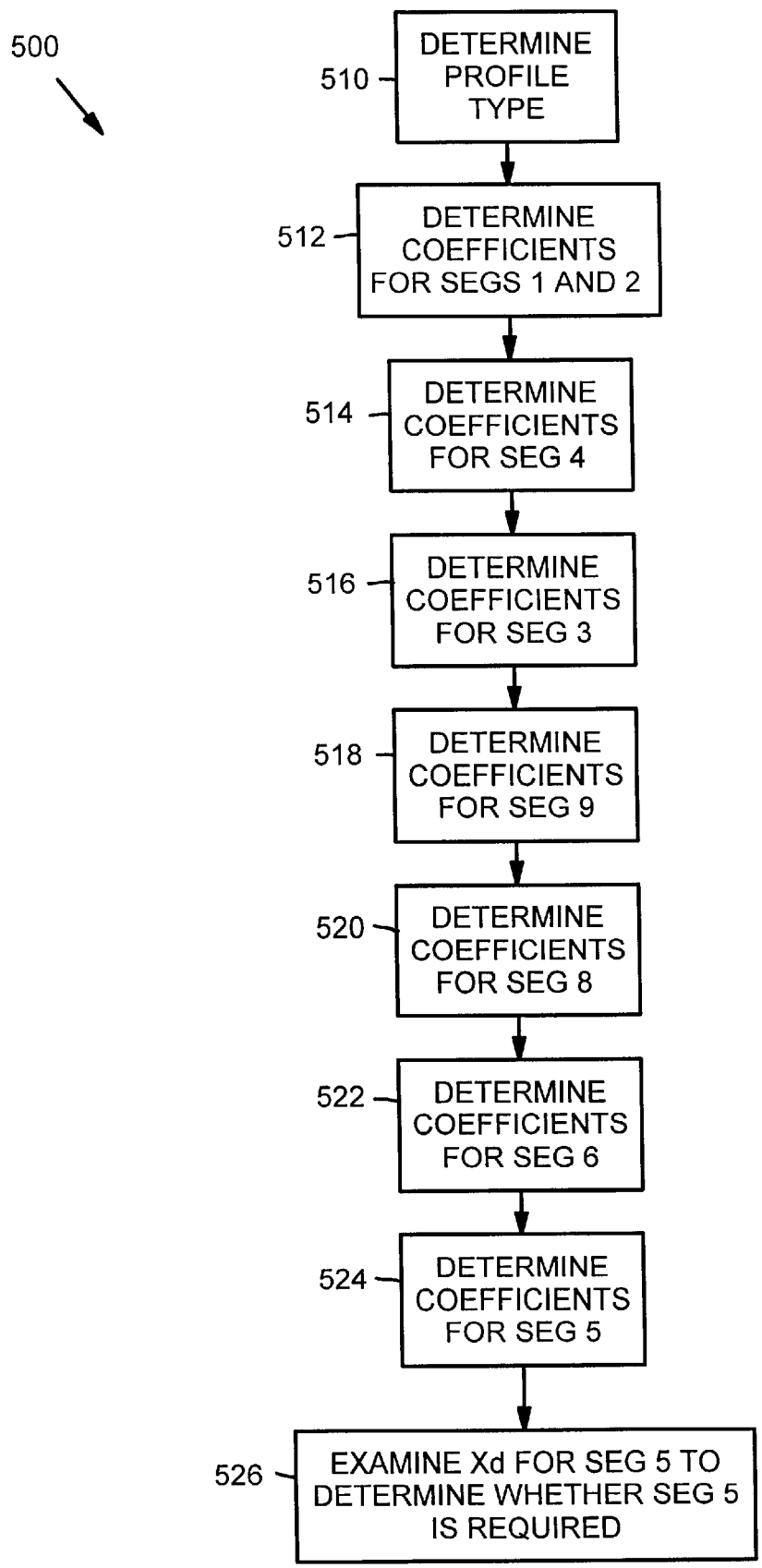
FIG. 8 is a flowchart showing one of the steps of FIG. 7 in greater detail.
Figure 9A:
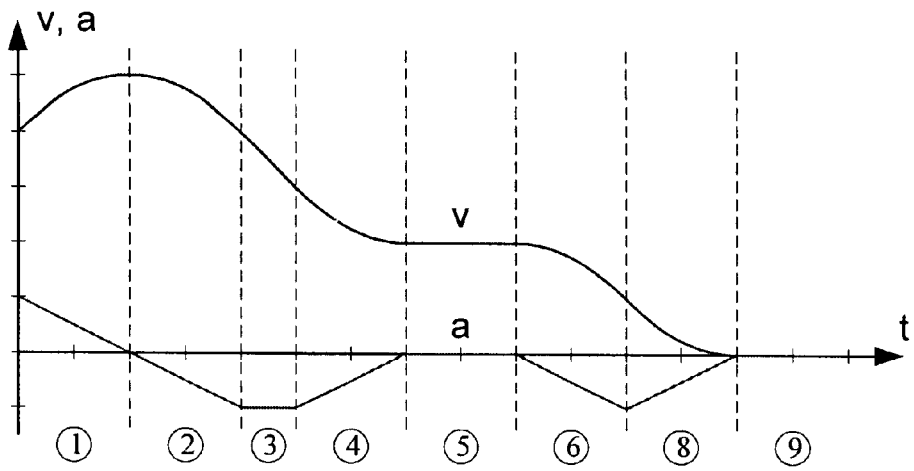
FIGS. 9A–9R are various different types of S-curve move profiles.
Figure 9B:
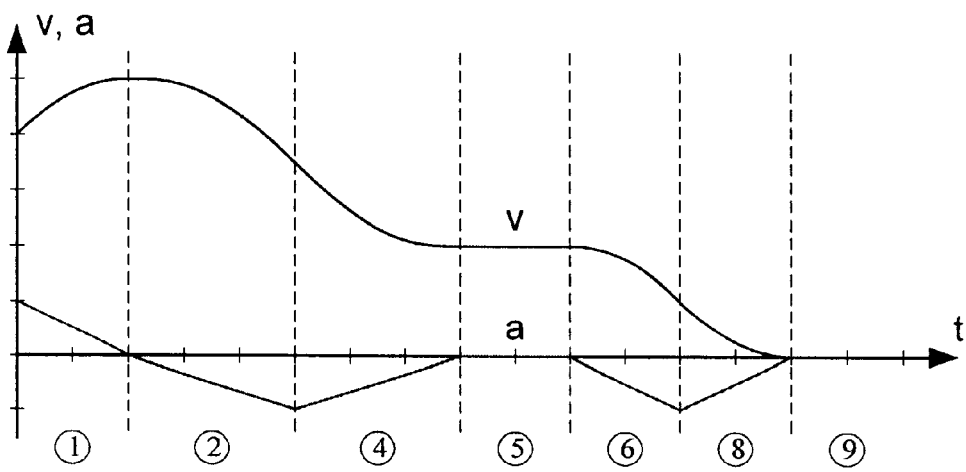
Figure 9C:
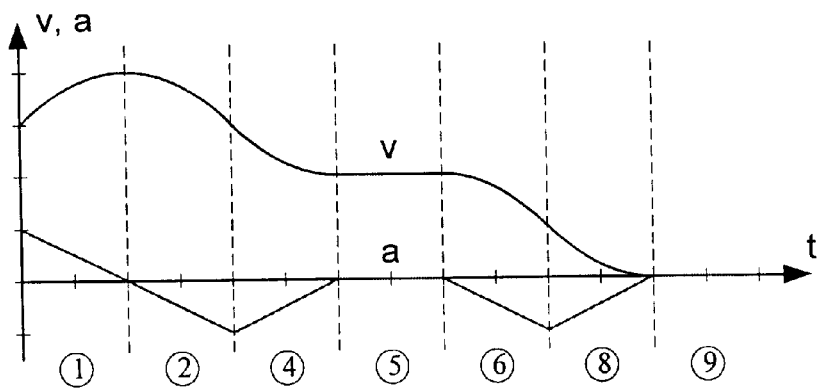
Figure 9D:
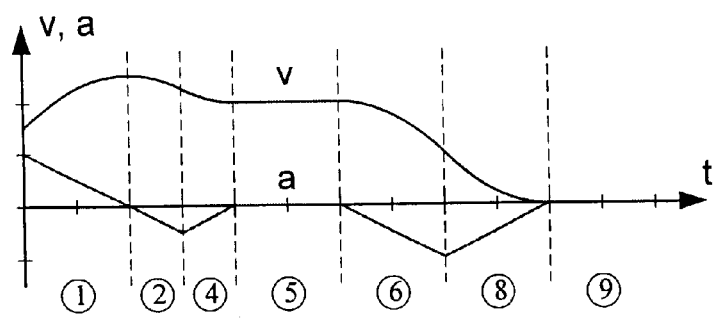
Figure 9E:
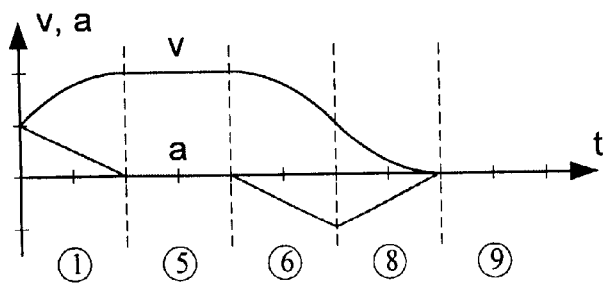
Figure 9F:
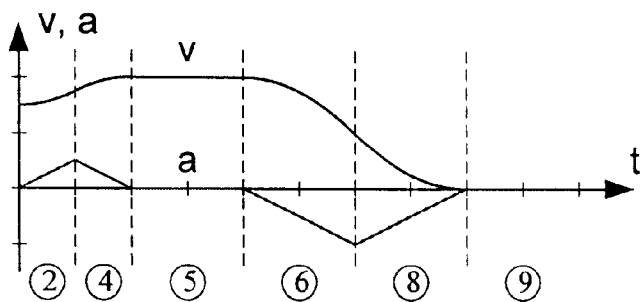
Figure 9G:
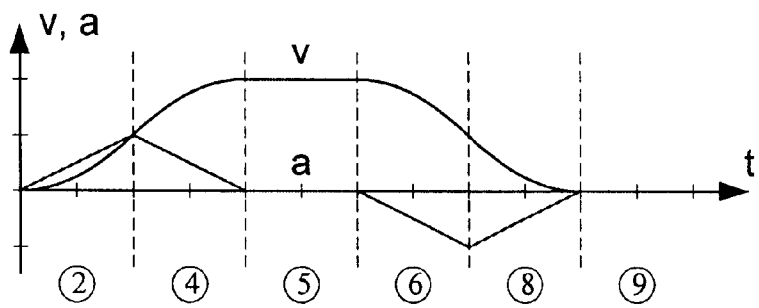
Figure 9H:
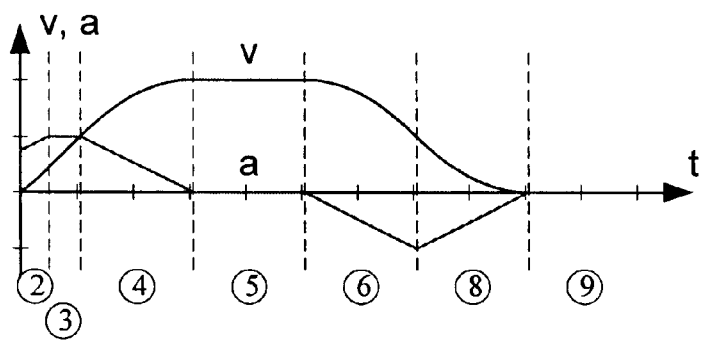
Figure 9I:
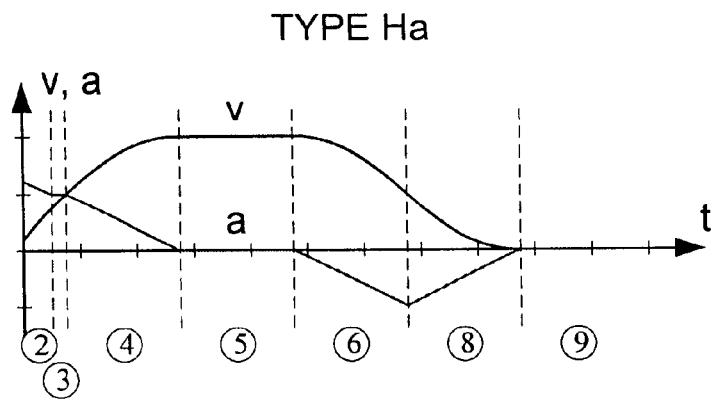
Figure 9J:
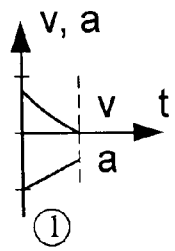
Figure 9K:
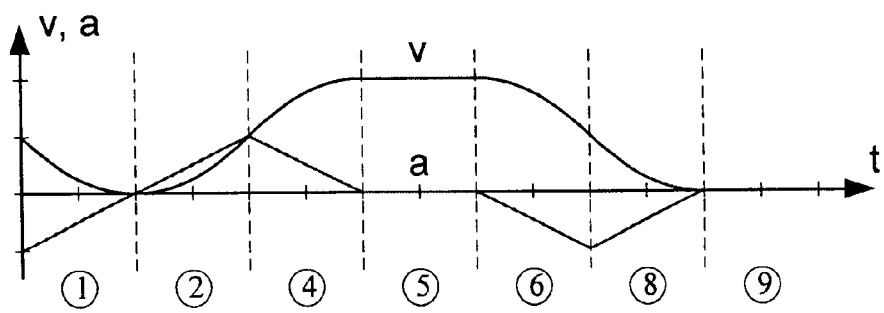
Figure 9L:
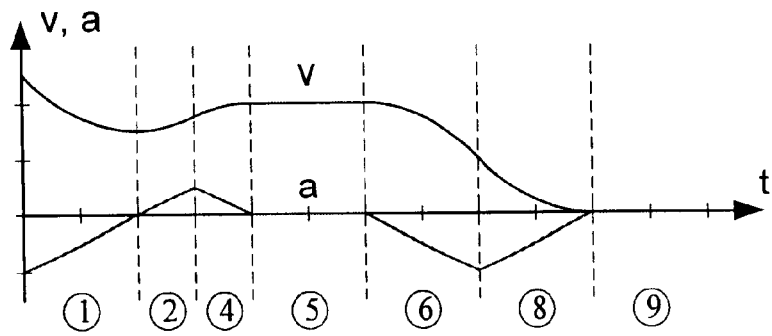
Figure 9M:
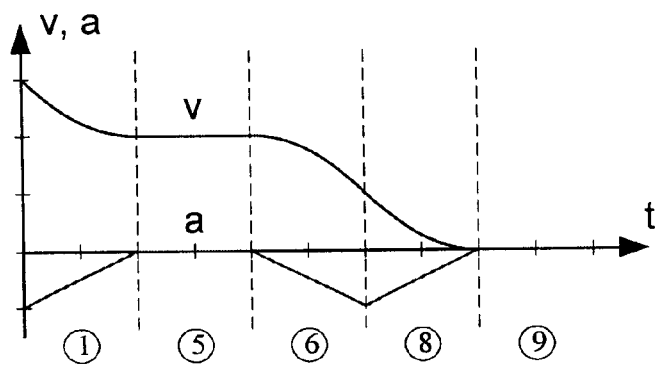
Figure 9N:
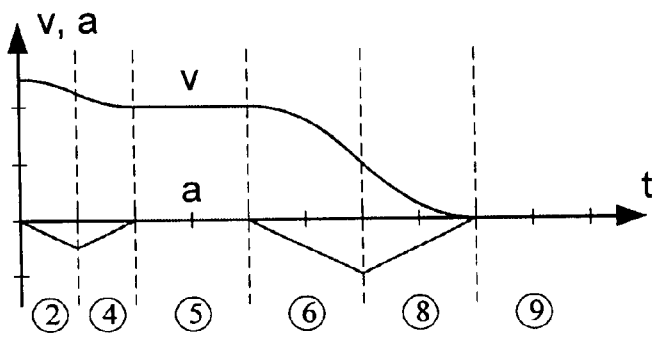
Figure 9O:
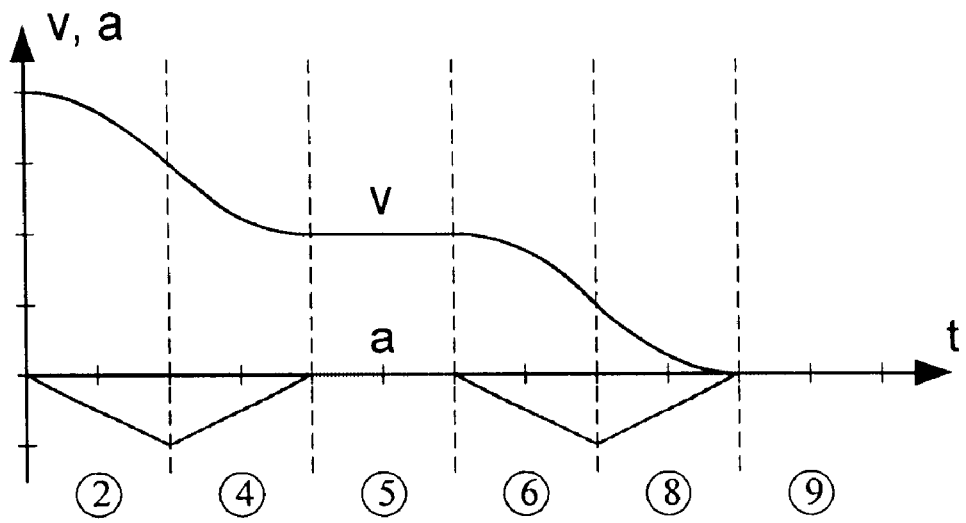

Referring now to FIG. 7, a flowchart of a preferred process for characterizing an S-Curve move profile is illustrated. By way of overview, the process is separated into three steps. The first step determines whether the profile requires segment 5 (Step 500). If segment 5 is required, the second step calculates the duration of this segment (Step 600), or if segment 5 is not required, the second step adjusts the remaining segments according to $x_{end}$ (Step 700). Finally, the third step calculates the coefficients $t_b$ and $x_b$ for each segment (Step 800). In particular, at Step 500, it is determined whether Segment 5 is required. Step 500 is shown in greater detail in FIG. 8. At Step 510, the type of move profile that is required is determined. For an S-curve move, there are numerous types of move profiles, which are shown in FIGS. 9A–9R.

The various types of S-curve move profiles are distinguished according to several key features. The first key feature that is used to distinguish the various types of S-curve move profiles is the initial acceleration a0. The S-curve move profile types that have an initial acceleration a0 that is greater than or equal to zero (i.e., a0>0) are designated with the letter a and shown in FIGS. 9A–9I (Types $A_a$ to $H_a$). The S-curve move profile types that have an acceleration a0 that is less than zero (i.e., a0<0) are designated with the letter d and are shown in FIGS. 9J–9R (Types $A_d$ to $H_d$).

In order to simplify the following algorithm the parameters starting segment ss, maximum jerk during acceleration $ja_{max}$, and maximum jerk during deceleration $jd_{max}$ are defined as follows:

$$ja_{max} = \frac{a_{max}^2}{v_{max}}$$

$$jd_{max} = \frac{d_{max}^2}{v_{max}}$$

The remaining key features that are used to distinguish the various types of S-curve move profiles are the difference in velocity $v1_d$ for segment 1, the difference in velocity $v14_d$ for segments 1–4, and the difference in velocity $v24_d$ for segments 2–4. If the initial acceleration a0 is not equal to zero (i.e., a0≠0), then these parameters may be calculated according to the following equations:

$$v1_d = \frac{a0^2}{2*ja_{max}}$$

$v14_d=v0-v1_d-v_{max}$ $v24_d=v0+v1_d-v_{max}$

Otherwise, if the initial acceleration is equal to zero (i.e., a0=0), then the difference in velocity for segment 1 may be calculated as follows:

$v1_d=0$

If the initial velocity is not equal to zero (i.e., v0≠0), then the difference in velocity $v14_d$ may be calculated as follows:

$v14_d=v0-v_{max}$

Otherwise, the difference in velocity $v14_d$ may be calculated as follows:

$v14_d=-v_{max}$

In either case, the difference in velocity $v24_d$ may be calculated as follows:

$v24_d=v14_d$

Based on these parameters, the various types of move profiles are then differentiated from each other as follows. Specifically for a Type $A_a$ move profile, the difference in velocity $v24_d$ for segments 2–4 is greater than the maximum velocity $v_{max}$ (i.e., $v24_d > v_{max}$). Two variations of the Type $A_a$ move profile are shown in FIGS. 9A and 9B. The profile shown in FIG. 9A is a fast deceleration profile, which means that the acceleration $a3_b$ for segment 3 is set equal to the maximum deceleration. The profile shown in FIG. 9B is a slow deceleration profile, which means that the duration of segments 2 and 4 are lengthened and segment 3 is eliminated such that the maximum deceleration is not used. Either the profile shown in FIG. 9A or the profile shown in FIG. 9B may be employed depending on the application.

If the fast deceleration profile is employed, then the following coefficients are assigned values according to the following equations:

$$ss=1$$

$$j1_b = -ja_{max}$$

$$j2_b = -jd_{max}$$

$$j4_b = jd_{max}$$

$$a3_b = -d_{max}$$

where ss is the starting segment.

If the slow deceleration profile is employed, then the following coefficients are assigned values according to the following equations:

$$ss=1$$

$$j1_b = -ja_{max}$$

$$v24_d = \frac{d_{max}^2}{j4_b}$$

$$j4_b = \frac{d_{max}^2}{v24_d}$$

$$j2_b = -j4_b$$

$$a3_b = -d_{max}$$

For a Type $B_a$ move profile, the difference in velocity $v24_d$ between segments 2 and 4 is equal to the maximum velocity $v_{max}$ (i.e., $v24_d = v_{max}$). The Type $B_a$ move profile is shown in FIG. 9C. If the profile is a Type $B_a$ move profile, then the following coefficients are assigned values according to the following equations:

$$ss=1$$

$$J1_b = -ja_{max}$$

$$j2_b = -jd_{max}$$

$$j4_b = jd_{max}$$

$$a3_b = -d_{max}$$

For a Type $C_a$ move profile, the difference in velocity between segments 2 and 4 is greater than zero (i.e., $v24_d > 0$). The Type $C_a$ move profile is shown in FIG. 9D. If the profile is a Type $C_a$ move profile, then the following coefficients are assigned values according to the following equations:

$$ss=1$$

$$j1_b = -ja_{max}$$

$$j2_b = -jd_{max}$$

$$j4_b = jd_{max}$$

$$a3_b = -\sqrt{v24_d * jd_{max}}$$

For a Type $D_a$ move profile, the difference in velocity $v24_d$ between segments 2 and 4 is equal to zero (i.e., $v24_d = 0$). The Type $D_a$ move profile is shown in 9E. If the profile is a Type $D_a$ move profile, then the following coefficients are assigned values according to the following equations:

$$ss=1$$

$$j1_b = -ja_{max}$$

$$j2_b = -jd_{max}$$

$$j4_b = jd_{max}$$

$$a3_b = 0$$

For a Type $E_a$ move profile, the initial velocity v0 is greater than the difference in velocity for segment 1 (i.e., $v0 > v1_d$). The Type $E_a$ move profile is shown in FIG. 9F. If the profile is a Type $E_a$ move profile, then the following coefficients are assigned values according to the following equations:

$$ss=2$$

$$j1_b = 0$$

$$j2_b = ja_{max}$$

$$j4_b = -ja_{max}$$

$$a3_b = \sqrt{-v14_d * ja_{max}}$$

For a Type $F_a$ move profile, the initial velocity v0 is equal to the difference in velocity v1 for segment 1 and the initial acceleration a0 is less than or equal to the maximum acceleration $a_{max}$ (i.e., $v0 = v1_d$ & $a0 \leq a_{max}$). The Type $F_a$ move profile is shown in FIG. 9G. If the profile is a Type $F_a$ move profile, then the following coefficients are assigned values according to the following equations:

$$ss=2$$

$$j1_b = 0$$

$$j2_b = ja_{max}$$

$$j4_b = -ja_{max}$$

$$a3_b = a_{max}$$

For a Type $G_a$ move profile, the initial velocity v0 is less than the difference in velocity $v1_d$ for segment 1 and the initial velocity a0 is less than or equal to the maximum acceleration $a_{max}$ (i.e., $v0 < v1_d$ & $a0 \leq a_{max}$). The Type $G_a$ move profile is shown in FIG. 9H. If the profile is a Type $G_a$ move profile, then the following coefficients are assigned values according to the following equations:

$$ss=2$$

$$j1_b = 0$$

$$j2_b = ja_{max}$$

$j4_b = -ja_{max}$ $a3_b = a_{max}$

For a Type $H_a$ move profile, the initial velocity $v0$ is less than or equal to the difference in velocity $v1_d$ for segment 1 and the initial acceleration $a0$ is greater than the maximum acceleration $a_{max}$ (i.e., $v0 \leq v1_d$ & $a0 > a_{max}$). The Type $H_a$ move profile is shown in FIG. 91. If the profile is a Type $H_a$ move profile, then the following coefficients are assigned values according to the following equations:

$ss = 2$ $j1_b = 0$ $j2_b = -ja_{max}$ $j4_b = -ja_{max}$ $a3_b = a_{max}$

For the move profile types in which the initial acceleration is less than zero (i.e., types $A_d$ through $H_d$), the key features for distinguishing the various types are again the difference in velocity $v1_d$ for segment 1, the difference in velocity $v14_d$ for segments 1 to 4, and the difference in velocity $v24_d$ for segments 2 to 4. In this case, these parameters are calculated according to the following equations:

$$v1_d = -\frac{a0^2}{2 * jd_{max}}$$

$v14_d = v0 - v1_d - v_{max}$ $v24_d = v0 + v1_d - v_{max}$

For a Type $A_d$ move profile, the initial velocity $v0$ is less than the difference in velocity $v1_d$ for segment 1 multiplied by minus 1 (i.e., $v0 < -v1_d$). The Type $A_d$ move profile is shown in FIG. 9J. If the profile is a Type $A_d$ move profile, then the following coefficients are assigned values according to the following equations:

$j1_b = jd_{max}$ $j2_b = 0$ $j4_b = 0$ $j6_b = 0$ $j8_b = 0$ $a1_b = a0$ $v1_b = v0$ $$t1_d = \frac{a2_b - a1_b}{j1_b}$$

$$v1_b = -\left(a1_b + \frac{j1_b}{2} * t1_d\right) * t1_d$$
$$= -\frac{a1_b + a2_b}{2} * \frac{a2_b - a1_b}{j1_b}$$
$$= \frac{a1_b^2 - a2_b^2}{2 * j1_b}$$

$a2_b = -\sqrt{a1_b^2 - 2 * v1_b * j1_b}$ $a3_b = a2_b$ $a4_b = a3_b$ $a5_b = a4_b$ $a6_b = a5_b$ $a8_b = a6_b$ $a9_b = a8_b$ $$t1_d = \frac{a2_b - a1_b}{j1_b}$$

$t2_d = 0$ $t3_d = 0$ $t4_d = 0$ $t5_d = 0$ $t6_d = 0$ $t8_d = 0$ $v2_b = 0$ $v3_b = v2_b$ $v4_b = v3_b$ $v5_b = v4_b$ $v6_b = v5_b$ $v8_b = v6_b$ $v9_b = v8_b$ $$x1_d = \left(v1_b + \left(\frac{a1_b}{2} + \frac{j1_b}{6} * t1_d\right) * t1_d\right) * t1_d$$
$$= \left(v1_b + \left(\frac{a1_b}{3} + \frac{a2_b}{6}\right) * t1_d\right) * t1_d$$

$x2_d = 0$ $x3_d = 0$ $x4_d = 0$ $x5_d = 0$ $x6_d = 0$ $x8_d = 0$

For a Type $B_d$ move profile, the initial velocity $v0$ is equal to the difference in velocity $v1_d$ for segment 1 multiplied by minus 1 (i.e., $v0 = -v1_d$). The Type $B_d$ move profile is shown in FIG. 9K. If the profile is a Type $B_d$ move profile, then the following coefficients are assigned values according to the following equations:

$ss = 1$ $j1_b = jd_{max}$ $j2_b = ja_{max}$ $j4_b = -ja_{max}$ $a3_b = a_{max}$ For a Type $C_d$ move profile, the difference in velocity $v24_d$ for segment 2 and 4 is less than zero (i.e., $v24_d<0$). The Type $C_d$ move profile is shown in FIG. 9L. If the profile is a Type $C_d$ move profile, then the following coefficients are assigned values according to the following equations:

$ss=1$ $j1_b=jd_{max}$ $j2_b=ja_{max}$ $j4_b=-ja_{max}$ $a3_b=\sqrt{-v24_d * ja_{max}}$ For a Type $D_d$ move profile, the difference in velocity $v24_d$ for segments 2 and 4 is equal to zero (i.e., $v24_d=0$). The Type $D_d$ move profile is shown in FIG. 9M. If the profile is a Type $D_d$ move profile, then the following coefficients are assigned values according to the following equations:

$ss=1$ $j1_b=jd_{max}$ $j2_b=ja_{max}$ $j4_b=-ja_{max}$ $a3_b=0_{max}$

For a Type $E_d$ move profile, the difference in velocity $v14_d$ for segments 1 and 4 is less than the maximum velocity $v_{max}$ to zero (i.e., $v14_d<v_{max}$). The Type $E_d$ move profile is shown in FIG. 9N. If the profile is a Type $E_d$ move profile, then the following coefficients are assigned values according to the following equations:

$ss=2$ $j1_b=0$ $j2_b=-jd_{max}$ $j4_b=jd_{max}$ $a3_b=-\sqrt{v14_d * jd_{max}}$ For a Type $F_d$ move profile, the difference in velocity $v14_d$ for segments 1 and 4 is equal to the maximum velocity $v_{max}$ and the initial acceleration a0 is greater than or equal to the maximum deceleration multiplied by minus 1 (i.e., $v14_d = v_{max}$ & $a0 \geq -d_{max}$). The Type $F_d$ move profile is shown in FIG. 9O. If the profile is a Type $F_d$ move profile, then the following coefficients are assigned values according to the following equations:

$ss=2$ $j1_b=0$ $j2_b=-jd_{max}$ $j4_b=jd_{max}$ $a3_b=-jd_{max}$

For a Type $G_d$ move profile, the difference in velocity $v14_d$ for segments 1 and 4 is greater than the maximum velocity $v_{max}$ and the initial acceleration a0 is greater than or equal to the maximum deceleration $d_{max}$ multiplied by minus 1 (i.e., $v14_d>v_{max}$ & $a0 \geq -d_{max}$). Two alternatives of the Type $G_d$ move profile are shown in FIGS. 9P and 9Q.

Figure 9P:
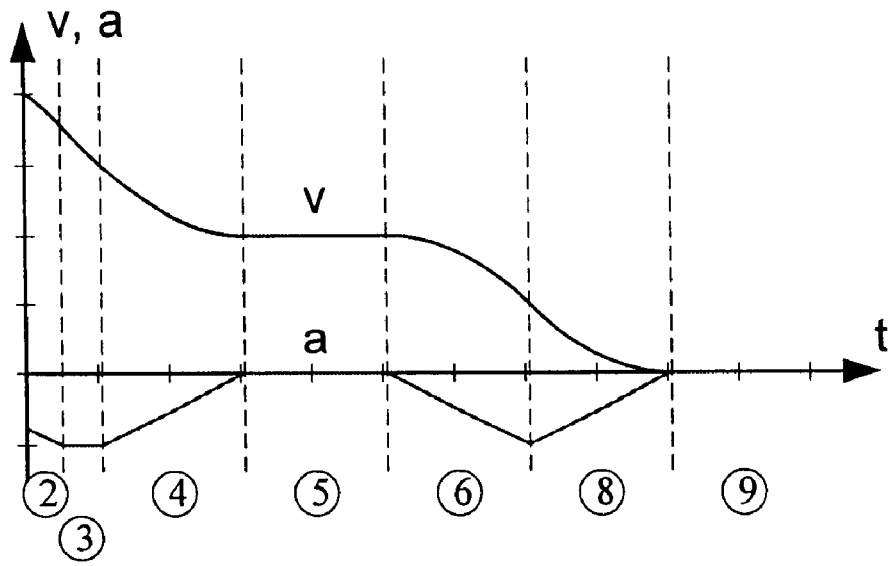
Figure 9Q:
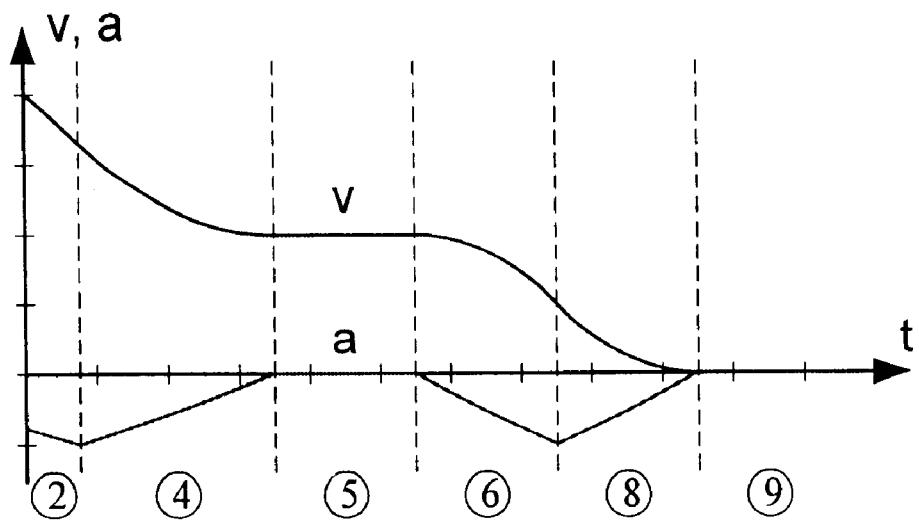
Figure 9R:
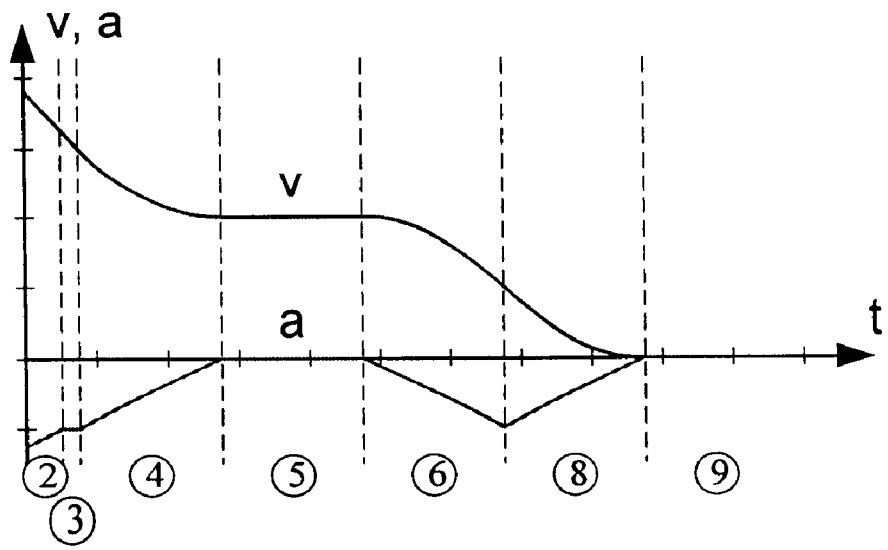

FIG. 9P shows a fast deceleration variant of the Type $G_d$ move profile, and FIG. 9Q shows a slow deceleration variant of the Type $G_d$ move profile. If the fast deceleration variant of the Type $G_d$ move profile is utilized, then the following coefficients are assigned values according to the following equations:

$ss=2$ $j1_b=0$ $j2_b=-jd_{max}$ $j4_b=jd_{max}$ $a3_b=-d_{max}$

If the slow deceleration variant of the Type $G_d$ move profile is utilized then the following coefficients are assigned values according to the following equations:

$ss=2$ $j1_b=0$ $$v0 - v_{max} = \frac{d_{max}^2}{j4_b} - \frac{a0^2}{2 * j4_b}$$

$$j4_b = \frac{d_{max}^2 - \frac{a0^2}{2}}{v0 - v_{max}}$$

$j2_b=-j4_b$ $a3_b=-d_{max}$

For a Type $H_d$ move profile, the difference in velocity $v14_d$ between segments 1 and 4 is greater than or equal to the maximum velocity $v_{max}$ and the initial acceleration a0 is less than the maximum deceleration $d_{max}$ multiplied by minus 1 (i.e., $v14_d \geq v_{max}$ & $a0<-d_{max}$). The Type $H_d$ move profile is shown in FIG. 9R. If the move profile is a Type $H_d$ move profile, then the following coefficients are assigned values according to the following equations:

$ss=2$ $j1_b=0$ $j2_b=jd_{max}$ $j4_b=jd_{max}$ $a3_b=-d_{max}$

From the foregoing discussion, it is therefore seen that profile type can be determined based on the initial acceleration a0, the difference in velocity $v1_d$ for segment 1, the difference velocity $v14_d$ for segments 1–4, and the difference in velocity $v24_d$ for segments 2–4. Returning to FIG. 8, after the profile type is determined at Step 510, the additional segment coefficients are calculated. At Step 512, the values for coefficients of segments 1 and 2 are calculated.

If the profile starts with segment 1 (i.e., ss=1), and if the initial acceleration a0 is not equal to zero (i.e., a0≠0), then the coefficients for segment 1 may be calculated according to the following equations:

$$a1_b = a0$$

$$t1_d = -\frac{a1_b}{j1_b}$$

$$v1_d = \left(a1_b + \frac{j1_b}{2} * t1_d\right) * t1_d$$

$$= \frac{a1_b}{2} * t1_d$$

$$v1_b = v0$$

$$x1_d = \left(v1_b + \left(\frac{a1_b}{2} + \frac{j1_b}{6} * t1_d\right) * t1_d\right) * t1_d$$

$$= \left(v1_b + \frac{a1_b}{3} * t1_d\right) * t1_d$$

$$= \left(v1_b + \frac{2 * v1_d}{3}\right) * t1_d$$

If the profile starts with segment 1 (i.e., ss=1), and if the initial acceleration a0 is not equal to zero (i.e., a0≠0), then the coefficients for segment 2 may be calculated according to the following equations:

$$a2_b = 0$$

$$t2_d = \frac{a3_b}{j2_b}$$

$$v2_d = \left(a2_b + \frac{j2_b}{2} * t2_d\right) * t2_d$$

$$= \frac{a3_b}{2} * t2_d$$

$$a2_b = v1_b + v1_d$$

$$x2_d = \left(v2_b + \left(\frac{a2_b}{2} + \frac{j2_b}{6} * t2_d\right) * t2_d\right) * t2_d$$

$$= \left(v2_b + \frac{a3_b}{6} * t2_d\right) * t2_d$$

$$= \left(v2_b + \frac{v2_d}{3}\right) * t2_d$$

If the profile starts with segment 1 (i.e., ss=1) and if the initial acceleration a0 is equal to zero (i.e., a0=0), then the coefficients for segment 1 may be calculated according to the following equations:

$$a1_b = 0$$

$$t1_d = 0$$

$$v1_d = 0$$

$$v1_b = v0$$

$$x1_d = 0$$

If the profile starts with segment 1 (i.e., ss=1), and if the initial acceleration a0 is equal to zero (i.e., a0=0), then the coefficients for segment 2 may be calculated according to the following equations:

$$a2_b = 0$$

$$t2_d = \frac{a3_b}{j2_b}$$

$$v2_d = \frac{a3_b}{2} * t2_d$$

$$v2_b = v1_b$$

Further, in this case (ss=1 and a0=0), if the beginning velocity $v2_b$ for segment 2 is not equal to zero (i.e., $v2_b \neq 0$), then the difference in position $x2_d$ for segment 2 may be calculated according to the following equation:

$$x2_d = \left(v2_b + \frac{v2_d}{3}\right) * t2_d$$

Otherwise, if the beginning velocity $v2_b$ for segment 2 is equal to zero (i.e., $v2_b = 0$), the change in position $x2_d$ for segment 2 may be calculated as follows:

$$x2_d = \frac{v2_d}{3} * t2_d$$

If the profile starts with segment 2 (i.e., ss=2), and if the initial acceleration a0 is not equal to zero (i.e., a0≠0), then the coefficients for segment 1 may be calculated according to the following equations:

$$a1_b = a0$$

$$t1_d = 0$$

$$v1_d = 0$$

$$v1_b = v0$$

$$x1_d = 0$$

If the profile starts with segment 2 (i.e., ss=2), and if the initial acceleration a0 is not equal to zero (i.e., a0≠0), then the coefficients for segment 2 may be calculated according to the following equations:

$$a2_b = a0$$

$$t2_d = \frac{a3_b - a2_b}{j2_b}$$

$$v2_d = \left(a2_b + \frac{j2_b}{2} * t2_d\right) * t2_d$$

$$= \frac{a2_b + a3_b}{2} * t2_d$$

$$v2_b = v0$$

$$x2_d = \left(v2_b + \left(\frac{a2_b}{2} + \frac{j2_b}{6} * t2_d\right) * t2_d\right) * t2_d$$

$$= \left(v2_b + \left(\frac{a2_b}{3} + \frac{a3_b}{6}\right) * t2_d\right) * t2_d$$

If the profile starts with segment 2 (i.e., ss=2), and if the initial acceleration a0 is equal to zero (i.e., a0=0), then the coefficients for segment 1 may be calculated according to the following equations:

$a1_b=0$ $t1_d=0$ $v1_d=0$ $v1_b=v0$ $x1_d=0$

If the profile starts with segment 2 (i.e., ss=2), and if the initial acceleration a0 is equal to zero (i.e., a0=0), then the coefficients for segment 2 may be calculated according to the following equations:

$a2_b=0$ $$t2_d = \frac{a3_b}{j2_b}$$

$$v2_d = \frac{a3_b}{2} * t2_d$$

$v2_b=v0$

Further, in this case (ss=2 and a0=0), if the velocity $v2_b$ at the beginning of segment 2 is not equal to zero (i.e., $v2_b \neq 0$), then the difference in position $x2_d$ may be calculated according to the following equations:

$$x2_d = \left(v2_b + \frac{a3_b}{6} * t2_d\right) * t2_d$$

$$= \left(v2_b + \frac{v2_d}{3}\right) * t2_d$$

Otherwise, if the beginning velocity $v2_b$ for segment 2 is equal to zero (i.e., $v2_b=0$), then the change in position $x2_d$ for segment 2 may be calculated according to the following equation:

$$x2_d = \frac{v2_d}{3} * t2_d$$

At Step 514, the values for the coefficients of segment 4 are calculated according to the following equations:

$a4_b = a3_b$ $$t4_d = -\frac{a4_b}{j4_b}$$

$$v4_d = \left(a4_b + \frac{j4_b}{2} * t4_d\right) * t4_d$$

$$= \frac{a4_b}{2} * t4_d$$

$v4_b = v_{max} - v4_d$ $$x4_d = \left(v4_b + \left(\frac{a4_b}{2} + \frac{j4_b}{6} * t4_d\right) * t4_d\right) * t4_d$$

$$= \left(v4_b + \frac{a4_b}{3} * t4_d\right) * t4_d$$

$$= \left(v4_b + \frac{2 * v4_d}{3}\right) * t4_d$$

-continued $$= \left(v_{max} - \frac{v4_d}{3}\right) * t4_d$$

At Step 516, the values for the coefficients of segment 3 are calculated according to the following equation:

$v3_b = v2_b + v2_d$

If the acceleration $a3_b$ at the beginning of segment 3 is not equal to zero (i.e., $a3_b \neq 0$), then the change in time $t3_d$ for segment 3 may be calculated as follows:

$$t3_d = \frac{v4_b - v3_b}{a3_b}$$

Otherwise, the change in time $t3_d$ for segment 3 is set equal to zero:

$t3_d=0$

Based on the calculated velocity $v3_b$ and change in time $t3_d$ for segment 3, the change in position $x3_d$ for segment 3 is calculated as follows:

$$x3_d = \left(v3_b + \frac{a3_b}{2} * t3_d\right) * t3_d$$

$$= \left(v3_b + \frac{v3_d}{2}\right) * t3_d$$

$$= \frac{v3_b + v4_b}{2} * t3_d$$

At Step 518, the coefficients for segment 9 are calculated as follows:

$a9_b=0$ $v9_b=0$

At Step 520, the coefficients for segment 8 are calculated as follows:

$j8_b = jd_{max}$ $a8_b = -d_{max}$ $$t8_d = -\frac{a8_b}{j8_b}$$

$$= \frac{d_{max}}{jd_{max}}$$

$$= \frac{v_{max}}{d_{max}}$$

$$v8_b = -\left(a8_b + \frac{j8_b}{2} * t8_d\right) * t8_d$$

$$= -\frac{a8_b}{2} * t8_d$$

$$= \frac{v_{max}}{2}$$

$$x8_d = \left(v8_b + \left(\frac{a8_b}{2} + \frac{j8_b}{6} * t8_d\right) * t8_d\right) * t8_d$$

$$= \left(v8_b + \frac{a8_b}{3} * t8_d\right) * t8_d$$

$$= \left(v8_b - \frac{2 * v8_b}{3}\right) * t8_d$$

-continued $$= \frac{v8_b}{3} * t8_d$$

At Step 522, the values for the coefficients of segment 6 are calculated as follows:

$j6_b = -jd_{max}$ $a6_b = 0$ $$t6_d = \frac{a8_b}{j6_b}$$

$$= t8_d$$

$v6_b = v_{max}$ $$x6_d = \left(v6_b + \left(\frac{a6_b}{2} + \frac{j6_b}{6} * t6_d\right) * t6_d\right) * t6_d$$

$$= \left(v6_b + \frac{a8_b}{6} * t6_d\right) * t6_d$$

$$= \left(2 * v8_b - \frac{v8_b}{3}\right) * t6_d$$

$$= 5 * x8_d$$

At Step 524, the values for the coefficients of segment 5 are calculated as follows:

$a5_b = 0$ $v5_b v_{max}$ $x5_d = x_{end} - x8_d - x6_d - x4_d - x3_d - x2_d - x1_d$ At Step 526, the values for coefficients for segment 5 are examined to determine whether segment 5 is required. In particular, if the change in position $x5_d$ for segment 5 is greater than or equal to zero, then segment 5 is required. If the change in position $x5_d$ for segment 5 is less than zero, then segment 5 is not required. Further, as will be seen below, this latter condition requires that the coefficients for the remaining segments be adjusted in this case. Further, it may be noted that the fact that segment 5 is not required does not change the profile type that is used (as is apparent from FIGS. 8 and 10). Therefore, the adjustment of the coefficients for the remaining segments results in the duration of the remaining segments being made shorter. When the coefficients for segment 4 were originally calculated in step 514, it was assumed that the velocity at the end of segment 4 was the maximum velocity, that is, $v4_b = v_{max} - v4_d$ or $v4_b + v4_d = v_{max}$. As will become apparent below, when the coefficients are adjusted and the duration of acceleration during segment 4 is made shorter, the maximum velocity is not reached at the end of segment 4. Rather, the shaft accelerates to a peak velocity that is less than the maximum velocity.

Referring back to FIG. 7, once it is determined whether segment 5 is required, at Step 500, then the process proceeds to either Step 600 or Step 700, depending on whether segment 5 is required. If segment 5 is required, then the process proceeds to Step 600. At Step 600 the duration of segment 5 is calculated as the change in position $x5_d$ for segment 5 divided by the velocity $v5_b$ at the beginning of segment 5. Additionally, the coefficients for the remaining segments are assigned the values that were calculated during Step 500. This is summarized by the following set of equations:

$a9_b = a9_b$(Step 500)

$a8_b = a8_b$(Step 500)

$a6_b = a6_b$(Step 500)

$a5_b = a5_b$(Step 500)

$a4_b = a4_b$(Step 500)

$a3_b = a3_b$(Step 500)

$a2_b = a2_b$(Step 500)

$a1_b = a1_b$(Step 500)

$t8_d = t8_d$(Step 500)

$t6_d = t6_d$(Step 500)

$$t5_d = \frac{x5_d(\text{Step } 500)}{v5_b(\text{Step } 500)}$$

$t4_d = t4_d$(Step 500)

$t3_d = t3_d$(Step 500)

$t2_d = t2_d$(Step 500)

$t1_d = t1_d$(Step 500)

$v9_b = v9_b$(Step 500)

$v8_b = v8_b$(Step 500)

$v6_b = v6_b$(Step 500)

$v5_b = v5_b$(Step 500)

$v4_b = v4_b$(Step 500)

$v3_b = v3_b$(Step 500)

$v2_b = v2_b$(Step 500)

$v1_b = v1_b$(Step 500)

$x8_d = x8_d$(Step 500)

$x6_d = x6_d$(Step 500)

$x5_d = x5_d$(Step 500)

$x4_d = x4_d$(Step 500)

$x3_d = x3_d$(Step 500)

$x2_d = x2_d$(Step 500)

$x1_d = x1_d$(Step 500)

If segment 5 is not required, then the process proceeds to Step 700, where the values for the coefficients of segments 1–4 and 6–9 are adjusted. Step 700 is shown in greater detail in FIG. 10.

Figure 10:
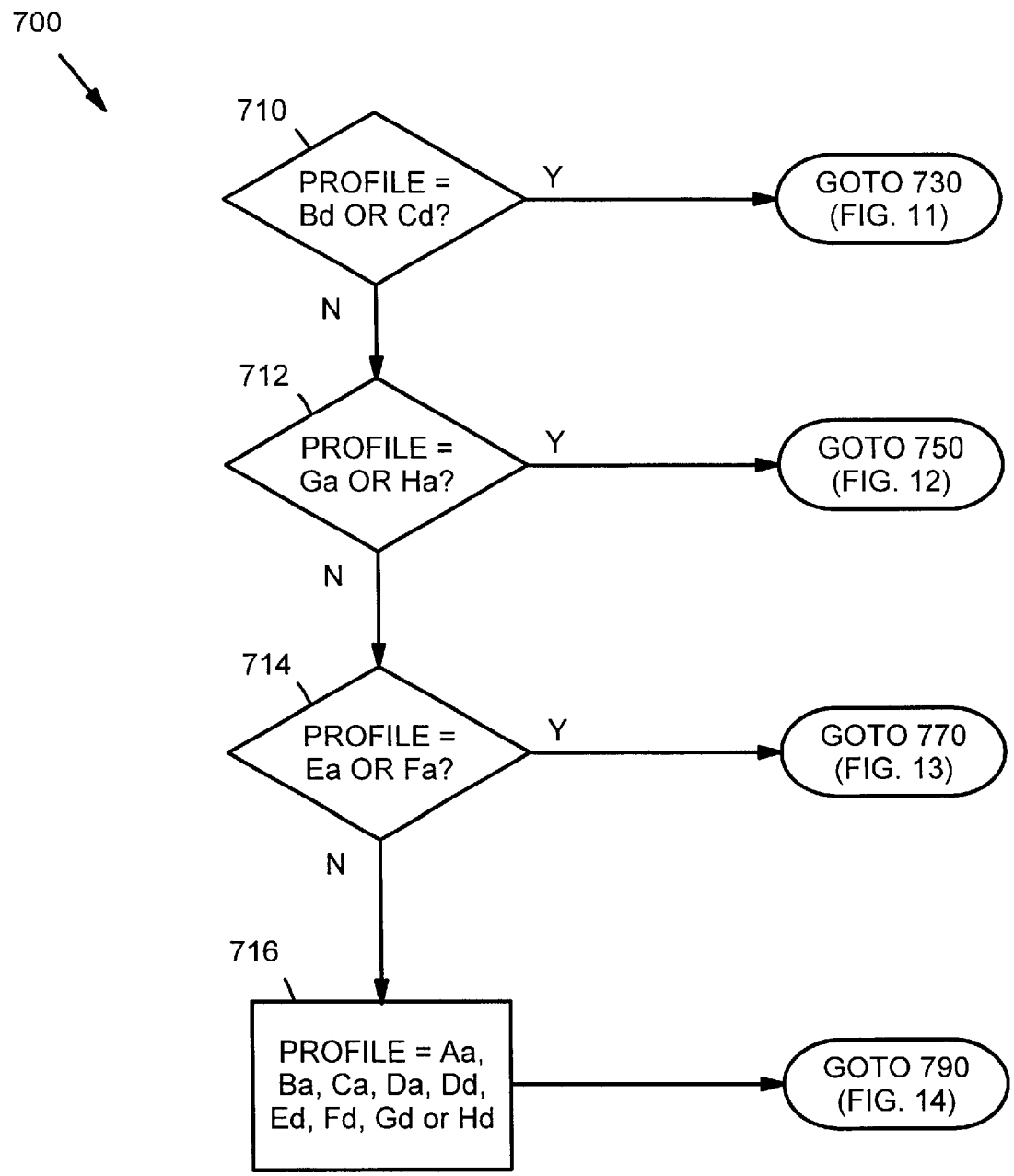
FIG. 10 is a flowchart showing one of the steps of FIG. 7 in greater detail.

Referring now to FIG. 10, at Steps 710–716 the process branches depending on the type of move profile that is under consideration. In practice, Steps 710–716 may be implemented by examining the acceleration $a3_b$, the starting segment ss, and so on, as previously discussed. At Step 710, if the move profile is a Type $B_d$ or Type $C_d$ move profile, then the process proceeds to Step 730. Step 730 is shown in greater detail in FIG. 11.

Figure 11:
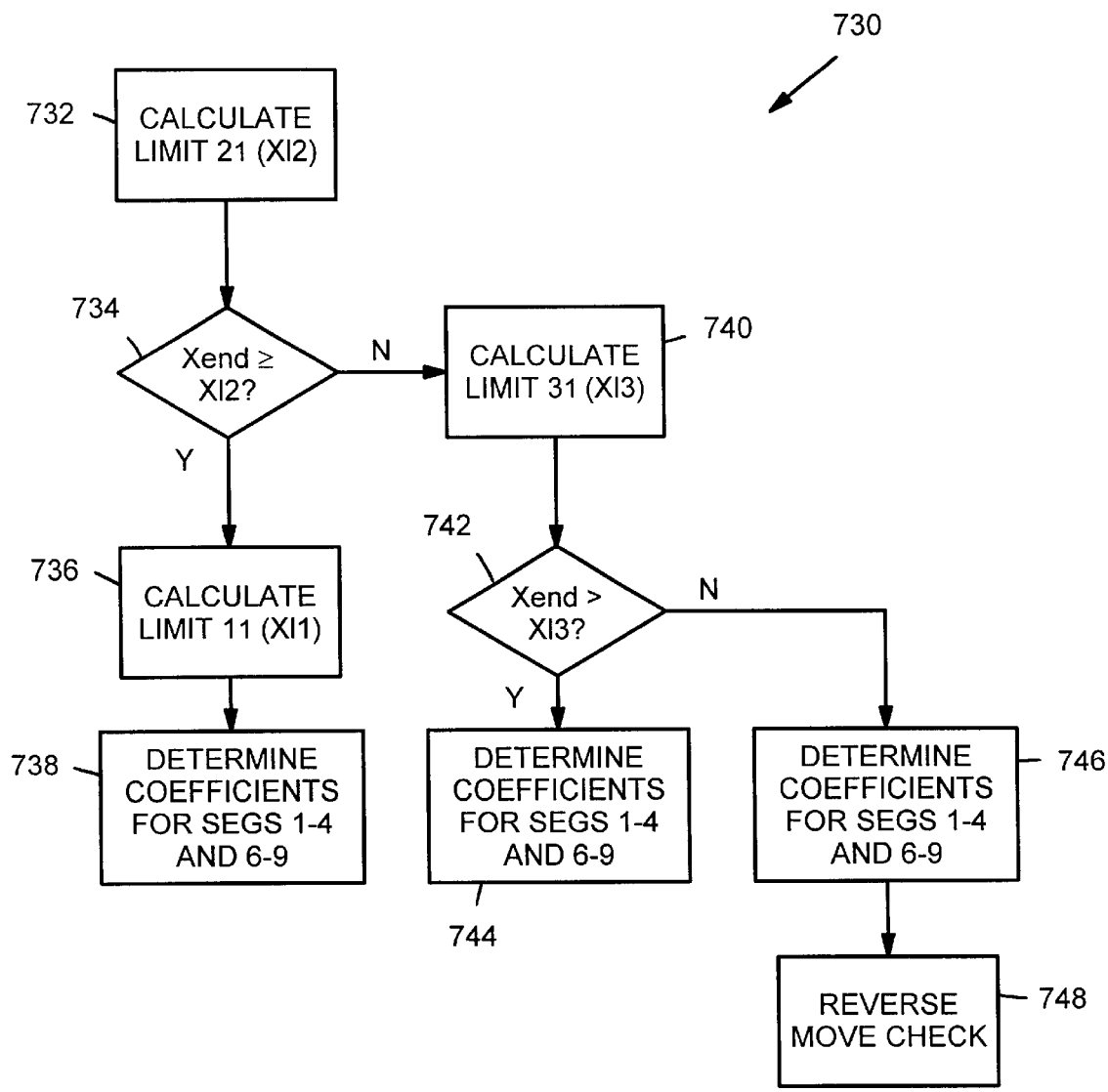
FIGS. 11–14 are flowcharts showing various steps of FIG. 10 in greater detail.

Referring now to FIG. 11, at Step 732, the end position $x_{l2}$ of limit $2_1$ is calculated as follows. First, the velocity $v6_b$ for segment 6 is set equal to the velocity $v2_b$ for segment 2 that was determined in Step 500:

$v6_b = v2_b$ (Step 500)

Next, if the velocity $v2_b$ for segment 2 that was determined in Step 500 is not equal to zero (i.e., $v2_b$ (Step 500)$\neq 0$), then the end position $x_{l2}$ of limit $2_1$ is calculated as follows:

$$t8_d = \frac{a8_b}{j6_b}$$

$t6_d = t8_d$ $$v8_d = \left(a8_b + \frac{j8_b}{2} * t8_d\right) * t8_d$$

$$= \frac{a8_b}{2} * t8_d$$

$$v6_d = \left(a6_b + \frac{j6_b}{2} * t6_d\right) * t6_d$$

$$= \frac{a8_b}{2} * t8_d$$

$$v6_b = -v8_d - v6_d$$

$$= -a8_b * t8_d$$

$$= j8_b * t6_d^2$$

$a8_b = -\sqrt{v6_b * j8_b}$ $$x8_d = \left(v8_b + \left(\frac{a8_b}{2} + \frac{j8_b}{6} * t8_d\right) * t8_d\right) * t8_d$$

$$= \left(v8_b + \frac{a8_b}{3} * t8_d\right) * t8_d$$

$$= \left(v8_b - \frac{2 * v8_b}{3}\right) * t8_d$$

$$= \frac{v8_b}{3} * t8_d$$

$$x6_d = \left(v6_b + \left(\frac{a6_b}{2} + \frac{j6_b}{6} * t6_d\right) * t6_d\right) * t6_d$$

$$= \left(v6_b + \frac{a8_b}{6} * t6_d\right) * t6_d$$

$$= \left(v6_b - \frac{v8_b}{3}\right) * t6_d$$

$$= v6_b * t6_d - x8_d$$

$$x_{l2} = x1_d + x6_d + x8_d$$
$$= x1_d + v6_b * t6_d$$
$$= x1_d + v6_d * t6_d$$

Otherwise, if the velocity $v2_b$ for segment 2 that was determined during Step 500 is equal to zero (i.e., $v2_b$ (Step 500)$= 0$), then the end position $x_{l2}$ of limit $2_1$ is calculated according to the following equations:

$a8_b = 0$ $x_{l2} = x1_d$

At Step 734, it is determined whether the new position $x_{end}$ is greater than or equal to the end position $x_{l2}$ of limit $2_1$. If so (i.e., $x_{end} \geq x_{l2}$), then the process proceeds to Step 736. At Step 736, the end position $x_{l1}$ of limit $1_1$ is calculated according to the following equations:

$a8_b = a8_b$ (Step 500)

$x_{l1} = x1_d + x2_d + x4_d + x6_d + x8_d$ $= x_{end} - x5_d$ (Step 500)

Based on the end position $x_{l1}$ of limit $1_1$, the coefficients for segments 1–4 and 6–9 are determined according to the following equations. First, if the velocity $v2_b$ for segment 2 determined during Step 500 is not equal to zero (i.e., $v2_b$ (Step 500)$\neq 0$), then a parameter $p_{l1}$ is calculated as follows:

$$p_{l1} = \frac{(a8_b(\text{Limit } 1_1))^3}{x_l}$$

Herein, parameters that are designated with the letter p are used for computational purposes only (temporary values).

If the end position $x_{l1}$ of limit $2_1$ is not equal to zero (i.e., $x_{l2} \neq 0$), then the following equations are calculated:

$$p_{l2} = \frac{a8_b(\text{Limit } 2_1)^3}{x_{l2}}$$

$$p = p_{l2} + (p_{l1} - p_{l2}) * \frac{x_{end} - x_{l2}}{x_{l1} - x_{l2}}$$

Otherwise, the parameter p is calculated as follows:

$p = p_{l1}$

Based on these parameters, the coefficients for segments 1–4 and 6–9 are determined according to the following equations:

$a8_{b,i} = -\sqrt[3]{-p * x_{end}}$ $a9_b = a9_b$ (Step 500)

$a8_b = a8b\_2$ ($a8_{b,i}, x_{end}, x1_d, v2_b$ (Step 500), $j2_b$, $j6_b$)

$a6_b = a6_b$ (Step 500)

$a5_b = a5_b$ (Step 500)

$$t8_d = \frac{a8_b}{j6_b}$$

$t6_d = t8_d$ $t5_d = 0$ $v9_b = v9_b$ (Step 500)

$$v8_d = \left(a8_b + \frac{j8_b}{2} * t8_d\right) * t8_d$$

$$= \frac{a8_b}{2} * t8_d$$

$$v6_d = \left(a6_b + \frac{j6_b}{2} * t6_d\right) * t6_d$$

-continued $$= \frac{a8_b}{2} * t8_d$$

$$v6_b = -v8_d - v6_d$$

$$= -a8_b * t8_d$$

$v6_b = -v8_d - v6_d$ $$v8_b = \frac{v6_b}{2}$$

$v5_b = v6_b$ $a4_b = \sqrt{(v5_b - v2_b(\text{Step } 500))*j2_b}$ $a3_b = a4_b$ $a2_b = a2_b(\text{Step } 500)$ $a1_b = a1_b(\text{Step } 500)$ $$t4_d = \frac{a4_b}{j2_b}$$

$t3_d = t3_d(\text{Step } 500)$ $t2_d = t4_d$ $t1_d = t1_d(\text{Step } 500)$ $$v4_b = v2_b(\text{Step } 500) + \left(a4_b + \frac{j4_b}{2} * t4_d\right) * t4_d$$

$$= v2_b(\text{Step } 500) + \frac{a4_b}{2} * t4_d$$

$$= v2_b(\text{Step } 500) + \frac{a4_b^2}{2*j2_b}$$

$$= \frac{v2_b(\text{Step } 500) + v5_b}{2}$$

$v3_b = v4_b$ $v2_b = v2_b(\text{Step } 500)$ $v1_b = v1_b(\text{Step } 500)$ $$x8_d = \left(v8_b + \left(\frac{a8_b}{2} + \frac{j8_b}{6} * t8_d\right) * t8_d\right) * t8_d$$

$$= \left(v8_b + \frac{a8_b}{3} * t8_d\right) * t8_d$$

$$= \left(v8_b - \frac{2*v8_b}{3}\right) * t8_d$$

$$= \frac{v8_b}{3} * t8_d$$

$$x6_d = \left(v6_b + \left(\frac{a6_b}{2} + \frac{j6_b}{6} * t6_d\right) * t6_d\right) * t6_d$$

$$= \left(v6_b + \frac{a8_b}{6} * t6_d\right) * t6_d$$

$$= \left(2*v8_b - \frac{v8_b}{3}\right) * t6_d$$

$$= 5 * x8_d$$

$x5_d = 0$ $$x4_d = \left(v4_b + \left(\frac{a4_b}{2} + \frac{j4_b}{6} * t4_d\right) * t4_d\right) * t4_d$$

$$= \left(v4_b + \frac{a4_b}{3} * t4_d\right) * t4_d$$

$$= \left(v4_b + \frac{a4_b^2}{3*j2_b}\right) * t4_d$$

$$= \left(v4_b + \frac{v5_b - v2_b}{3}\right) * t4_d$$

$x3_d = x3_d(\text{Step } 500)$ $x2_d = x_{end} - x8_d - x6_d - x4_d - x1_d$ $x1_d = x1_d(\text{Step } 500)$ The auxiliary function $a8b\_2\ (a8_{b,i}, x_d, v2_b, j2_b, j6_b)$ solves the equation $(j2_b + j6_b)*a8_b^6 - t_4*a8_b^4 + 2*t_2*a8_b^3 - t_5*a8_b^2 + t_1*t_2 + t_3*t_5 = 0$ with $t_1 = x_d * j6_b^2$ $t_2 = t_1 * j2_b$ $t_3 = v2_b * j6_b$ $t_4 = t_3 * j6_b$ $t_5 = t_3 * t_4$ for $a8_b$ by applying a numerical root finding algorithm with an initial value $a8_{b,i}$.

Otherwise, if the velocity $v2_b$ for segment 2 is determined during Step 500 is equal to zero (i.e., $v2_b(\text{Step } 500) \neq 0$), then the following steps are performed. First, if the jerk $j2_b$ for segment 2 is not equal to the jerk $j6_b$ for segment 6 multiplied by minus 1 (i.e., $j2_b \neq -j6_b$), then the coefficients for segments 1–4 and 6–9 are determined according to the following equations:

$a9_b = a9_b(\text{Step } 500)$ $$a8_b = -\sqrt[3]{\frac{(x_{end} - x1_d)*j2_b*j6_b^2}{j2_b + \sqrt{-j2_b*j6_b}}}$$

$a6_b = a6_b(\text{Step } 500)$ $a5_b = a5_b(\text{Step } 500)$ $$t8_d = \frac{a8_b}{j6_b}$$

$t6_d = t8_d$ $t5_d = 0$ $v9_b = v9_b(\text{Step } 500)$ $v6_b = -a8_b * t8_d$ $$v8_b = \frac{v6_b}{2}$$

$v5_b = v6_b$ $a4_b = \sqrt{v5_b * j2_b}$ $a3_b = a4_b$ $a2_b = a2_b(\text{Step } 500)$ $a1_b = a1_b(\text{Step } 500)$ $$t4_d = \frac{a4_b}{j2_b}$$

$t3_d = t3_d(\text{Step } 500)$ $t2_d = t4_d$ $t1_d = t1_d(\text{Step } 500)$

Otherwise, if the jerk $j2_b$ for segment 2 is equal to the $j6_b$ for segment 6 multiplied by minus 1 (i.e., $j2_b = -j6_b$), then the values for segments 1–4 and 6–9 are determined according to the following equations:

$a9_b = a9_b(\text{Step } 500)$ $$a8_b = -\sqrt[3]{\frac{(x_{end} - x1_d) * j2_b^2}{2}}$$

$a6_b = a6_b(\text{Step } 500)$ $a5_b = a5_b(\text{Step } 500)$ $$t8_d = \frac{a8_b}{j6_b}$$

$t6_d = t8_d$ $t5_d = 0$ $v9_b = v9_b(\text{Step } 500)$ $v6_b = -a8_b * t8_d$ $$v8_b = \frac{v6_b}{2}$$

$v5_b = v6_b$ $a4_b = \sqrt{v5_b * j2_b}$ $$a4_b = \sqrt{v5_b * j2_b}$$
$$= \sqrt{-a8_b * t8_d * j2_b}$$
$$= \sqrt{-\frac{a8_b^2}{j6_b} * j2_b}$$
$$= -a8_b$$

$a3_b = a4_b$ $a2_b = a2_b(\text{Step } 500)$ $a1_b = a1_b(\text{Step } 500)$ $$t4_d = \frac{a4_b}{j2_b}$$
$$= \frac{a8_b}{j6_b}$$
$$= t8_d$$

$t3_d = t3_d(\text{Step } 500)$ $t2_d = t4_d$ $t1_d = t1_d(\text{Step } 500)$

The remaining coefficients are then calculated according to the following equations:

$$v4_b = \frac{v5_b}{2}$$
$$= v8_b$$

$v3_b = v4_b$ $v2_b = v2_b(\text{Step } 500)$ $v1_b = v1_b(\text{Step } 500)$ $$x8_d = \frac{v8_b}{3} * t8_d$$

$x6_d = 5 * x8_d$ $x5_d = 0$ $$x4_d = \left(v4_b + \frac{v5_b - v2_b}{3}\right) * t4_d$$
$$= \left(v4_b + \frac{v5_b}{3}\right) * t4_d$$

$x3_d = x3_d(\text{Step } 500)$ $x2_d = x_{end} - x8_d - x6_d - x4_d - x1_d$ $x1_d = x1_d(\text{Step } 500)$ Referring back to Step 734, if the new position $x_{end}$ is less than the end position $x_{l2}$ of limit $2_1$ (i.e., $x_{end} < x_{l2}$), then the process proceeds to Step 740. At Step 740, the end position $x_{l3}$ of limit $3_1$ is calculated as follows.

First, if $v1_b > v1_d + 2 * v8_b$, then the following equations are calculated:

a$8_b$=a$8_b$(Step 500)

t$8_d$=t$8_d$(Step 500)

$$t6_d = \frac{a8_b - a6_b}{j6_b}$$

$$t1_d = \frac{a6_b - a1_b}{j1_b}$$

$$v6_d = \left(a6_b + \frac{j6_b}{2} * t6_d\right) * t6_d$$

$$= \frac{a6_b + a8_b}{2} * \frac{a8_b - a6_b}{j6_b}$$

$$= \frac{a8_b^2 - a6_b^2}{2 * j6_b}$$

$$v1_d = \left(a1_b + \frac{j1_b}{2} * t1_d\right) * t1_d$$

$$= \frac{a1_b + a6_b}{2} * \frac{a6_b - a1_b}{j1_b}$$

$$= \frac{a6_b^2 - a1_b^2}{2 * j1_b}$$

$$v8_b = v8_b(\text{Step } 500)$$

$$= v1_b + v1_d + v6_d$$

$$= v1_b + \frac{a6_b^2 - a1_b^2}{2*j1_b} + \frac{a8_b^2 - a6_b^2}{2*j6_b}$$

$$= v1_b + \frac{2*a6_b^2 - (a1_b^2 + a8_b^2)}{2*j1_b}$$

$$a6_b = -\sqrt{(v8_b - v1_b)*j1_b + \frac{a1_b^2 + a8_b^2}{2}}$$

$$t6_d = \frac{a8_b - a6_b}{j6_b}$$

$$t1_d = \frac{a6_b - a1_b}{j1_b}$$

$$v1_d = \left(a1_b + \frac{j1_b}{2} * t1_d\right) * t1_d$$

$$= \frac{a1_b + a6_b}{2} * t1_d$$

$$v6_b = v1_b + v1_d$$

$$= v1_b + \frac{a1_b + a6_b}{2} * t1_d$$

x$8_d$=x$8_d$(Step 500)

$$x6_d = \left(v6_b + \left(\frac{a6_b}{2} + \frac{j6_b}{6} * t6_d\right) * t6_d\right) * t6_d$$

$$= \left(v6_b + \left(\frac{a6_b}{3} + \frac{a8_b}{6}\right) * t6_d\right) * t6_d$$

$$x1_d = \left(v1_b + \left(\frac{a1_b}{2} + \frac{j1_b}{6} * t1_d\right) * t1_d\right) * t1_d$$

$$= \left(v1_b + \left(\frac{a1_b}{3} + \frac{a6_b}{6}\right) * t1_d\right) * t1_d$$

x$_{l3}$=x$1_d$+x$6_d$+x$8_d$

On the other hand, if v$1_b$≦v$1_d$+2* v$8_b$, then instead the following equations are calculated:

a$6_b$=a$1_b$(Step 500)

v$6_b$=v$1_6$(Step 500)

$$t8_d = -\frac{a8_b}{j8_b}$$

$$t6_d = \frac{a8_b - a6_b}{j6_b}$$

$$v8_d = \left(a8_b + \frac{j8_b}{2} * t8_d\right) * t8_d$$

$$= -\frac{a8_b}{2} * \frac{a8_b}{j8_b}$$

$$= -\frac{a8_b^2}{2*j8_b}$$

$$v6_d = \left(a6_b + \frac{j6_b}{2} * t6_d\right) * t6_d$$

$$= \frac{a6_b + a8_b}{2} * \frac{a8_b - a6_b}{j6_b}$$

$$= \frac{a8_b^2 - a6_b^2}{2 * j6_b}$$

$$v6_b = -v6_d - v8_d$$

$$= \frac{a8_b^2 - a6_b^2}{2*j8_b} + \frac{a8_b^2}{2*j8_b}$$

$$= \frac{2*a8_b^2 - a6_b^2}{2*j8_b}$$

$$a8_b = -\sqrt{v6_b * j8_b + \frac{a6_b^2}{2}}$$

$$t8_d = \frac{a8_b}{j6_b}$$

$$t6_d = \frac{a8_b - a6_b}{j6_b}$$

t$1_d$=0

$$v8_b = -\left(a8_b + \frac{j8_b}{2} * t8_d\right) * t8_d$$

$$= -\frac{a8_b}{2} * t8_d$$

$$x8_d = \left(v8_b + \left(\frac{a8_b}{2} + \frac{j8_b}{6} * t8_d\right) * t8_d\right) * t8_d$$

$$= \left(v8_b + \frac{a8_b}{3} * t8_d\right) * t8_d$$

$$= \left(v8_b - \frac{2*v8_b}{3}\right) * t8_d$$

$$= \frac{v8_b}{3} * t8_d$$

$$x6_d = \left(v6_b + \left(\frac{a6_b}{2} + \frac{j6_b}{6} * t6_d\right) * t6_d\right) * t6_d$$

$$= \left(v6_b + \left(\frac{a6_b}{3} + \frac{a8_b}{6}\right) * t6_d\right) * t6_d$$

$x1_d = 0$ $x_{l3} = x6_d + x8_d$

At Step 742, if the new position $x_{end}$ is greater than the end position $X_{l3}$ of limit 3$_1$ (i.e., $x_{end} > x_{l3}$), then the process proceeds to Step 744. At Step 744, the coefficients for segments 1–4 and 6–9 are determined as follows. First, a temporary parameter $p_{l2}$ is calculated as follows:

$$p_{l2} = \frac{(a8_b(Limit2_1))^3}{x_{l2}}$$

Then, if the end position $x_{l3}$ of limit 3$_1$ is not equal to zero (i.e., $x_{l3} \neq 0$), then the following temporary parameters are calculated as follows:

$$p_{l3} = \frac{(a8_b(Limit3_1))^3}{x_{l3}}$$

$$p = p_{l3} + (p_{l2} - p_{l3}) * \frac{x_{end} - x_{l3}}{x_{l2} - x_{l3}}$$

Otherwise, if the end position $x_{l3}$ of limit 3$_1$ is equal to zero (i.e., $x_{l3} = 0$), then the temporary parameter p is calculated as follows:

$p = p_{l2}$

In either event, the coefficients for segments 1–4 and 6–9 are then calculated according to the following equations:

$a8_{b,1} = -3 \sqrt[3]{-p * x_{end}}$ $a9_b = a9_b$(Step 500)

$a8_b = a8b\_3(a8_{b,i}, x_{end}, v1_b, a1_b, j1_b)$ $t8_d = \frac{a8_b}{j6_b}$ $v9_b = v9_b$(Step 500)

$v8_b = -\left(a8_b + \frac{j8_b}{2} * t8_d\right) * t8_d$ $\phantom{v8_b} = -\frac{a8_b}{2} * t8_d$ $t6_d = \frac{a8_b - a6_b}{j6_b}$ $t1_d = \frac{a6_b - a1_b}{j1_b}$ $v6_d = \left(a6_b + \frac{j6_b}{2} * t6_d\right) * t6_d$ $\phantom{v6_d} = \frac{a6_b + a8_b}{2} * \frac{a8_b - a6_b}{j6_b}$ $\phantom{v6_d} = \frac{a8_b^2 - a6_b^2}{2 * j6_b}$ $v1_d = \left(a1_b + \frac{j1_b}{2} * t1_d\right) * t1_d$ $\phantom{v1_d} = \frac{a1_b + a6_b}{2} * \frac{a6_b - a1_b}{j1_b}$ $\phantom{v1_d} = \frac{a6_b^2 - a1_b^2}{2 * j1_b}$ $v8_b = v1_b + v1_d + v6_d$ $\phantom{v8_b} = v1_b + \frac{a6_b^2 - a1_b^2}{2 * j1_b} + \frac{a8_b^2 - a6_b^2}{2 * j6_b}$ $\phantom{v8_b} = v1_b + \frac{2 * a6_b^2 - (a1_b^2 + a8_b^2)}{2 * j1_b}$ $a6_b = -\sqrt{(v8_b - v1_b) * j1_b + \frac{a1_b^2 + a8_b^2}{2}}$ $a5_b = a6_b$ $a4_b = a5_b$ $a3_b = a4_b$ $a2_b = a3_b$ $a1_b = a1_b$(Step 500)

$t6_d = \frac{a8_b - a6_b}{j6_b}$ $t5_d = 0$ $t4_d = 0$ $t3_d = t3_d$(Step 500)

$t2_d = 0$ $t1_d = \frac{a2_b - a1_b}{j1_b}$ $v6_d = \left(a6_b + \frac{j6_b}{2} * t6_d\right) * t6_d$ $\phantom{v6_d} = \frac{a6_b + a8_b}{2} * t6_d$ $v6_b = v8_b - v6_d$ $\phantom{v6_b} = v8_b - \frac{a6_b + a8_b}{2} * t6_d$ $v5_b = v6_b$ $v4_b = v5_b$ $v3_b = v4_b$ $v2_b = v3_b$ $v1_b = v1_b$(Step 500)

$$x8_d = \left(v8_b + \left(\frac{a8_b}{2} + \frac{j8_b}{6}*t8_d\right)*t8_d\right)*t8_d$$

$$= \left(v8_b + \frac{a8_b}{3}*t8_d\right)*t8_d$$

$$= \left(v8_b - \frac{2*v8_b}{3}\right)*t8_d$$

$$= \frac{v8_b}{3}*t8_d$$

$$x6_d = \left(v6_b + \left(\frac{a6_b}{2} + \frac{j6_b}{6}*t6_d\right)*t6_d\right)*t6_d$$

$$= \left(v6_b + \left(\frac{a6_b}{3} + \frac{a8_b}{6}\right)*t6_d\right)*t6_d$$

$x5_d=0$ $x4_d=0$ $x3_d=x3_d$(Step 500)

$x2_d=0$ $x1_d=x_{end}-x8_d-x6_d$

The auxiliary function $a8b\_3$ ($a8_{b,i}$, $x_{end}$, $v1_b$, $a1_b$, $j1_b$)

solves the equation $-36*t_3*a8_b^4+(144*t_1+48*t_4)*a8_b^3+18*t_3^2*a8_b^2+t_1*(72*t_1+48*t_4)+t_2^{2*}(18*t_2+27*t_3)-t_4^2=0$ with $t_1=x_{end}*j1_b^2$ $t_2=v1_b*j1_b$ $t_3=2*t_2-a1_b^2$ $t_4=(t_2+t_3)*a1_b$ for $a8_b$ by applying a numerical root finding algorithm with an initial value $a8_{b,i}$.

Returning to Step 742, if the new position $x_{end}$ is less than or equal to the end position $x_{l3}$ of limit 3₁, then the process proceeds to Step 746. At Step 746, the coefficients for segments 1–4 and 6–9 are determined according to the following equations:

$a9_b=a9_b$(Step 500)

$a8_b=a8_b$(Limit 3₁)

$a6_b=a6_b$(Limit 3₁)

$a5_b=a6_b$ $a4_b=a5_b$ $a3_b=a4_b$ $a2_b=a3_b$ $a1_b=a1_b$(Step 500)

$t8_d=t8_d$(Limit 3₁)

$t6_d=t6_d$(Limit 3₁)

$t5_d=0$ $t4_d=0$ $t3_d=t3_d$(Step 500)

$t2_d=0$ $t1_d=t1_d$(Limit 3₁)

$v9_b=v9_b$(Step 500)

$v8_b=v8_b$(Limit 3₁)

$v6_b=v6_b$(Limit 3₁)

$v5_b=v6_b$ $v4_b=v5_b$ $v3_b=v4_b$ $v2_b=v3_b$ $v1_b=v1_b$(Step 500)

$x8_d=x8_d$(Limit 3₁)

$x6_d=x6_d$(Limit 3₁)

$x5_d=0$ $x4_d=0$ $x3_d=x3_d$(Step 500)

$x2_d=0$ $x1_d=x1_d$(Limit 3₁)

A reverse move is required in Step 748, if the parameter $x_{end}$ is less than the parameter $x_{l3}$. This indicates that the initial velocity of the motor and/or the relatively close distance between the initial position and the new position causes the motor to travel beyond the new position before the motor shaft can be stopped. A reverse move is simply a separate, new move in the opposite direction.

Referring back to FIG. 10, at Step 710, if the profile is not a Type $B_d$ or $C_d$ move profile, then the process proceeds to Step 712. At Step 712, if the profile is a Type $G_a$ or $H_a$ move profile, then process proceeds to Step 750, which is shown in greater detail in FIG. 12.

Figure 12:
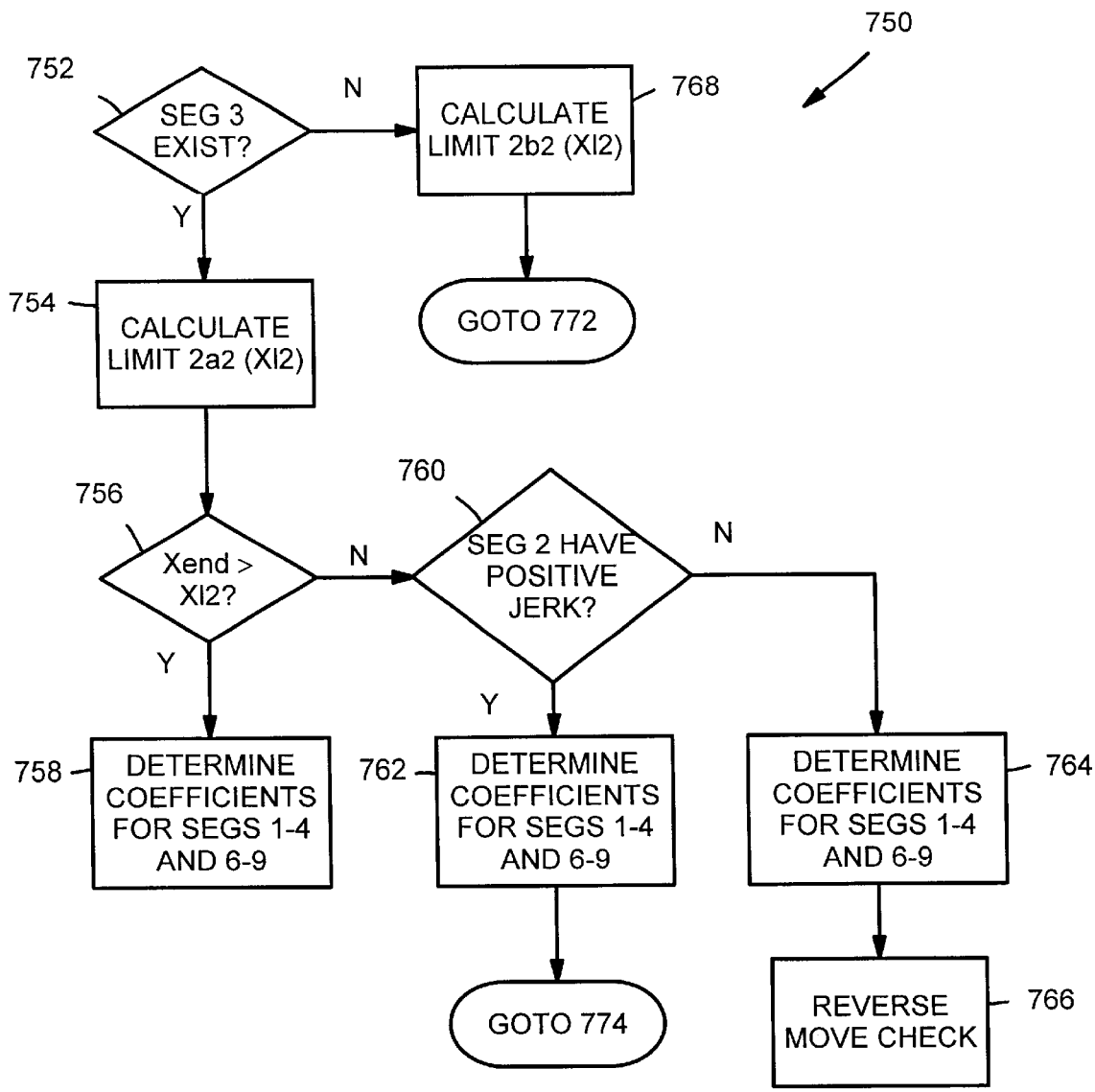

Referring now to FIG. 12, at Step 752, it is first determined whether segment 3 exists, which in practice may comprise determining whether the duration $t3_d$ of segment 3 is greater than zero (i.e., $t3_d>0$). If segment 3 exists, then the process proceeds to Step 754. At Step 754, the end position $x_{l2}$ of limit $2a_2$ is calculated according to the following equations:

$v4_b=v3_b$(Step 500)

$v6_b=v4_b+v4_d$ $a8_b=-\sqrt{v6_b*j8_b}$ $t8_d = \frac{a8_b}{j6_b}$ $v8_b = -\left(a8_b + \frac{j8_b}{2}*t8_d\right)*t8_d$ $= -\frac{a8_b}{2}*t8_d$ $= \frac{v6_b}{2}$ -continued $$x8_d = \left(v8_b + \left(\frac{a8_b}{2} + \frac{j8_b}{6} * t8_d\right) * t8_d\right) * t8_d$$

$$= \left(v8_b + \frac{a8_b}{3} * t8_d\right) * t8_d$$

$$= \left(v8_b - \frac{2*v8_b}{3}\right) * t8_d$$

$$= \frac{v8_b}{3} * t8_d$$

$$x6_d = \left(v6_b + \left(\frac{a6_b}{2} + \frac{j6_b}{6} * t6_d\right) * t6_d\right) * t6_d$$

$$= \left(v6_b + \frac{a8_b}{3} * t6_d\right) * t6_d$$

$$= \left(2*v8_b - \frac{v8_b}{3}\right) * t6_d$$

$$= 5 * x8_d$$

$$x4_d = \left(v4_b + \left(\frac{a4_b}{2} + \frac{j4_b}{6} * t4_d\right) * t4_d\right) * t4_d$$

$$= \left(v4_b + \frac{a4_b}{3} * t4_d\right) * t4_d$$

$$= \left(v4_b + \frac{2*v4_d}{3}\right) * t4_d$$

$$x_{l2} = x2_d + x4_d + x6_d + x8_d$$

At Step 756, it is determined whether the new position $x_{end}$ is greater than the end position $x_{l2}$ of limit $2a_2$. If the new position $x_{end}$ is greater than the end position $x_{l2}$ of limit $2a_2$ (i.e., $x_{end} > x_{l2}$), then the process proceeds to Step 758. At Step 758, the coefficients for segments 1–4 and 6–9 are determined as follows. First, the end position $x_{l1}$ of limit $1_2$ is calculated according to the following equations:

$a8_b = a8_b$(Step 500)

$$x_{l1} = x2_d + x3_d + x4_d + x6_d + x8_d$$

$$= x_{end} - x5_d(\text{Step } 500)$$

A temporary parameter $p_{l1}$ is then calculated according to the following equation:

$$p_{l1} = \frac{a8_b(Limit\,1_2)^3}{x_{l1}}$$

If the end position $x_{l2}$ of limit 2 is not equal to zero (i.e., $x_{l2} \neq 0$), then the following temporary parameters are calculated according to the following equations:

$$p_{l2} = \frac{a8_b(Limit\,2a_2)^3}{x_{l2}}$$

$$p = p_{l2} + (p_{l1} - p_{l2}) * \frac{x_{end} - x_{l2}}{x_{l1} - x_{l2}}$$

Otherwise, the temporary parameter p is calculated according to the following equation:

$p = p_{l1}$

In either case, the coefficients for segments 1–4 and 6–9 are then determined as follows:

$a8_{b,i} = -\sqrt[3]{-p * x_{end}}$ $a9_b = a9_b$(Step 500)

$a8_b = a8b\_1\,(a8_{b,i},\,x_{end} - x2_d,\,v3_b,\,a3_b,\,v4_b,\,t4_d,\,j6_b)$ $a6_b = a6_b$(Step 500)

$a5_b = a5_b$(Step 500)

$a4_b = a4_b$(Step 500)

$a3_b = a3_b$(Step 500)

$a2_b = a2_b$(Step 500)

$a1_b = a1_b$(Step 500)

$$t8_d = \frac{a8_b}{j6_b}$$

$t6_d = t8_d$ $t5_d = 0$ $t4_d = t4_d$(Step 500)

$v9_b = v9_b$(Step 500)

$$v8_d = \left(a8_b + \frac{j8_b}{2} * t8_d\right) * t8_d$$

$$= \frac{a8_b}{2} * t8_d$$

$$v6_d = \left(a6_b + \frac{j6_b}{2} * t6_d\right) * t6_d$$

$$= \frac{a8_b}{2} * t8_d$$

$$v6_b = -v8_d - v6_d$$

$$= -a8_b * t8_d$$

$$v8_b = \frac{v6_b}{2}$$

$v5_b = v6_b$ $v4_b = v5_b - v4_d$(Step 500)

$v3_b = v3_b$(Step 500)

$v2_b = v2_b$(Step 500)

$v1_b = v1_b$(Step 500)

$$t3_d = \frac{v4_b - v3_b}{a3_b}$$

$t2_d = t2_d$(Step 500)

$t1_d = t1_d$(Step 500)

$$x8_d = \left(v8_b + \left(\frac{a8_b}{2} + \frac{j8_b}{6} * t8_d\right) * t8_d\right) * t8_d$$

$$= \left(v8_b + \frac{a8_b}{3} * t8_d\right) * t8_d$$

-continued $$= \left(v8_b - \frac{2*v8_b}{3}\right)*t8_d$$

$$= \frac{v8_b}{3}*t8_d$$

$$x6_d = \left(v6_b + \left(\frac{a6_b}{2} + \frac{j6_b}{6}*t6_d\right)*t6_d\right)*t6_d$$

$$= \left(v6_b + \frac{a8_b}{6}*t6_d\right)*t6_d$$

$$= \left(2*v8_b - \frac{v8_b}{3}\right)*t6_d$$

$$= 5*x8_d$$

$x5_d=0$ $$x3_d = \left(v3_b + \frac{a3_b}{2}*t3_d\right)*t3_d$$

$$= \frac{v3_b+v4_b}{2}*t3_d$$

$x4_d=x_{end}-x8_d-x6_d-x3_d-x2_d$ $x2_d=x2_d$(Step 500)

$x1_d=x1_d$(Step 500)

The auxiliary function $a8b\_1\ (a8_{b,i}, x_d, v3_b, a3_b, v4_b, t4_d, j6_b)$ solves the equation $3*a8_b^4 - 6*a3_b*a8_b^3 + 6*(t_5-t_4)*a8_b^2 - 6*t_1*t_3 + 3*(t_5^2-t_2^2) + t_4*(2*t_4 - 6*t_5) = 0$ with $t_1=x_d*j6_b$ $t_2=v3_b*j6_b$ $t_3=a3_b*j6_b$ $t_4=t_3*t4_d$ $t_5=v4_d*j6_b$ for $a8_b$ by applying a numerical root finding algorithm with an initial value $a8_{b,i}$.

Referring back to Step 756, if the new position $x_{end}$ is less than or equal to the end position $x_{l2}$ of limit $2a_2$ then the process proceeds to Step 760. At Step 760, it is determined whether segment 2 has positive jerk. If segment 2 has positive jerk (i.e., $j2_b>0$), then the coefficients for segments 1–4 and 6–9 are determined as follows. First, the following coefficients are calculated according to the following equations:

$a8_b=a8_b$(Limit $2_2$)

$t3_d=0$ $x3_d=0$

At this point, the Type $G_a$ or Type $H_a$ move profiles under consideration may be treated as a Type $E_a$ or Type $F_a$ move profile. Accordingly, for this type of profile, the process proceeds to Step 774, which is discussed further below.

Referring back to Step 760, if segment 2 does not have positive jerk (i.e.,$j2_b \leq 0$), then the process proceeds to Step 764. At Step 764, the coefficients for segments 1–4 and 6–9 are calculated according to the following equations:

$a9_b=a9_b$(Step 500)

$a8_b=a8_b$(Limit $2_2$)

$a6_b=a6_b$(Step 500)

$a5_b=a5_b$(Step 500)

$a4_b=a4_b$(Step 500)

$a3_b=a3_b$(Step 500)

$a2_b=a2_b$(Step 500)

$a1_b=a1_b$(Step 500)

$t8_d=t8_d$(Limit $2_2$)

$t6_d=t8_d$ $t5_d=0$ $t4_d=t4_d$(Step 500)

$t3_d=0$ $t2_d=t2_d$(Step 500)

$t1_d=t1_d$(Step 500)

$v9_b=v9_b$(Step 500)

$v8_b=v8_b$(Limit $2_2$)

$v6_b=v6_b$(Limit $2_2$)

$v5_b=v6_b$ $v4_b=v3_b$(Step 500)

$v3_b=v3_b$(Step 500)

$v2_b=v2_b$(Step 500)

$v1_b=v1_b$(Step 500)

$x8_d=x8_d$(Limit $2_2$)

$x6_d=x6_d$(Limit $2_2$)

$x5_d=0$ $x4_d=x4_d$(Limit $2_2$)

$x3_d=0$ $x2_d=x2_d$(Step 500)

$x1_d=x1_d$(Step 500)

A reverse move is required in Step 766, if the parameter $x_{end}$ is less than the parameter $x_{l2}$. This indicates that the initial velocity of the motor and/or the relatively close distance between the initial position and the new position causes the motor to travel beyond the new position before the motor shaft can be stopped. A reverse move is simply a separate, new move in the opposite direction.

Figure 13:
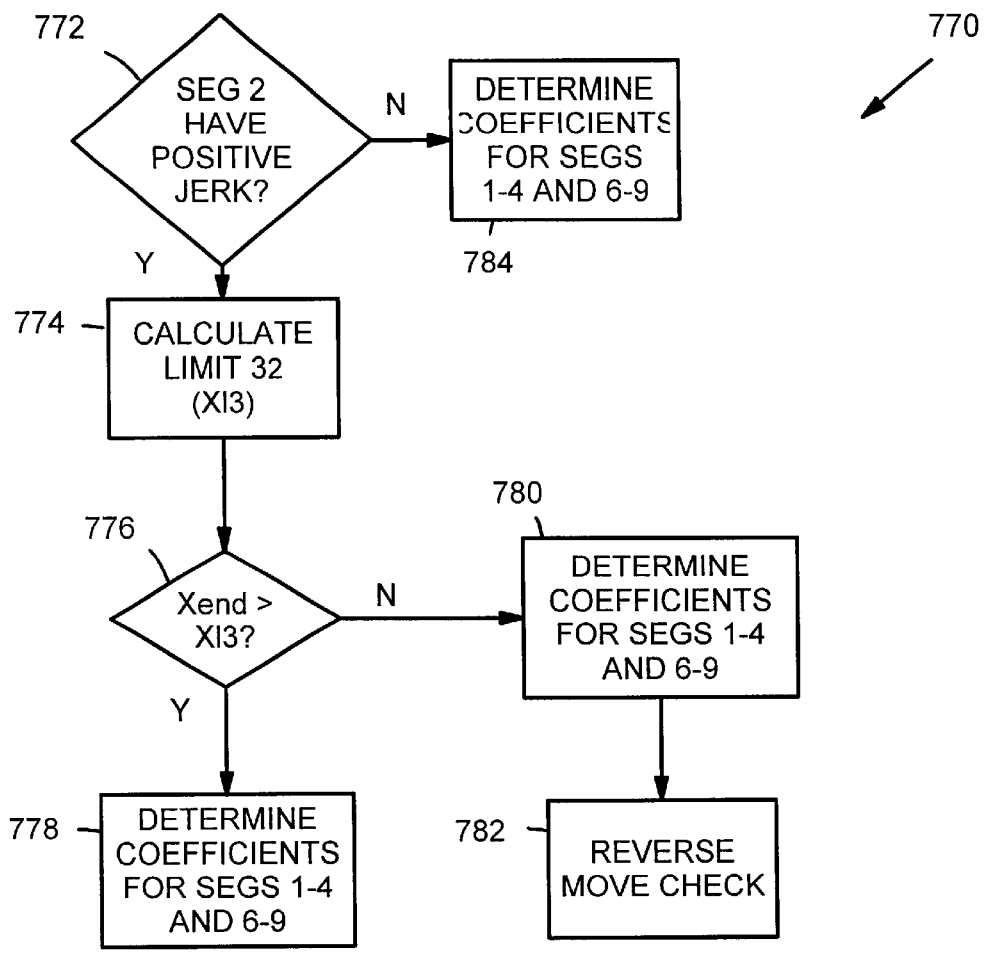

Referring back to Step 752, if segment 3 does not exist, then the process proceeds to Step 768. At Step 768 the end position $x_{l2}$ of limit $2b_2$ is calculated according to the following equations:

$a8_b = a8_b(\text{Step } 500)$ $x_{l2} = x2_d + x4_d + x6_d + x8_d$ $= x_{end} - x5_d(\text{Step } 500)$ Referring back to FIG. 10, if the profile is not a Type $G_a$ or $H_a$ move profile, then the process proceeds to Step 714. At Step 714, it is determined whether a Type $E_a$ or Type $F_a$ move profile. If the profile is a Type $E_a$ or Type $F_a$ move profile, then the process proceeds to Step 770, which is shown in greater detail in FIG. 13. Referring now to FIG. 13, if segment 2 has positive jerk (i.e., $j2_b > 0$) at Step 772, then the process proceeds to Step 774. At Step 774, the end position $x_{l3}$ of limit $3_2$ is calculated as follows. First, the following coefficients are calculated according to the following equations:

$a4_b = a2_b(\text{Step } 500)$ $v4_b = v2_b(\text{Step } 500)$

Then, if the acceleration $a2_b$ for segment 2 is determined during Step 500 is not equal to zero (i.e., $a2_b(\text{Step } 500) \neq 0$), then the end position $x_{l3}$ of limit $3_2$ is calculated according to the following equations:

$t4_d = \dfrac{a4_b}{j2_b}$ $v4_d = \left(a4_b + \dfrac{j4_b}{2} * t4_d\right) * t4_d$ $= \dfrac{a4_b}{2} * t4_d$ $v6_b = v4_b + v4_d$ $a8_b = -\sqrt{v6_b * j8_b}$ $t8_d = \dfrac{a8_b}{j6_b}$ $v8_b = -\left(a8_b + \dfrac{j8_b}{2} * t8_d\right) * t8_d$ $= -\dfrac{a8_b}{2} * t8_d$ $= \dfrac{v6_b}{2}$ $x8_d = \left(v8_b + \left(\dfrac{a8_b}{2} + \dfrac{j8_b}{6} * t8_d\right) * t8_d\right) * t8_d$ $= \left(v8_b + \dfrac{a8_b}{3} * t8_d\right) * t8_d$ $= \left(v8_b - \dfrac{2*v8_b}{3}\right) * t8_d$ $= \dfrac{v8_b}{3} * t8_d$ $x6_d = \left(v6_b + \left(\dfrac{a6_b}{2} + \dfrac{j6_b}{6} * t6_d\right) * t6_d\right) * t6_d$ $= \left(v6_b + \dfrac{a8_b}{6} * t6_d\right) * t6_d$ $= \left(2*v8_b - \dfrac{v8_b}{3}\right) * t6_d$ $= 5 * x8_d$ $x4_d = \left(v4_b + \left(\dfrac{a4_b}{2} + \dfrac{j4_b}{6} * t4_d\right) * t4_d\right) * t4_d$ $= \left(v4_b + \dfrac{a4_b}{3} * t4_d\right) * t4_d$ $= \left(v4_b + \dfrac{2*v4_d}{3}\right) * t4_d$ $x_{l3} = x4_d + x6_d + x8_d$ Otherwise, if the acceleration $a2_b$ for segment 2 that was determined during Step 500 is equal to zero (i.e., $a2_b(\text{Step } 500) = 0$), then the end position $x_{l3}$ of limit $3_2$ is calculated as follows. First, the following coefficients are assigned values according to the following equations:

$t4_d = 0$ $v4_d = 0$ $v6_b = v4_b$

Then, if the velocity $v6_b$ for segment 6 is not equal to zero (i.e., $v6_b \neq 0$), then the following coefficients including the end position $x_{l3}$ of limit $3_2$ are assigned values according to the following equations:

$a8_b = -\sqrt{v6_b * j8_b}$ $t8_d = \dfrac{a8_b}{j6_b}$ $v8_b = \dfrac{v6_b}{2}$ $x8_d = \dfrac{v8_b}{3} * t8_d$ $x6_d = 5 * x8_d$ $x4_d = 0$ $x_{l3} = x6_d + x8_d$ Otherwise, if the velocity $v6_b$ for segment 6 is equal to zero (i.e., $v6_b = 0$), then the end position $x_{l3}$ of limit $3_2$ and the remaining coefficients are assigned a value of zero as follows:

$a8_b = 0$ $t8_d = 0$ $v8_b = 0$ $x8_d = 0$ $x6_d = 0$ $x4_d = 0$ $x_{l3} = 0$

At Step 776, it is determined whether the new position $x_{end}$ is greater than the end position $x_{l3}$ of limit $3_2$. If the new position $x_{end}$ is greater than the end position $x_{l3}$ of limit $3_2$ (i.e., $x_{end} > x_{l3}$), then the process proceeds to Step 778. At Step 778, the coefficients for segments 1–4 and 6–9 are determined as follows.

First, if the acceleration $a2_b$ is not equal to zero (i.e., $a2_b \neq 0$), then the following coefficients are assigned values according to the following equations:

$$t0_d = \frac{a2_b}{j2_b}$$

$$v0_d = \left(a0_b + \frac{j0_b}{2} * t0_d\right) * t0_d$$

$$= \frac{a2_b}{2} * t0_d$$

$$v0_d = v2_b - v0_d$$

$$x0_d = \left(v0_b + \left(\frac{a0_b}{2} + \frac{j0_b}{6} * t0_d\right) * t0_d\right) * t0_d$$

$$= \left(v0_b + \frac{a2_b}{6} * t0_d\right) * t0_d$$

$$= \left(v0_b + \frac{v0_d}{3}\right) * t0_d$$

Otherwise, if the acceleration $a2_b$ for segment 2 is equal to zero (i.e., $a2_b=0$), then these coefficients are assigned values according to the following equations:

$v0_d=0$ $v0_b=0$ $v0_b=v2_b$ $x0_d=0$

First, if the initial velocity $v0_b$ is not equal to zero (i.e., $v0_b \ne 0$), then a temporary parameter $p_{l2}$ is calculated as follows:

$$p_{l2} = \frac{a8_b(\text{Limit } 2_2)^3}{x_{l2}}$$

If the end position $x_{l3}$ of limit $3_2$ is not equal to zero (i.e., $x_{l3} \ne 0$), then the following parameters are calculated according to the following equations:

$$p_{l3} = \frac{a8_b(\text{Limit } 3_2)^3}{x_{l3}}$$

$$p = p_{l3} + (p_{l2} - p_{l3}) * \frac{x_{end} - x_{l3}}{x_{l2} - x_{l3}}$$

Otherwise, if the end position $x_{l3}$ of limit $3_2$ is equal to zero (i.e., $x_{l3}=0$), the parameter p is assigned a value according to the following equation:

$p=p_{l2}$

Based on these values, the coefficients for segments 1–4 and 6–9 may be calculated as follows:

$a8_{b,I}=-3\sqrt{-p*x_{end}}$ $a9_b=a9_b$(Step 500)

$a8_b=a8b\_2\ (a8_{b,I}, x_{end}, x0_d, v0_b, j2_b, j6_b)$ $a6_b=a6_b$(Step 500)

$a5_b=a5_b$(Step 500)

$$t8_d = \frac{a8_b}{j6_b}$$

$t6_d=t8_d$ $t5_d=0$ $v9_b=v9_b$(Step 500)

$$v8_d = \left(a8_b + \frac{j8_b}{2} * t8_d\right) * t8_d$$

$$= \frac{a8_b}{2} * t8_d$$

$$v6_d = \left(a6_b + \frac{j6_b}{2} * t6_d\right) * t6_d$$

$$= \frac{a8_b}{2} * t8_d$$

$$v6_b = -v8_d - v6_d$$

$$= -a8_b * t8_d$$

$$v8_b = \frac{v6_b}{2}$$

$v5_b=v6_b$ $a4_b=\sqrt{(v5_b-v0_b)*j2_b}$ $a3_b=a4_b$ $a2_b=a2_b$(Step 500)

$a1_b=a1_b$(Step 500)

$$t4_d = \frac{a4_b}{j2_b}$$

$t3_d=t3_d$(Step 500) or $t3_d$(Step 762)

$t2_d=t4_d-t0_d$ $t1_d=t1_d$(Step 500)

$$v4_b = v0_b + \left(a4_b + \frac{j4_b}{2} * t4_d\right) * t4_d$$

$$= v0_b + \frac{a4_b}{2} * t4_d$$

$$= v0_b + \frac{a4_b^2}{2 * j2_b}$$

$$= \frac{v0_b + v5_b}{2}$$

$v3_b=v4_b$ $v2_b=v2_b$(Step 500)

$v1_b=v1_b$(Step 500)

$$x8_d = \left(v8_b + \left(\frac{a8_b}{2} + \frac{j8_b}{6} * t8_d\right) * t8_d\right) * t8_d$$

$$= \left(v8_b + \frac{a8_b}{3} * t8_d\right) * t8_d$$

-continued $$= \left(v8_b - \frac{2*v8_b}{3}\right)*t8_d$$

$$= \frac{v8_b}{3}*t8_d$$

$$x6_d = \left(v6_b + \left(\frac{a6_b}{2} + \frac{j6_b}{6}*t6_d\right)*t6_d\right)*t6_d$$

$$= \left(v6_b + \frac{a8_b}{6}*t6_d\right)*t6_d$$

$$= \left(2*v8_b - \frac{v8_b}{3}\right)*t6_d$$

$$= 5*x8_d$$

$x5_d=0$ $$x4_d = \left(v4_b + \left(\frac{a4_b}{2} + \frac{j4_b}{6}*t4_d\right)*t4_d\right)*t4_d$$

$$= \left(v4_b + \frac{a4_b}{3}*t4_d\right)*t4_d$$

$$= \left(v4_b + \frac{a4_b^2}{3*j2_b}\right)*t4_d$$

$$= \left(v4_b + \frac{v5_b - v0_b}{3}\right)*t4_d$$

$x3_d=x3_d$(Step 500) or $x3_d$(Step 762)

$x2_d=x_{end}-x8_d-x6_d-x4_d$ $x1_d=x1_d$(Step 500)

The auxiliary function a8b_2 (a$8_{b,i}$, x$_d$, v$2_b$, j$2_b$, j$6_b$)

solves the equation $(j2_b+j6_b)*a8_b^6-t_4*a8_b^4+2*t_2*a8_b^3-t_5*$ $a8_b^2+t_1*t_2+t_3*t_5=0$ with $t_1=x_d*j6_b^2$ $t_2=t_1*j2_b$ $t_3=v2_b*j6_b$ $t_4=t_3*j6_b$ $t_5=t_3*t_4$ for $a8_b$ by applying a numerical root finding algorithm with an initial value $a8_{b,i}$.

Second, if the initial velocity is equal to zero (i.e., $v0_b=0$), then the following calculations are performed. If the jerk $j2_b$ for segment 2 is not equal to the jerk $j6_b$ for segment 6 multiplied by minus 1 (i.e., $j2_b \neq -j6_b$), then the following calculations are performed:

$a9_b=a9_b$(Step 500)

$$a8_b = -\sqrt[3]{\frac{(x_{end}+x0_d)*j2_b*j6_b^2}{j2_b + \sqrt{-j2_b*j6_b}}}$$

$a6_b=a6_b$(Step 500)

$a5_b=a5_b$(Step 500)

$$t8_d = \frac{a8_b}{j6_b}$$

$t6_d=t8_d$ $t5_d=0$ $v9_b=v9_b$(Step 500)

$v6_b=-a8_b*t8_d$ $$v8_b = \frac{v6_b}{2}$$

$v5_b=v6_b$ $a4_b=\sqrt{v5_b*j2_b}$ $a3_b=a4_b$ $a2_b=a2_b$(Step 500)

$a1_b=a1_b$(Step 500)

$$t4_d = \frac{a4_b}{j2_b}$$

$t3_d=t3_d$(Step 500) or $t3_d$(Step 762)

$t2_d=t4_d-t0_d$ $t1_d=t1_d$(Step 500)

If the jerk $j2_b$ for segment 2 is equal to the jerk $j6_b$ for segment 6 multiplied by minus 1 (i.e., $j2_b=-j6_b$), then the following calculations are performed:

$a9_b=a9_b$(Step 500)

$$a8_b = -\sqrt[3]{\frac{(x_{end}+x0_d)*j2_b^2}{2}}$$

$a6_b=a6_b$(Step 500)

$a5_b=a5_b$(Step 500)

$$t8_d = \frac{a8_b}{j6_b}$$

$t6_d=t8_d$ $t5_d=0$ $v9_b=v9_b$(Step 500)

$v6_b=-a8_b*t8_d$ $$v8_b = \frac{v6_b}{2}$$

$v5_b=v6_b$ $$= \sqrt{-a8_b * t8_d * j2_b}$$

$$= \sqrt{-\frac{a8_b^2}{j6_b} * j2_b}$$

$$= -a8_b$$

$a3_b=a4_b$ $a2_b=a2_b$(Step 500)

$a1_b=a1_b$(Step 500)

$$t4_d = \frac{a4_b}{j2_b}$$

$$= \frac{a8_b}{j6_b}$$

$$= t8_d$$

$t3_d=t3_d$(Step 500) or $t3_d$(Step 762)

$t2_d=t4_d-t0_d$ $t1_d=t1_d$(Step 500)

In either case, the following calculations are then also performed:

$$v4_b = \frac{v5_b}{2}$$

$$= v8_b$$

$v3_b=v4_b$ $v2_b=v2_b$(Step 500)

$v1_b=v1_b$(Step 500)

$$x8_d = \frac{v8_b}{3} * t8_d$$

$x6_d=5*x8_d$ $x5_d=0$ $$x4_d = \left(v4_b + \frac{v5_b}{3}\right) * t4_d$$

$x3_d=x3_d$(Step 500)

$x2_d=x_{end}-x8_d-x6_d-x4_d$ $x1_d=x1_d$(Step 500)

Referring back to Step 776, if the new position $x_{end}$ is less than or equal to the end position $x_{l3}$ of limit $3_2$, then the process proceeds to Step 780. At Step 780, the coefficients for segments 1–4 and 6–9 are calculated according to the following equations:

$a9_b=a9_b$(Step 500)

$a8_b=a8_b$(Limit $3_2$)

$a6_b=a6_b$(Step 500)

$a5_b=a5_b$(Step 500)

$a4_b=a2_b$(Step 500)

$a3_b=a4_b$ $a2_b=a2_b$(Step 500)

$a1_b=a1_b$(Step 500)

$t8_d=t8_d$(Limit $3_2$)

$t6_d=t8_d$ $t5_d=0$ $t4_d=t4_d$(Limit $3_2$)

$t3_d=t3_d$(Step 500) or $t3_d$(Step 762)

$t2_d=0$ $t1_d=t1_d$(Step 500)

$v9_b=v9_b$(Step 500)

$v8_b=v8_b$(Limit $3_2$)

$v6_b=v6_b$(Limit $3_2$)

$v5_b=v6_b$ $v4_b=v2_b$(Step 500)

$v3_b=v4_b$ $v2_b=v2_b$(Step 500)

$v1_b=v1_b$(Step 500)

$x8_d=x8_d$(Limit $3_2$)

$x6_d=x6_d$(Limit $3_2$)

$x5_d=0$ $x4_d=x4_d$(Limit $3_2$)

$x3_d=x3_d$(Step 500) or $x3_d$(Step 762)

$x2_d=0$ $x1_d=x1_d$(Step 500)

A reverse move is required in Step 782, if the parameter $x_{end}$ is less than the parameter $x_{l3}$. This indicates that the initial velocity of the motor and/or the relatively close distance between the initial position and the new position causes the motor to travel beyond the new position before the motor shaft can be stopped. A reverse move is simply a separate, new move in the opposite direction.

Referring back to Step 772, if segment 2 does not have positive jerk (i.e., $j2_b0$), then the process proceeds to Step 784. At Step 784, the coefficients for segments 1–4 and 6–9 are assigned the values that were determined in Step 500.

Referring back to FIG. 10, at Step 714, if the profile is not a Type $E_a$ or Type $F_a$ move profile, then the process proceeds to Step 716. At Step 716, the profile is determined to be a Type $A_a$, $B_a$, $C_a$, $D_a$, $D_d$, $E_d$, $F_d$, $G_d$ or $H_d$ move profile, since these profile types are the only remaining profile types left. Accordingly, the process then proceeds to Step 790, which is shown in greater detail in FIG. 14.

Figure 14:
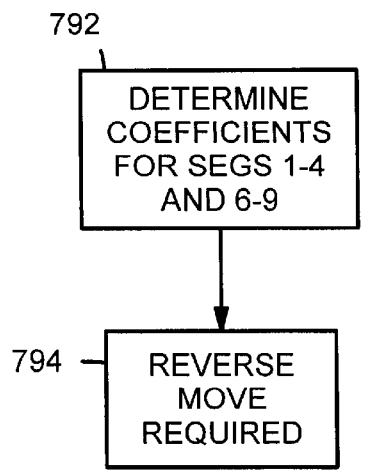

Referring now to FIG. 14, at Step 792 the coefficients for segments for 1–4 and 6–9 are assigned the values that were determined in Step 500. Additionally, the coefficients for segment 5 are set equal to zero. This is summarized by the following set of equations:

$a9_b = a9_b$ (Step 500)

$a8_b = a8_b$ (Step 500)

$a6_b = a6_b$ (Step 500)

$a5_b = a5_b$ (Step 500)

$a4_b = a4_b$ (Step 500)

$a3_b = a3_b$ (Step 500)

$a2_b = a2_b$ (Step 500)

$a1_b = a1_b$ (Step 500)

$t8_d = t8_d$ (Step 500)

$t6_d = t6_d$ (Step 500)

$t5_d = 0$ $t4_d = t4_d$ (Step 500)

$t3_d = t3_d$ (Step 500)

$t2_d = t2_d$ (Step 500)

$t1_d = t1_d$ (Step 500)

$v9_b = v9_b$ (Step 500)

$v8_b = v8_b$ (Step 500)

$v6_b = v6_b$ (Step 500)

$v5_b = v5_b$ (Step 500)

$v4_b = v4_b$ (Step 500)

$v3_b = v3_b$ (Step 500)

$v2_b = v2_b$ (Step 500)

$v1_b = v1_b$ (Step 500)

$x8_d = x8_d$ (Step 500)

$x6_d = x6_d$ (Step 500)

$x5_d = 0$ $x4_d = x4_d$ (Step 500)

$x3_d = x3_d$ (Step 500)

$x2_d = x2_d$ (Step 500)

$x1_d = x1_d$ (Step 500)

Again, a reverse move is required at Step 794.

Referring back to FIG. 7, after the performance of either Step 600 or Step 700 (i.e., depending on the outcome of Step 500), the next step performed is Step 800. In Step 800, the beginning time $t_b$ and the beginning position $x_b$ are calculated for each segment. This step is performed in straightforward fashion using coefficients that have previously been calculated, as follows:

$t1_b = 0$ $t2_b = t1_d$ $t3_b = t2_b + t2_d$ $t4_b = t3_b + t3_d$ $t5_b = t4_b + t4_d$ $t6_b = t5_b + t5_d$ $t8_b = t6_b + t6_d$ $t9_b = t8_b + t8_d$ $x1_b = 0$ $x2_b = x1_d$ $x3_b = x2_b + x2_d$ $x4_b = x3_b + x3_d$ $x5_b = x4_b + x4_d$ $x6_b = x5_b + x5_d$ $x8_b = x6_b + x6_d$ $x9_b = x8_b + x8_d$

In operation, for both trapezoidal and S-curve move profiles, the above-described coefficients and polynomials are then usable to generate position reference values in the following manner. For each position reference value that is generated during execution of a move command, the first step is to determine the amount of time that has elapsed since execution of the move was first initiated. This information is then used to determine which portion of the move profile (i.e., which segment) is currently being executed, i.e., based on where the current time t falls within the parameters $t_b$ for the various segments. Based on the current segment, the next position reference value is then calculated according to the following equations, which are repeated here for convenience:

$$x(t) = x_b + x_d(t)$$

$$x_d(t) = \left(v_b + \left(\frac{a_b}{2} + \frac{j_b}{6} * (t - t_b)\right) * (t - t_b)\right) * (t - t_b)$$

For example, if the current segment is segment 5, then the parameter $x_d(t)$ is first calculated using the coefficients $v5_b$, $a5_b$, $j5_b$, and $t5_b$ in the second of the two equations above. (In practice, it is also possible to utilize specialized versions of the second of the two equations, where each specialized equation is used for a particular one of the segments and results from simplifications that occur as a result of the known coefficients for that segment.) Then, the position reference value $x(t)$ is calculated using the parameter $x_d(t)$ and the coefficient $x5_b$ in the first of the two equations above. It is thus seen that it is possible to generate position reference values as a function of time based only on the knowledge of time (which can be obtained from a system clock) and on the precalculated coefficients. Thus, the amount of computation to generate position reference values during execution of a move command can be dramatically reduced.

Additionally, this manner of calculating the position reference is also more robust against variations in update time. There is no requirement for updates to occur at regular intervals, because the current time t can always be used in the second of the above two equations, regardless of when the update occurs.

Finally, it should also be noted that, in FIGS. 5A–5C and 9A–9R, various move profiles are defined some of which are characterized by non-zero initial velocity and acceleration values. Thus, it is possible to initiate a move command when the motor is already moving, because various move profiles have been defined that take this condition into account. The initial velocity and acceleration are not always assumed to be equal to zero. As a result, the method described herein can be used to permit the move parameters specified by a user to dynamically change during execution of a move command.

C. Jog Profiles

Figure 15:
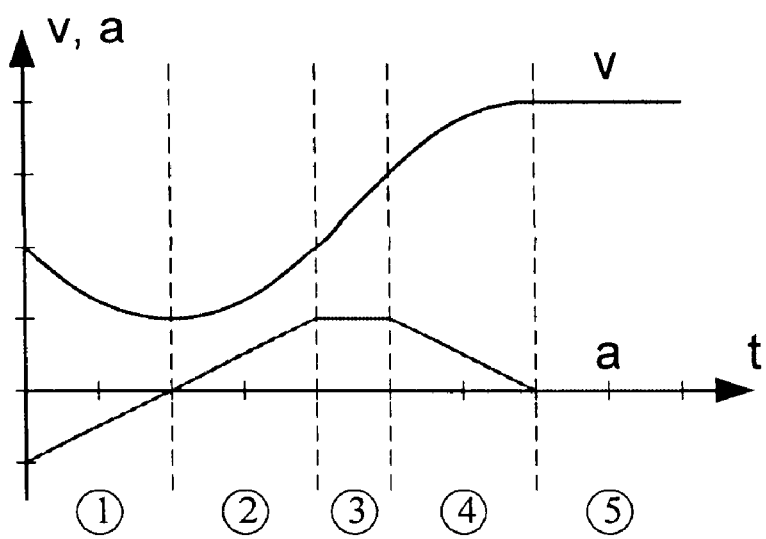
FIG. 15 is a graph of a generic jog profile in accordance with the preferred embodiment of the invention.

Referring now to FIG. 15, a graph of a generic jog profile is illustrated. As previously noted, the primary difference between a move and a jog is that for a move the user specifies a new position, whereas for a jog the user specifies a new velocity. The discussion that follows is similar in many respects to the discussion above for move profiles, except that the lack of a requirement to reach a new position allows for many simplifications to occur, as will become apparent.

According to the preferred method, any jog profile that is required to cause a motor to achieve a given velocity can be described using the generic jog profile of FIG. 15. The generic jog profile comprises five polynomial segments 1–5, which are each defined by respective polynomial coefficients. As described in greater detail below, there are various types of jog profiles that are all specific examples of the generic jog profile of FIG. 15 (see e.g. FIGS. 17A–17C and 19A–19R). When a jog command is received, various parameters are examined (such as initial velocity and acceleration) and compared with various limit conditions to determine which specific type of jog profile will permit the motor shaft to attain the desired velocity. The coefficients for the various polynomial segments are then calculated on this basis. In practice, some of the polynomial coefficients are calculated as the parameters are examined and compared, since the polynomial coefficients are sometimes required knowledge for a given comparison to occur.

Once the polynomial coefficients have all been calculated, the system has available to it a complete set of polynomials including coefficients that characterize the planned movement of the motor shaft during each segment. The system also has available to it the starting points (in terms of position and time) of each segment. Based on this information, the position reference values can be calculated much more quickly during shaft movement because most of the calculations required to generate the position reference values have already been performed.

The generic jog profile shown in FIG. 15 will now be described in greater detail. In general, the jog profile is formed of five segments each of which has different requirements for position $x(t)$, velocity $v(t)$, acceleration $a(t)$, and jerk $j(t)$. The five segments are characterized by the following features. During segment 1, the acceleration $a(t)$ is forced to zero. During segment 2, the acceleration $a(t)$ is forced to maximum acceleration or deceleration. During segment 3, the acceleration $a(t)$ is maintained at the maximum acceleration or deceleration while the velocity changes at maximum rate towards its new value. During segment 4, the acceleration $a(t)$ is forced to zero while the velocity tapers towards its new value. During segment 5, the acceleration $a(t)$ is maintained at zero and the velocity $v(t)$ is maintained at its new value.

Depending on the type of jog and the actual parameters for the new velocity vend, maximum acceleration $a_{max}$, and maximum deceleration $d_{max}$, all or only some of these segments may be utilized. If a segment is not utilized, the duration of the segment is set equal to zero.

Each segment has different specific polynomials or functions (including coefficients) for position $x(t)$, velocity $v(t)$, acceleration $a(t)$ and jerk $j(t)$, however, the mathematical functions for these parameters may be generically stated for all of the segments as follows:

$$j(t)=j_b$$

$$a_d(t) = \int_{t_b}^{t} j(\tau)d\tau$$

$$= \int_{t_b}^{t} j_b d\tau$$

$$= j_b * (t - t_b)$$

$$a(t)=a_b+a_d(t)$$

$$v_d(t) = \int_{t_b}^{t} a(\tau)d\tau$$

$$= \int_{0}^{t-t_b} a(\tau + t_b)d\tau$$

$$= \int_{0}^{t-t_b} (a_b + j_b * \tau)d\tau$$

$$= a_b * (t - t_b) + j_b * \frac{(t - t_b)^2}{2}$$

$$= \left(a_b + \frac{j_b}{2} * (t - t_b)\right) * (t - t_b)$$

$$v(t)=v_b+v_d(t)$$

$$x_d(t) = \int_{t_b}^{t} v(\tau)d\tau$$

$$= \int_{0}^{t-t_b} v(\tau + t_b)d\tau$$

$$= \int_{0}^{t-t_b} \left(v_b + a_b * \tau + j_b * \frac{\tau^2}{2}\right)d\tau$$

$$= v_b * (t - t_b) + a_b * \frac{(t - t_b)^2}{2} + j_b * \frac{(t - t_b)^3}{6}$$

$$= \left(v_b + \left(\frac{a_b}{2} + \frac{j_b}{6} * (t - t_b)\right) * (t - t_b)\right) * (t - t_b)$$

$$x(t)=x_b+x_d(t)$$

As previously defined, within these functions, x is position, v is velocity, a is acceleration, and t is time. Additionally, in the discussion below, the number following these letters indicates the segment number. Additionally, the index b represents the beginning of the segment and the index d the difference between the end and the beginning of the segment.

Section C(1) below describes the manner in which the coefficients $t_b$, $x_b$, $v_b$, $a_b$, and $j_b$ are calculated for each segment of a trapezoidal jog profile (in which a continuous acceleration profile is not required). Section C(2) below describes the manner in which these coefficients are generated for each segment of an S-curve jog profile (in which a continuous acceleration profile is required).

1. Trapezoidal Jog Profiles

Figure 16:
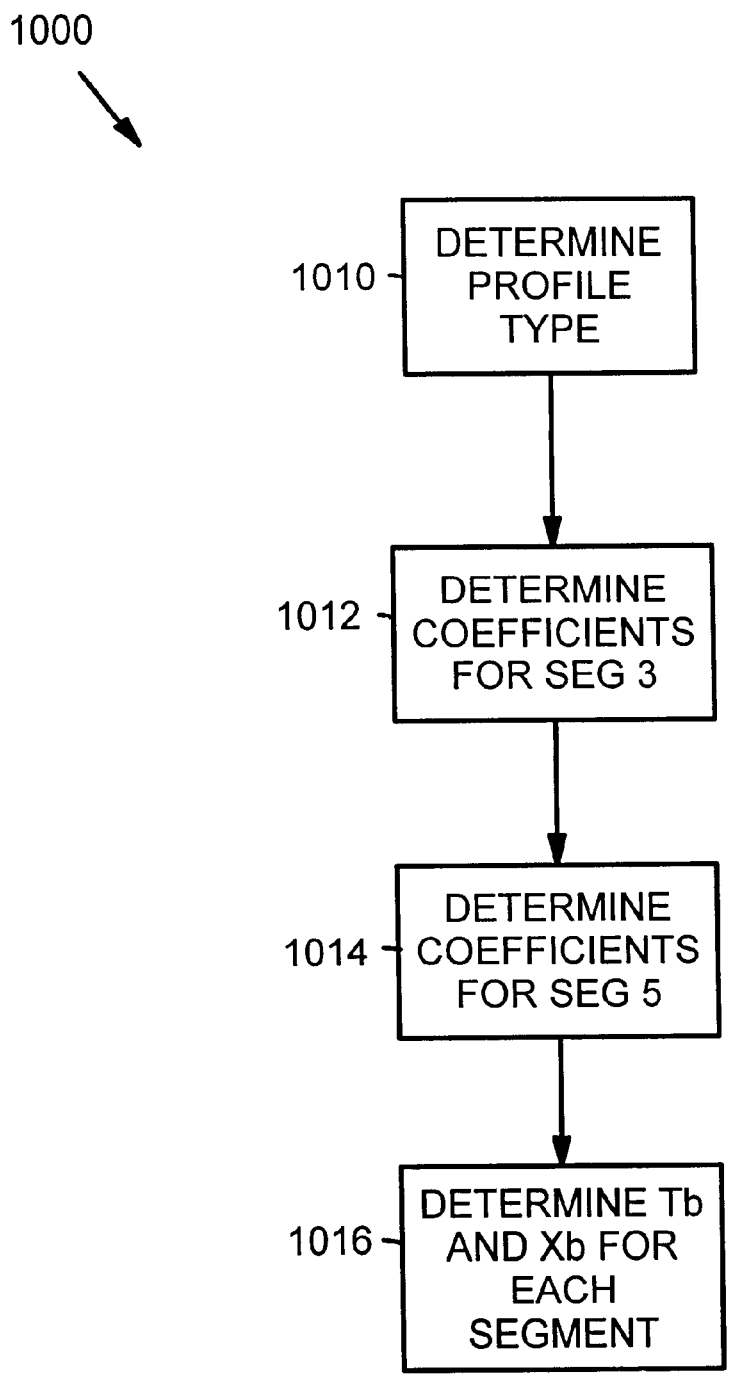
FIG. 16 is flowchart of a process used to specify values for parameters for a trapezoidal jog profile.

Referring now to FIG. 16, a flowchart of a preferred process for specifying coefficients of a trapezoidal jog profile is illustrated. By way of overview, the algorithm is separated into two steps. The first step calculates the coefficients $a_b$ and $v_b$ for each segment (Substeps 1010–1014).

The second step calculates the coefficients $t_b$ and $x_b$ for each segment (Step 1016). Because a continuous acceleration profile is not required for a trapezoidal jog, segments 1, 2 and 4 are not utilized.

Figure 17A:
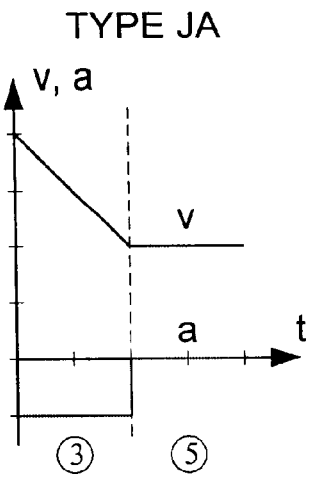
FIGS. 17A–17C are graphs of various different types of trapezoidal jog profiles.
Figure 17B:
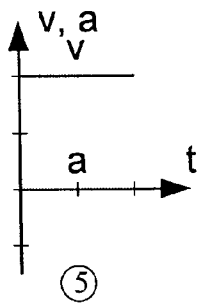
Figure 17C:
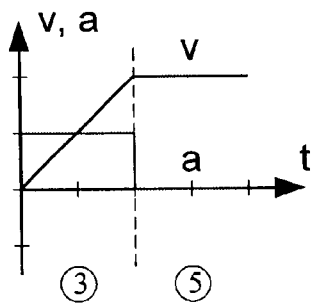

In particular, to calculate the coefficients $a_b$ and $v_b$ the type of jog profile is first determined at Step 1010. The distinguishing feature for the various types of jog profiles is the initial velocity v0 as compared to the new velocity $v_{end}$, and therefore the magnitude of the acceleration $a3_b$ for segment 3. For a trapezoidal jog, there are three basic types of jog profiles, which are shown in FIGS. 17A–17C.

For a Type JA jog profile, the initial velocity v0 is greater than the new velocity $v_{end}$ (i.e., v0>$v_{end}$). The Type JA jog profile is shown in FIG. 17A. If the profile is a Type JA jog profile, then the acceleration $a3_b$ for segment 3 is set equal to the maximum deceleration (which is defined to be positive) multiplied by minus 1 as follows:

$$a3_b = -d_{max}$$

For a Type JB jog profile, the initial velocity v0 is equal to the new velocity $v_{end}$ (i.e., v0=$v_{end}$). The Type JB jog profile is shown in FIG. 17B. If the profile is a Type JB jog profile, then the acceleration $a3_b$ for segment 3 is set equal to zero as follows:

$$a3_b = 0$$

For a Type JC jog profile, the initial velocity v0 is less than the new velocity $v_{end}$ (i.e., v0<$v_{end}$). The Type JC jog profile is shown in FIG. 17C. If the profile is a Type JC jog profile, then the acceleration $a3_b$ for segment 3 is set equal to the maximum acceleration $a_{max}$ as follows:

$$a3_b = a_{max}$$

It is therefore seen that by determining the initial velocity and comparing the initial velocity to the new velocity, the acceleration that is required during segment 3 and therefore the type of trapezoidal jog profile that can be utilized is determined.

In Steps 1012 to 1014, based on the profile type, additional segment coefficients are calculated. In particular, at Step 1012, the values for segment 3 are calculated. Initially, the beginning velocity $v3_b$ for segment 3 is set equal to the initial velocity v0:

$$v3_b = v0$$

If the beginning acceleration $a3_b$ for segment 3 is not equal to zero (i.e., $a3_b \neq 0$) (i.e., the trapezoidal jog has either a Type JA jog profile or a Type JC jog profile) then the duration $t3_d$ of segment 3 is calculated as follows:

$$t3_d = \frac{v_{end} - v3_b}{a3_b}$$

Otherwise, if the trapezoidal jog has a Type JB jog profile (i.e., $a3_b=0$) then the duration $t3_d$ of segment 3 is set equal to zero:

$$t3_d = 0$$

In either event, the change in position $x3_d$ for segment 3 is then calculated based on the initial velocity $v3_b$ and the change in time $t3_d$ for segment 3 as follows:

$$x3_d = \left(v3_b + \frac{a3_b}{2} * t3_d\right) * t3_d$$

$$= \frac{v3_b + v_{end}}{2} * t3_d$$

At Step 1014, the values for coefficients of segment 5 are calculated as follows:

$$a5_b = 0$$

$$v5_b = v_{end}$$

At Step 1016, the initial time and initial position coefficients $t_b$ and $x_b$ are determined for each segment as follows:

$$t3_b = 0$$

$$t5_b = t3_d$$

$$x3_b = 0$$

$$x5_b = x3_d$$

2. S-Curve Jog Profiles

Figure 18:
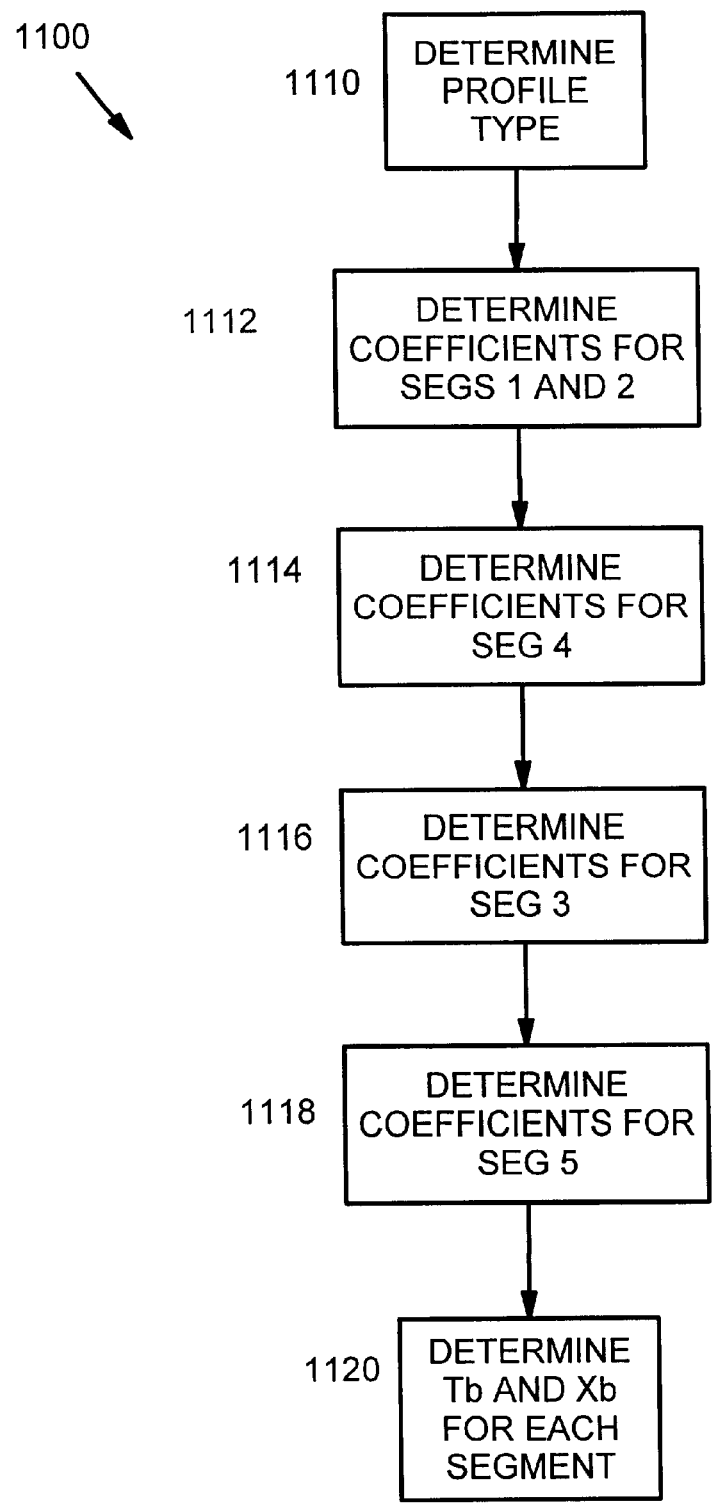
FIG. 18 is a flowchart of a process used to specify parameters of an S-curve jog profile.

Referring now to FIG. 18, a flowchart of a preferred process for characterizing an S-curve jog profile is illustrated. By way of overview, the algorithm is separated into two steps. The first step calculates the coefficients $j_b$, $a_b$, and $v_b$ for each segment (Substeps 1110–1118). The second step calculates the coefficients $t_b$ and $x_b$ for each segment (Step 1120).

Figure 19A:
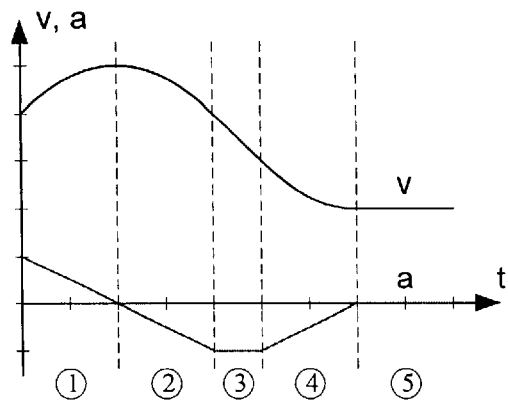
FIGS. 19A–19R are various different types of S-curve jog profiles.
Figure 19B:
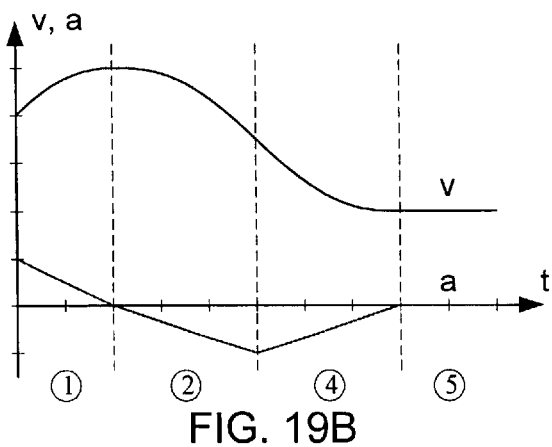
Figure 19C:
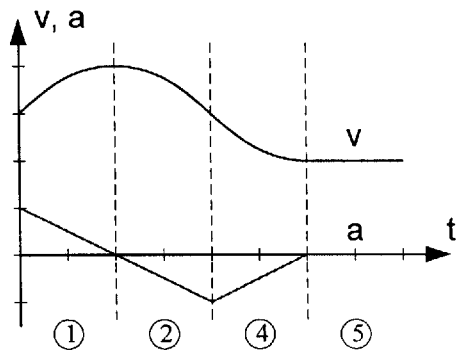
Figure 19D:
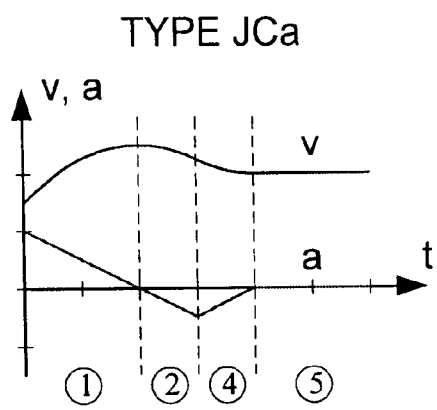
Figure 19E:
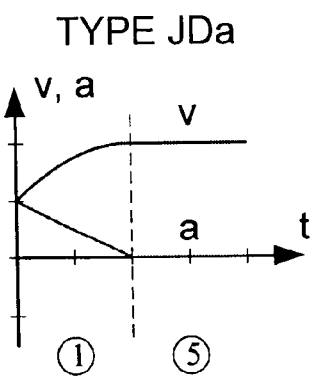
Figure 19F:
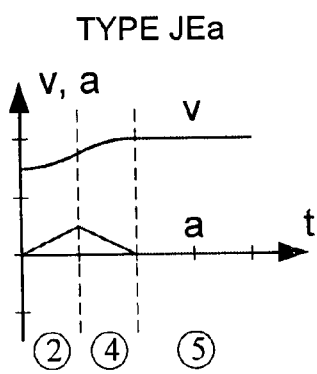
Figure 19G:
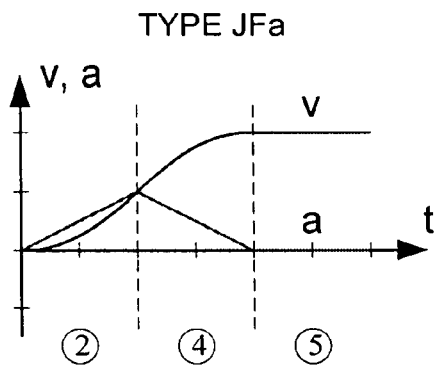
Figure 19H:
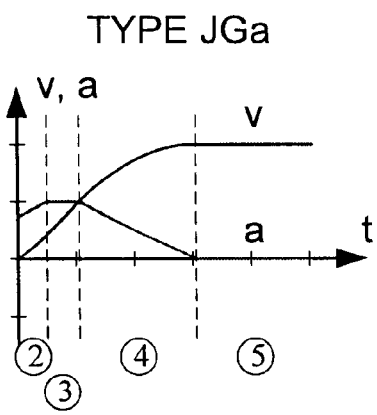
Figure 19I:
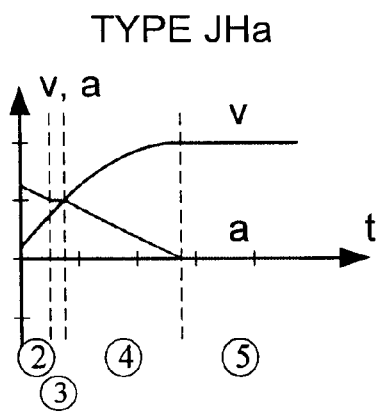
Figure 19J:
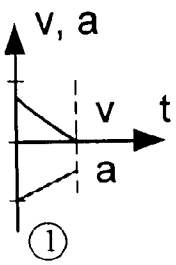
Figure 19K:
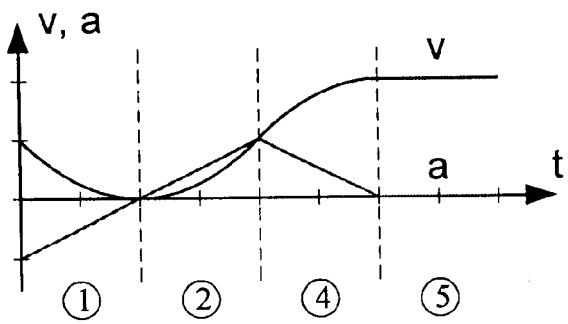
Figure 19L:
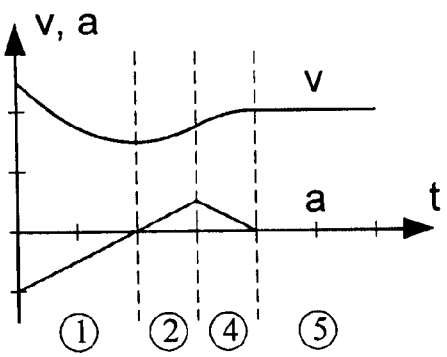
Figure 19M:
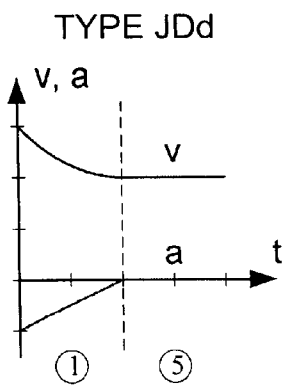
Figure 19N:
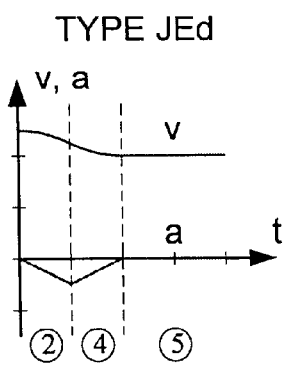
Figure 19O:
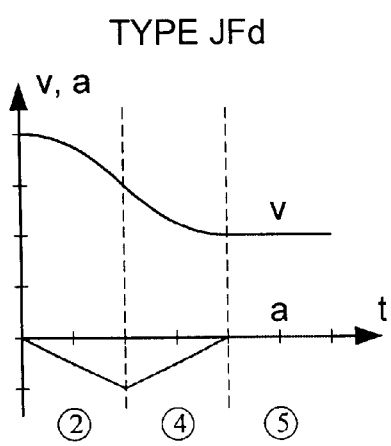
Figure 19P:
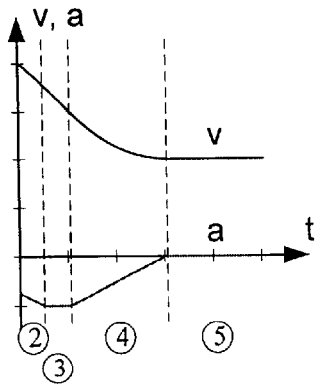
Figure 19Q:
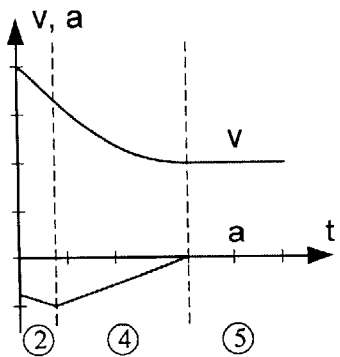
Figure 19R:
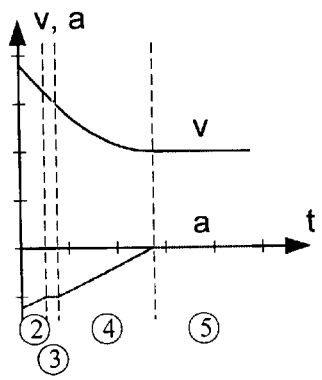

In particular, at Step 1110, the type of jog profile that is required is determined. For an S-curve jog, there are numerous types of jog profiles, which are shown in FIGS. 19A–19R. The various types of S-curve jog profiles are distinguished according to several key features. The first key feature that is used to distinguish the various types of S-curve jog profiles is the initial acceleration a0. The S-curve jog profile types that have an initial acceleration a0 that is greater than or equal to zero (i.e., a0≧0) are designated with the letter a and shown in FIGS. 19A–19I (Types $JA_a$ to $JH_a$). The S-curve jog profile types that have an acceleration a0 that is less than zero (i.e., a0<0) are designated with the letter d and are shown in FIGS. 19J–19R (Types $JA_d$ to $JH_d$).

In order to simplify the following algorithm the parameters starting segment ss, maximum jerk during acceleration $ja_{max}$, and maximum jerk during deceleration $jd_{max}$ are defined as follows:

$$ja_{max} = \frac{a_{max}^2}{v_{end}}$$

$$jd_{max} = \frac{d_{max}^2}{v_{end}}$$

The remaining key features that are used to distinguish the various types of S-curve jog profiles are the difference in velocity $v1_d$ for segment 1, the difference in velocity $v14_d$ for segments 1–4, and the difference in velocity $v24_d$ for segments 2–4. If the initial acceleration a0 is not equal to zero (i.e., a0≠0), then these parameters may be calculated according to the following equations:

$$v1_d = \frac{a0^2}{2*ja_{max}}$$

$v14_d=v0-v1_d-v_{end}$ $v24_d=v0+v1_d-v_{end}$

Otherwise, if the initial acceleration is equal to zero (i.e., a0=0), then the difference in velocity for segment 1 may be calculated as follows:

$v1_d=0$

If the initial velocity is not equal to zero (i.e., v0≠0), then the difference in velocity $v14_d$ may be calculated as follows:

$v14_d=v0-v_{end}$

Otherwise, the difference in velocity $v14_d$ may be calculated as follows:

$v14_d=-v_{end}$

In either case, the difference in velocity $v24_d$ may be calculated as follows:

$v24_d=v14_d$

Based on these parameters, the various types of jog profiles are then differentiated from each other as follows. For a Type $JA_a$ jog profile, the difference in velocity $v24_d$ for segments 2–4 is greater than the new velocity $v_{end}$ ($v24_d>v_{end}$). Two variations of the Type $JA_a$ jog profile are shown in FIGS. 19A and 19B. The profile shown in FIG. 19A is a fast deceleration profile, which means that the acceleration $a3_b$ for segment 3 is set equal to the maximum deceleration. The profile shown in FIG. 19B is a slow deceleration profile, which means that the duration of segments 2 and 4 are lengthened and segment 3 is eliminated such that the maximum deceleration is not used. Either the profile shown in FIG. 19A or the profile shown in FIG. 19B may be employed depending on the application.

If the fast deceleration profile is employed, then the following coefficients are assigned values according to the following equations:

ss=1

$j1_b=-ja_{max}$ $j2_b=-d_{max}$ $j4_b=jd_{max}$ $a3_b=-d_{max}$

If the slow deceleration profile is employed, then the following coefficients are assigned values according to the following equations:

ss=1

$j1_b=-ja_{max}$ $$v24_d = \frac{d_{max}^2}{j4_b}$$

$$j4_b = \frac{d_{max}^2}{v24_d}$$

$j2_b=-j4_b$ $a3_b=-d_{max}$

For a Type $JB_a$ jog profile, the difference in velocity $v24_d$ between segments 2 and 4 is equal to the new velocity $v_{end}$ (i.e., $v24_d=v_{end}$). This type of S-curve jog profile is shown in FIG. 19C. If the profile is a Type $JB_a$ jog profile, then the following coefficients are assigned values according to the following equations:

ss=1

$j1_b=-ja_{max}$ $j2_b=-jd_{max}$ $j4_b=jd_{max}$ $a3_b=-d_{max}$

For a Type $JC_a$ jog profile, the difference in velocity between segments 2 and 4 is greater than zero (i.e., $v24_d>0$). The Type $JC_a$ jog profile is shown in FIG. 19D. If the profile is a Type $JC_a$ jog profile, then the following coefficients are assigned values according to the following equations:

ss=1

$j1_b=-ja_{max}$ $j2_b=-jd_{max}$ $j4_b=jd_{max}$ $a3_b=-\sqrt{v24_d*jd_{max}}$

For a Type $JD_a$ jog profile, the difference in velocity $v24_d$ between segments 2 and 4 is equal to zero (i.e., $v24_d=0$). The Type $JD_a$ jog profile is shown in FIG. 19E. If the profile is a Type $JD_a$ jog profile, then the following coefficients are assigned values according to the following equations:

ss=1

$j1_b=-ja_{max}$ $j2_b=-jd_{max}$ $j4_b=jd_{max}$ $a3_b=0$

For a Type $JE_a$ jog profile, the initial velocity v0 is greater than the difference in velocity for segment 1 (i.e., $v0>v1_d$). The Type $JE_a$ jog profile is shown in FIG. 19F. If the profile is a Type $JE_a$ jog profile, then the following coefficients are assigned values according to the following equations:

ss=2

$j1_b=0$ $j2_b=ja_{max}$ $j4_b=-ja_{max}$ $a3_b=\sqrt{-v14_d*ja_{max}}$

For a Type $JF_a$ jog profile, the initial velocity v0 is equal to the difference in velocity v1 for segment 1 and the initial acceleration a0 is less then or equal to the maximum acceleration $a_{max}$ (i.e., v0=$v1_d$ & a0≦$a_{max}$). The Type $JF_a$ jog profile is shown in FIG. 19G. If the profile is a Type $JF_a$ jog profile, then the following coefficients are assigned values according to the following equations:

ss=2

$j1_b$=0

$j2_b$=$ja_{max}$ $j4_b$=−$ja_{max}$ $a3_b$=$a_{max}$

For a Type $JG_a$ jog profile, the initial velocity v0 is less than the difference in velocity $v1_d$ for segment 1 and the initial velocity a0 is less than or equal to the maximum acceleration $a_{max}$ (i.e., v0<$v1_d$ & a0≦$a_{max}$). The Type $JG_a$ jog profile is shown in FIG. 19H. If the profile is a Type $JG_a$ jog profile, then the following coefficients are assigned values according to the following equations:

ss=2

$j1_b$=0

$j2_b$=$ja_{max}$ $j4_b$=−$ja_{max}$ $a3_b$=$a_{max}$

For a Type $JH_a$ jog profile, the initial velocity v0 is less than or equal to the difference in velocity $v1_d$ for segment 1 and the initial acceleration a0 is greater than the maximum acceleration $a_{max}$ (i.e., v0≦$v1_d$ & a0>$a_{max}$). The Type $JH_a$ jog profile is shown in FIG. 19I. If the profile is a Type $JH_a$ jog profile, then the following coefficients are assigned values according to the following equations:

ss=2

$j1_b$=0

$j2_b$=−$ja_{max}$ $j4_b$=−$ja_{max}$ $a3_b$=$a_{max}$

For the jog profile types in which the initial acceleration is less than zero (i.e., types $A_d$ through $H_d$), the key features for distinguishing the various jog profile types are again the difference in velocity $v1_d$ for segment 1, the difference in velocity $v14_d$ for segments 1 to 4, and the difference in velocity $v24_d$ for segments 2 to 4. In this case, these coefficients are calculated according to the following equations:

$$v1_d = \frac{a0^2}{2*jd_{max}}$$

$v14_d$=v0−$v1_d$−$v_{end}$ $v24_d$=v0+$v1_d$−$v_{end}$

For a Type $JA_d$ jog profile, the initial velocity v0 is less than the difference in velocity $v1_d$ for segment 1 multiplied by minus 1 (i.e., v0<−$v1_d$). The Type $JA_d$ jog profile is shown in FIG. 19J. If the profile is a Type $JA_d$ jog profile, then the following coefficients are assigned values according to the following equations:

$j1_b$=$jd_{max}$ $j2_b$=0

$j4_b$=0

$a1_b$=a0

$v1_b$=v0

$$tl_d = \frac{a2_b - a1_b}{jl_b}$$

$$vl_b = -\left(al_b + \frac{jl_b}{2}*tl_d\right)*tl_d$$
$$= -\frac{al_b + a2_b}{2} * \frac{a2_b - al_b}{jl_b}$$
$$= \frac{al_b^2 - a2_b^2}{2*jl_b}$$

$a2_b$=−$\sqrt{a1_b^{2-2*v1_b*j1_b}}$ $a3_b$=$a2_b$ $a4_b$=$a3_b$ $a5_b$=$a4_b$ $$tl_d = \frac{a2_b - al_b}{jl_b}$$

$t2_d$=0

$t3_d$=0

$t4_d$=0

$v2_b$=0

$v3_b$=$v2_b$ $v4_b$=$v3_b$ $v5_b$=$v4_b$ $$xl_d = \left(vl_b + \left(\frac{al_b}{2} + \frac{jl_b}{6}*tl_d\right)*tl_d\right)*tl_d$$
$$= \left(vl_b + \left(\frac{al_b}{2} + \frac{a2_b}{6}\right)*tl_d\right)*tl_d$$

$x2_d$=0

$x3_d$=0

$x4_d$=0

For a Type $JB_d$ jog profile, the initial velocity v0 is equal to the difference in velocity $v1_d$ for segment 1 multiplied by minus 1 (i.e., v0=−$v1_d$). The Type $JB_d$ jog profile is shown in FIG. 19K. If the profile is a Type $JB_d$ jog profile, then the following coefficients are assigned values according to the following equations:

ss=1

$j1_b$=$jd_{max}$ $j2_b = ja_{max}$ $j4_b = -ja_{max}$ $a3_b = a_{max}$

For a Type $JC_d$ jog profile, the difference in velocity $v24_d$ for segment 2 and 4 is less than zero (i.e., $v24_d<0$). The Type $JC_d$ jog profile is shown in FIG. 19L. If the profile is a Type $JC_d$ jog profile, then the following coefficients are assigned values according to the following equations:

$ss=1$ $j1_b = jd_{max}$ $j2_b = ja_{max}$ $j4_b = -ja_{max}$ $a3_b = \sqrt{-v24_d * ja_{max}}$ For a Type $JD_d$ jog profile, the difference in velocity $v24_d$ for segments 2 and 4 is equal to zero (i.e., $v24_d=0$). The Type $JD_d$ jog profile is shown in FIG. 19M. If the profile is a Type $JD_d$ jog profile, then the following coefficients are assigned values according to the following equations:

$ss=1$ $j1_b = jd_{max}$ $j2_b = ja_{max}$ $j4_b = -ja_{max}$ $a3_b = 0$

For a Type $JE_d$ jog profile, the difference in velocity $v14_d$ for segments 1 and 4 is less than the new velocity $v_{end}$ to zero (i.e., $v14_d<v_{end}$). The Type $JE_d$ jog profile is shown in FIG. 19N. If the profile is a Type $JE_d$ jog profile, then the following coefficients are assigned values according to the following equations:

$ss=2$ $j1_b = 0$ $j2_b = -jd_{max}$ $j4_b = jd_{max}$ $a3_b = -\sqrt{v14_d * jd_{max}}$ For a Type $JF_d$ jog profile, the difference in velocity $v14_d$ for segments 1 and 4 is equal to the new velocity $v_{end}$ and the initial acceleration a0 is greater than or equal to the maximum deceleration multiplied by minus 1 (i.e., $v14_d = v_{end}$ & $a0 \geq -d_{max}$). The Type $JF_d$ jog profile is shown in FIG. 19O. If the profile is a Type $JF_d$ jog profile, then the following coefficients are assigned values according to the following equations:

$ss=2$ $j1_b = 0$ $j2_b = -jd_{max}$ $j4_b = jd_{max}$ $a3_b = -d_{max}$

For a Type $JG_d$ jog profile, the difference in velocity $v14_d$ for segments 1 and 4 is greater than the new velocity $v_{end}$ and the initial acceleration a0 is greater than or equal to the maximum deceleration $d_{max}$ multiplied by minus 1 (i.e., $v14_d>v_{end}$ & $a0 \geq -d_{max}$). Two alternatives of the Type $JG_d$ jog profile are shown in FIGS. 19P and 9Q. FIG. 19P shows a fast deceleration variant of the Type $JG_d$ jog profile, and FIG. 19Q shows a slow deceleration variant of the Type $JG_d$ jog profile. If the fast deceleration variant of the Type $JG_d$ jog profile is utilized, then the following coefficients are assigned values according to the following equations:

$ss=2$ $j1_b = 0$ $j2_b = -jd_{max}$ $j4_b = jd_{max}$ $a3_b = -d_{max}$

If the slow deceleration variant of the Type $JG_d$ jog profile is utilized then the following coefficients are assigned values according to the following equations:

$ss=2$ $j1_b = 0$ $$v0 - v_{end} = \frac{d_{max}^2}{j4_b} - \frac{a0^2}{2*j4_b}$$

$$j4_b = \frac{d_{max}^2 - \frac{a0^2}{2}}{v0 - v_{end}}$$

$j2_b = -j4_b$ $a3_b = -d_{max}$

For a Type $JH_d$ jog profile, the difference in velocity $v14_d$ between segments 1 and 4 is greater than or equal to the new velocity $v_{end}$ and the initial acceleration a0 is less than the maximum deceleration $d_{max}$ multiplied by minus 1 (i.e., $v14_d \geq v_{end}$ & $a0 < -d_{max}$). The Type $JH_d$ jog profile is shown in FIG. 19R. If the profile is a Type $JH_d$ jog profile, then the following coefficients are assigned values according to the following equations:

$ss=2$ $j1_b = 0$ $j2_b = jd_{max}$ $j4_b = jd_{max}$ $a3_b = -d_{max}$

From the foregoing discussion, it is therefore seen that profile type can be determined based on the initial acceleration a0, the difference in velocity $v1_d$ for segment 1, the difference velocity $v14_d$ for segments 1–4, and the difference in velocity $v24_d$ for segments 2–4.

Returning to FIG. 18, after the profile type is determined at Step 1110, the additional segment coefficients are calculated. At Step 1112, the values for coefficients of segments 1 and 2 are calculated. If the profile starts with segment 1 (i.e., ss=1), and if the initial acceleration a0 is not equal to zero (i.e., a0≠0), then the coefficients for segment 1 may be calculated according to the following equations:

$a1_b = a0$ $$t1_d = -\frac{a1_b}{j1_b}$$

$$v1_d = \left(a1_b + \frac{j1_b}{2} * t1_d\right) * t1_d$$

$$= \frac{a1_b}{2} * t1_d$$

$v1_b = v0$ $$x1_d = \left(v1_b + \left(\frac{a1_b}{2} + \frac{j1_b}{6} * t1_d\right) * t1_d\right) * t1_d$$

$$= \left(v1_b + \frac{a1_b}{3} * t1_d\right) * t1_d$$

$$= \left(v1_b + \frac{2 * v1_d}{3}\right) * t1_d$$

If the profile starts with segment 1 (i.e., ss=1), and if the initial acceleration a0 is not equal to zero (i.e., a0≠0), then the coefficients for segment 2 may be calculated according to the following equations:

$a2_b = 0$ $$t2_d = \frac{a3_b}{j2_b}$$

$$v2_d = \left(a2_b + \frac{j2_b}{2} * t2_d\right) * t2_d$$

$$= \frac{a3_b}{2} * t2_d$$

$v2_b = v1_b + v1_d$ $$x2_d = \left(v2_b + \left(\frac{a2_b}{2} + \frac{j2_b}{6} * t2_d\right) * t2_d\right) * t2_d$$

$$= \left(v2_b + \frac{a3_b}{6} * t2_d\right) * t2_d$$

$$= \left(v2_b + \frac{v2_d}{3}\right) * t2_d$$

If the profile starts with segment 1 (i.e., ss=1) and if the initial acceleration a0 is equal to zero (i.e., a0=0), then the coefficients for segment 1 may be calculated according to the following equations:

$a1_b = 0$ $t1_d = 0$ $v1_d = 0$ $v1_b = v0$ $x1_d = 0$

If the profile starts with segment 1 (i.e., ss=1), and if the initial acceleration a0 is equal to zero (i.e., a0=0), then the coefficients for segment 2 may be calculated according to the following equations:

$a2_b = 0$ $$t2_d = \frac{a3_b}{j2_b}$$

$$v2_d = \frac{a3_b}{2} * t2_d$$

$v2_b = v1_b$

Further, in this case (ss=1 and a0=0), if the beginning velocity $v2_b$ for segment 2 is not equal to zero (i.e., $v2_b \neq 0$), then the difference in position $x2_d$ for segment 2 may be calculated according to the following equation:

$$x2_d = \left(v2_b + \frac{v2_d}{3}\right) * t2_d$$

Otherwise, if the beginning velocity $v2_b$ for segment 2 is equal to zero (i.e., $v2_b = 0$), the change in position $x2_d$ for segment 2 may be calculated as follows:

$$x2_d = \frac{v2_d}{3} * t2_d$$

If the profile starts with segment 2 (i.e., ss=2), and if the initial acceleration a0 is not equal to zero (i.e., a0≠0), then the coefficients for segment 1 may be calculated according to the following equations:

$a1_b = a0$ $t1_d = 0$ $v1_d = 0$ $v1_b = v0$ $x1_d = 0$

If the profile starts with segment 2 (i.e., ss=2), and if the initial acceleration a0 is not equal to zero (i.e., a0≠0), then the coefficients for segment 2 may be calculated according to the following equations:

$a2_b = a0$ $$t2_d = \frac{a3_b - a2_b}{j2_b}$$

$$v2_d = \left(a2_b + \frac{j2_b}{2} * t2_d\right) * t2_d$$

$$= \frac{a2_b + a3_b}{2} * t2_d$$

$v2_b = v0$ $$x2_d = \left(v2_b + \left(\frac{a2_b}{2} + \frac{j2_b}{6} * t2_d\right) * t2_d\right) * t2_d$$

$$= \left(v2_b + \left(\frac{a2_b}{3} + \frac{a3_b}{6}\right) * t2_d\right) * t2_d$$

If the profile starts with segment 2 (i.e., ss=2), and if the initial acceleration a0 is equal to zero (i.e., a0=0), then the coefficients for segment 1 may be calculated according to the following equations:

$a1_b = 0$ $t1_d=0$ $v1_d=0$ $v1_b=v0$ $x1_d=0$

If the profile starts with segment 2 (i.e., ss=2), and if the initial acceleration a0 is equal to zero (i.e., a0=0), then the coefficients for segment 2 may be calculated according to the following equations:

$a2_b=0$ $t2_d = \dfrac{a3_b}{j2_b}$ $v2_d = \dfrac{a3_b}{2} * t2_d$ $v2_b=v0$

Further, in this case (ss=2 and a0=0), if the velocity $v2_b$ at the beginning of segment 2 is not equal to zero (i.e., $v2_b \neq 0$), then the difference in position $x2_d$ may be calculated according to the following equations:

$x2_d = \left(v2_b + \dfrac{a3_b}{6} * t2_d\right) * t2_d$ $= \left(v2_b + \dfrac{v2_d}{3}\right) * t2_d$ Otherwise, if the beginning velocity $v2_b$ for segment 2 is equal to zero (i.e., $v2_b=0$), then the change in position $x2_d$ for segment 2 may be calculated according to the following equation:

$x2_d = \dfrac{v2_d}{3} * t2_d$

At Step 1114, the values for the coefficients of segment 4 are calculated according to the following equations:

$a4_b=a3_b$ $t4_d = -\dfrac{a4_b}{j4_b}$ $v4_d = \left(a4_b + \dfrac{j4_b}{2} * t4_d\right) * t4_d$ $= \dfrac{a4_b}{2} * t4_d$ $v4_b = v_{end} - v4_d$ $x4_d = \left(v4_b + \left(\dfrac{a4_b}{2} + \dfrac{j4_b}{6} * t4_d\right) * t4_d\right) * t4_d$ $= \left(v4_b + \dfrac{a4_b}{3} * t4_d\right) * t4_d$ $= \left(v4_b + \dfrac{2 * v4_d}{3}\right) * t4_d$ $= \left(v_{end} - \dfrac{v4_d}{3}\right) * t4_d$ At Step 1116, the values for the coefficients of segment 3 are calculated according to the following equation:

$v3_b = v2_b + v2_d$

If the acceleration $a3_b$ at the beginning of segment 3 is not equal to zero (i.e., $a3_b \neq 0$), then the change in time $t3_d$ for segment 3 may be calculated as follows:

$t3_d = \dfrac{v4_b - v3_b}{a3_b}$

Otherwise, the change in time $t3_d$ for segment 3 is set equal to zero:

$t3_d=0$

Based on the calculated velocity $v3_b$ and change in time $t3_d$ for segment 3, the change in position $x3_d$ for segment 3 is calculated as follows:

$x3_d = \left(v3_b + \dfrac{a3_b}{2} * t3_d\right) * t3_d$ $= \left(v3_b + \dfrac{v3_d}{2}\right) * t3_d$ $= \dfrac{v3_b + v4_b}{2} * t3_d$ At Step 1118, the values for the coefficients of segment 5 are calculated according to the following equations:

$a5_b=0$ $v5_b=v_{end}$

At Step 1120, the coefficients $t_b$ and $x_b$ are calculated for each segment.

$t1_b=0$ $t2_b=t1_d$ $t3_b=t2_b+t2_d$ $t4_b=t3_b+t3_d$ $t5_b=t4_b+t4_d$ $x1_b=0$ $x2_b=x1_d$ $x3_b=x2_b+x2_d$ $x4_b=x3_b+x3_d$ $x5_b=x4_b+x4_d$

Many other changes and modifications may be made to the present invention without departing from the spirit thereof. The scope of these and other changes will become apparent from the appended claims.

I claim:

1. A method of controlling a motor comprising:
    (A) providing a motion control system, the motion control system including the motor and a motion control loop, the motion control loop being operative to control a shaft of the motor based on a reference value;
    (B) causing the shaft of the motor to move from an initial state to a new state, the shaft of the motor having a non-zero initial velocity when the motor is at the initial state, including
       (1) determining coefficients for each of a plurality of polynomial segments of a motion profile, the plurality of polynomial segments and the corresponding coefficients for each respective segment characterizing planned movement of the shaft through each respective segment, and (2) controlling the shaft of the motor using the motion control loop, the shaft being controlled by the motion control loop based on reference values generated using the plurality of polynomial segments and the corresponding coefficients for each respective segment, the shaft being controlled such that the shaft moves from the initial state to the new state, and the controlling step including producing a non-negative jerk, the non-negative jerk causing the shaft to accelerate to a peak velocity that is less than a predetermined maximum velocity of the shaft.

2. A method according to claim 1, wherein the initial state is an initial position and the new state is a new position.

3. A method according to claim 1, wherein the initial state is an initial velocity and the new state is a new velocity.

4. A method according to claim 1, wherein the reference values are a series of reference values that are spaced in time from each other by an amount that is on the order of milliseconds.

5. A method according to claim 1,
wherein the initial state is an initial position and the new state is a new position,
wherein the motion control loop is a position control loop,
wherein the series of reference inputs are position reference values, and
wherein the controlling step includes obtaining feedback position information from a position sensor that provides information pertaining to the position of the motor shaft, and controlling the shaft by comparing the feedback position information with sequential ones of the series of position reference values.

6. A method according to claim 1,
wherein each segment is defined by a plurality of polynomials, including a first polynomial that describes shaft position with respect to time, a second polynomial that describes shaft velocity with respect to time, and a third polynomial that describes shaft acceleration with respect to time, and
wherein at least one coefficient for each of the first, second and third polynomials are determined during the determining step.

7. A method according to claim 1, wherein the motion control system includes a motion controller and a servo drive, wherein the motion control loop is a position control loop and is formed by the motion controller and the servo drive, and wherein the servo drive also includes a torque control loop.

8. A method according to claim 7, wherein the providing step includes providing an industrial control system, the motion control system being part of the industrial control system, the industrial control system including a rack mounted industrial controller, the rack mounted industrial controller having a backplane and a plurality of slots that are adapted to receive a plurality of modules, and the motion controller being provided in the form of a module that is received by the rack mounted industrial controller.

9. A method according to claim 1, wherein the segments are at least second order polynomial segments.

10. A method according to claim 1, wherein the coefficients are substantially all precalculated relative to when the shaft begins moving from the initial state to the new state.

11. A method according to claim 1, wherein the motion profile is determined while the shaft is moving.

12. A method according to claim 1, further comprising selecting the motion profile from a plurality of possible profiles.

13. A method of controlling a motor comprising:
(A) providing a motion control system, the motion control system including the motor and a motion control loop, the motion control loop being operative to control a shaft of the motor based on a reference value;
(B) causing the shaft of the motor to move from an initial state to a new state, including
(1) determining coefficients for each of a plurality of polynomial segments of a motion profile, the plurality of polynomial segments and the corresponding coefficients for each respective segment characterizing planned movement of the shaft through each respective segment, and
(2) controlling the shaft of the motor using the motion control loop, the shaft being controlled by the motion control loop based on reference values generated using the plurality of polynomial segments and the corresponding coefficients for each respective segment, the shaft being controlled such that the shaft moves from the initial state to the new state;
wherein the method further comprises selecting the motion profile from a plurality of possible profiles, wherein the plurality of possible profiles are specific types of a generic profile, and wherein the generic profile includes
a first segment in which the acceleration is forced to zero;
a second segment in which the acceleration is forced to a maximum magnitude;
a third segment in which the acceleration is maintained at the maximum magnitude;
a fourth segment in which the acceleration is forced to zero;
a fifth segment in which the acceleration is maintained at zero and the velocity is maintained at a maximum magnitude;
a sixth segment in which the acceleration is forced to a maximum deceleration;
a seventh segment in which the acceleration is maintained at a maximum magnitude;
an eighth segment in which the acceleration is forced to zero; and
a ninth segment in which the acceleration is maintained at zero.

14. A method according to claim 13, wherein the selecting step is performed based on an initial acceleration, a starting segment, information pertaining to a change in velocity between two segments relative to a maximum velocity.

15. A method according to claim 1, further comprising precalculating velocity and acceleration coefficients for each segment, the velocity and acceleration coefficients being calculated in advance of when movement from the initial state is initiated.

16. A method according to claim 1, wherein the determining step is performed based on an initial velocity value and an initial acceleration value, the initial velocity and the initial acceleration having a plurality of different possible values.

17. A method according to claim 1, wherein the determining step comprises
determining an initial velocity;
determining an initial acceleration;
based on the initial velocity and acceleration, determining the motion profile that is required to deliver the output shaft to the new state.

18. An industrial control system comprising:

(A) a motor;

(B) a servo drive, the servo drive being coupled to the motor, the servo drive being capable of providing the motor with current to drive the motor;

(C) a motion controller, the motion controller being coupled to the servo drive, the motion controller including a position control loop, the position control loop being capable of controlling an output position of a shaft of the motor so as to move from an initial position to a new position based on a series of position reference inputs;

(D) a control program, the control program being capable of being executed to provide the position control loop with the series of position reference inputs, the control program determining coefficients for each of a plurality of polynomial segments of a motion profile, the plurality of polynomial segments and the corresponding coefficients for each respective segment characterizing planned movement of the shaft through each respective segment, and the control program controlling the shaft of the motor using the position control loop, the shaft being controlled by the position control loop based on reference values generated using the plurality of polynomial segments and the corresponding coefficients for each respective segment, the shaft being controlled such that the shaft moves from the initial state to the new state, and the shaft being controlled such that a non-negative jerk is produced when the shaft of the motor has a non-zero initial velocity at the initial state, the non-negative jerk causing the shaft to accelerate to a peak velocity that is less than a predetermined maximum velocity of the shaft.

19. An industrial control system according to claim 18, wherein the control program is contained in the motion controller and is executed by a microprocessor of the motion controller.

20. An industrial control system according to claim 18, further comprising a rack mounted industrial controller, the industrial controller being coupled to the motion controller, and wherein the control program is contained in the industrial controller and is executed by a microprocessor of the industrial controller, and wherein the series of position reference inputs are provided by the industrial controller to the motion controller.

21. An industrial control system according to claim 18, wherein the initial state is an initial position and the new state is a new position.

22. An industrial control system according to claim 18, wherein the initial state is an initial velocity and the new state is a new velocity.

23. An industrial control system according to claim 18, wherein the reference values are a series of reference values that are spaced in time from each other by an amount that is on the order of milliseconds.

24. An industrial control system according to claim 18,
wherein the initial state is an initial position and the new state is a new position,
wherein the motion control loop is a position control loop,
wherein the series of reference inputs are position reference values, and
wherein the position control loop obtains feedback position information from a position sensor that provides information pertaining to the position of the motor shaft, and controls the shaft by comparing the feedback position information with sequential ones of the series of position reference values.

25. An industrial control system according to claim 18,
wherein each segment is defined by a plurality of polynomials, including a first polynomial that describes shaft position with respect to time, a second polynomial that describes shaft velocity with respect to time, and a third polynomial that describes shaft acceleration with respect to time, and
wherein at least one coefficient for each of the first, second and third polynomials are determined.

26. An industrial control system according to claim 18, wherein the position control loop is formed by the motion controller and the servo drive, wherein the servo drive also includes a torque control loop, wherein the rack mounted industrial controller includes a backplane and a plurality of slots that are adapted to receive a plurality of modules, and wherein the motion controller is provided in the form of a module that is received by the rack mounted industrial controller.

27. An industrial control system according to claim 18, wherein the segments are at least second order polynomial segments.

28. An industrial control system according to claim 18, wherein the coefficients are substantially all precalculated relative to when the shaft begins moving from the initial state to the new state.

29. An industrial control system according to claim 18, wherein the motion profile is determined while the shaft is moving.

30. An industrial control system according to claim 18, wherein the control program selects the motion profile from a plurality of possible profiles.

31. An industrial control system comprising:

(A) a motor;

(B) a servo drive, the servo drive being coupled to the motor, the servo drive being capable of providing the motor with current to drive the motor;

(C) a motion controller, the motion controller being coupled to the servo drive, the motion controller including a position control loop, the position control loop being capable of controlling an output position of a shaft of the motor so as to move from an initial position to a new position based on a series of position reference inputs;

(D) a control program, the control program being capable of being executed to provide the position control loop with the series of position reference inputs, the control program determining coefficients for each of a plurality of polynomial segments of a motion profile, the plurality of polynomial segments and the corresponding coefficients for each respective segment characterizing planned movement of the shaft through each respective segment, and the control program controlling the shaft of the motor using the position control loon, the shaft being controlled by the position control loop based on reference values generated using the plurality of polynomial segments and the corresponding coefficients for each respective segment, the shaft being controlled such that the shaft moves from the initial state to the new state
wherein the control program selects the motion profile from a plurality of possible profiles, wherein the plurality of possible profiles are specific types of a generic profile, and wherein the generic profile includes
a first segment in which the acceleration is forced to zero;

a second segment in which the acceleration is forced to a maximum magnitude;
a third segment in which the acceleration is maintained at the maximum magnitude;
a fourth segment in which the acceleration is forced to zero;
a fifth segment in which the acceleration is maintained at zero and the velocity is maintained at a maximum magnitude;
a sixth segment in which the acceleration is forced to a maximum deceleration;
a seventh segment in which the acceleration is maintained at a maximum magnitude;
an eighth segment in which the acceleration is forced to zero; and
a ninth segment in which the acceleration is maintained at zero.

32. An industrial control system according to claim 31, wherein the motion profile is selected based on an initial acceleration, a starting segment, information pertaining to a change in velocity between two segments relative to a maximum velocity.

33. A method comprising:
(A) providing an industrial control system, the industrial control system including
  (1) a plurality of output devices,
  (2) a plurality of input devices,
  (3) a motion control system, the motion control system including a motor and a position control loop, and the position control loop being operative to control a shaft of the motor based on a reference value,
  (4) a rack mounted industrial controllers, the industrial controller being connected to the plurality of input devices, the industrial controller being connected to the plurality of output devices and being connected to the motor by way of the motion control system, the industrial controller controlling the plurality of output devices based on input status information from the plurality of input devices, and the industrial controller having a backplane and a plurality of slots that are adapted to receive a plurality of modules;
(B) causing the shaft of the motor to move from an initial state to a new state, including
  (1) selecting a motion profile from a plurality of possible profiles, the plurality of possible profiles being specific types of a generic profile,
  (2) determining coefficients for each of a plurality of polynomial segments of the motion profile, the plurality of polynomial segments and the corresponding coefficients for each respective segment characterizing planned movement of the shaft through each respective segment, and each segment being defined by a plurality of polynomials, including a first polynomial that describes shaft position with respect to time, a second polynomial that describes shaft velocity with respect to time, and a third polynomial that describes shaft acceleration with respect to time,
  (3) generating a series of reference values using the plurality of polynomial segments and the corresponding coefficients for each respective segment,
  (4) providing the series of reference values to the motion control loop, the reference values being provided to the position control loop at intervals that are spaced in time from each other by an amount that is on the order of milliseconds,
  (5) controlling the shaft of the motor using the position control loop, the shaft being controlled by the position control loop based on the series of reference values, the shaft being controlled such that the shaft moves from the initial state to the new state, the controlling step including obtaining feedback position information from a position sensor that provides information pertaining to the position of the motor shaft, and controlling the shaft by comparing the feedback position information with sequential ones of the series of position reference values; and
wherein the generic profile includes
  a first segment in which the acceleration is forced to zero;
  a second segment in which the acceleration is forced to a maximum magnitude;
  a third segment in which the acceleration is maintained at the maximum magnitude;
  a fourth segment in which the acceleration is forced to zero:
  a fifth segment in which the acceleration is maintained at zero and the velocity is maintained at a maximum magnitude;
  a sixth segment in which the acceleration is forced to a maximum deceleration;
  a seventh segment in which the acceleration is maintained at a maximum magnitude;
  an eighth segment in which the acceleration is forced to zero; and
  a ninth segment in which the acceleration is maintained at zero.

34. A method according to claim 1, wherein the determining step further comprises using a root finding algorithm to determine at least one of the coefficients.

35. A method of causing a motor shaft to move from an initial position to a new position, the motor having a non-zero velocity at the initial position and having a zero velocity at the final position, comprising:
(A) selecting a motion profile, the motion profile being selected from a plurality of possible profiles, the plurality of possible profiles being specific types of a generic profile, and the generic profile including a plurality of polynomial segments including a first segment in which the acceleration is forced to a maximum magnitude, a second segment in which the acceleration is maintained at the maximum magnitude, a third segment in which the acceleration is forced to zero, a fourth segment in which the acceleration is maintained at zero and the velocity is maintained at a maximum magnitude, a fifth segment in which the acceleration is forced to a maximum deceleration, a sixth segment in which the acceleration is maintained at a maximum magnitude, and a seventh segment in which the acceleration is forced to zero;
(B) determining polynomial coefficients for the plurality of polynomial segments of the motion profile, the plurality of polynomial segments and the corresponding coefficients for each respective segment characterizing planned movement of the shaft through each respective segment;
(C) controlling the motor shaft using a motion control loop, the motor shaft being controlled by the motion control loop based on reference values generated using the plurality of polynomial segments and the corresponding coefficients for each respective segment, the shaft being controlled such that the motor shaft moves from the initial position to the new position and such that the velocity of the motor shaft is reduced from the non-zero velocity at the initial position to zero velocity at the new position, and the controlling step including forcing the acceleration to the maximum magnitude during the first segment and forcing the acceleration to zero during the third segment, the motor shaft reaching a peak velocity at the end of the third segment that is less than a predetermined maximum velocity of the motor shaft.

36. A method according to claim 35, wherein the determining step further comprises using a root finding algorithm to determine at least one of the coefficients.

* * * * *